Oct. 17, 1939.  C. W. GREEN  2,176,130
CASH REGISTER
Original Filed March 27, 1931   34 Sheets-Sheet 1

Inventor
Charles W. Green
By
His Attorney

Oct. 17, 1939.  C. W. GREEN  2,176,130
CASH REGISTER
Original Filed March 27, 1931    34 Sheets-Sheet 2

Inventor
Charles W. Green
By Carl Benst
His Attorney

Oct. 17, 1939.  C. W. GREEN  2,176,130
CASH REGISTER
Original Filed March 27, 1931  34 Sheets-Sheet 3

Inventor
Charles W. Green
By
*Cearl Benst*
His Attorney

Oct. 17, 1939.  C. W. GREEN  2,176,130
CASH REGISTER
Original Filed March 27, 1931  34 Sheets-Sheet 4

Inventor
Charles W. Green
By
His Attorney

Oct. 17, 1939.　　　C. W. GREEN　　　2,176,130
CASH REGISTER
Original Filed March 27, 1931　　34 Sheets-Sheet 5

Inventor
Charles W. Green
By
Hearl Benst
His Attorney

Oct. 17, 1939.　　　C. W. GREEN　　　2,176,130
CASH REGISTER
Original Filed March 27, 1931　　34 Sheets—Sheet 6

Inventor
Charles W. Green
By
His Attorney

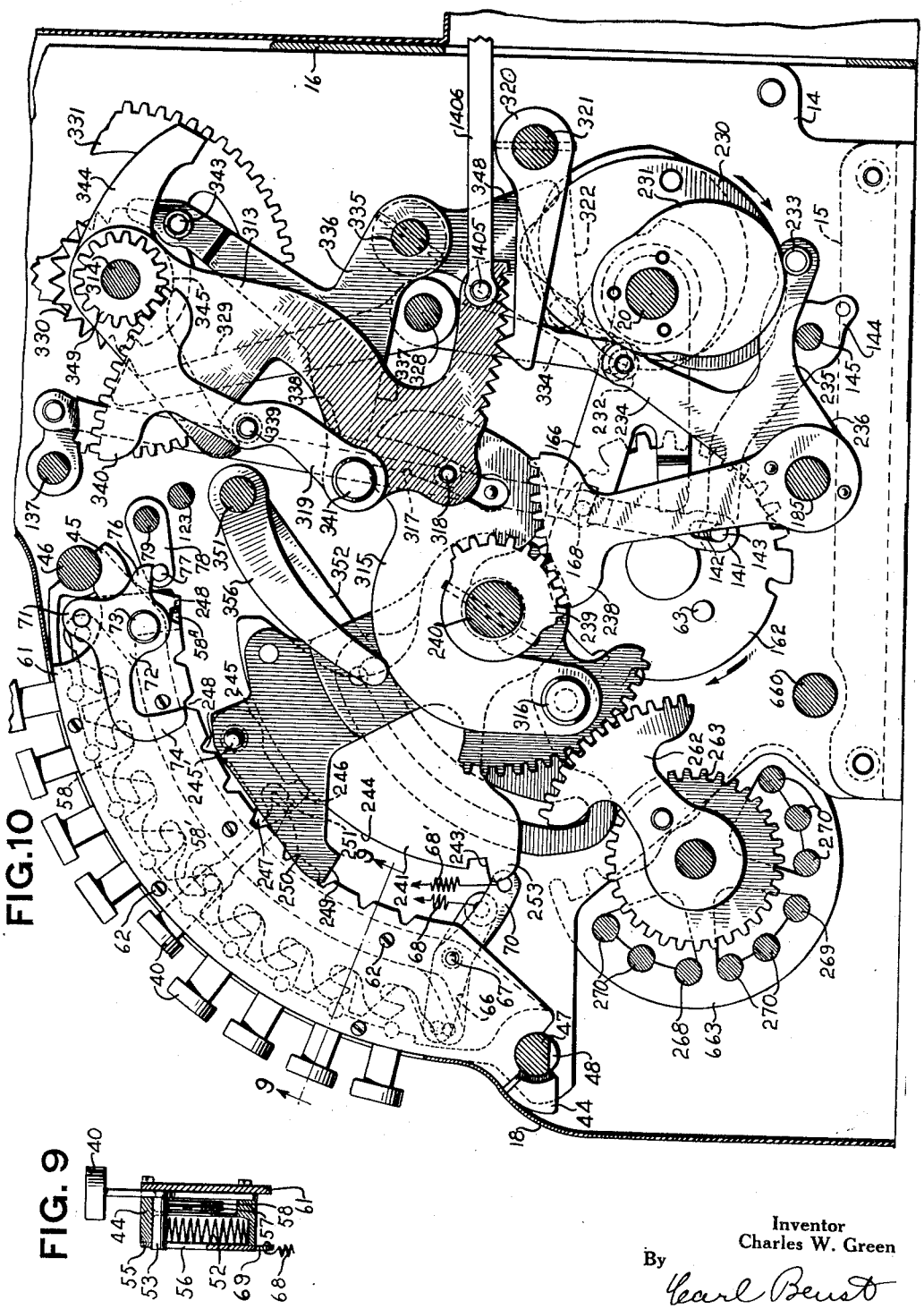

Oct. 17, 1939.  C. W. GREEN  2,176,130
CASH REGISTER
Original Filed March 27, 1931  34 Sheets-Sheet 8

Inventor
Charles W. Green
By
Earl Beust
His Attorney

Oct. 17, 1939.  C. W. GREEN  2,176,130
CASH REGISTER
Original Filed March 27, 1931  34 Sheets-Sheet 9

Inventor
Charles W. Green
By
Pearl Benst
His Attorney

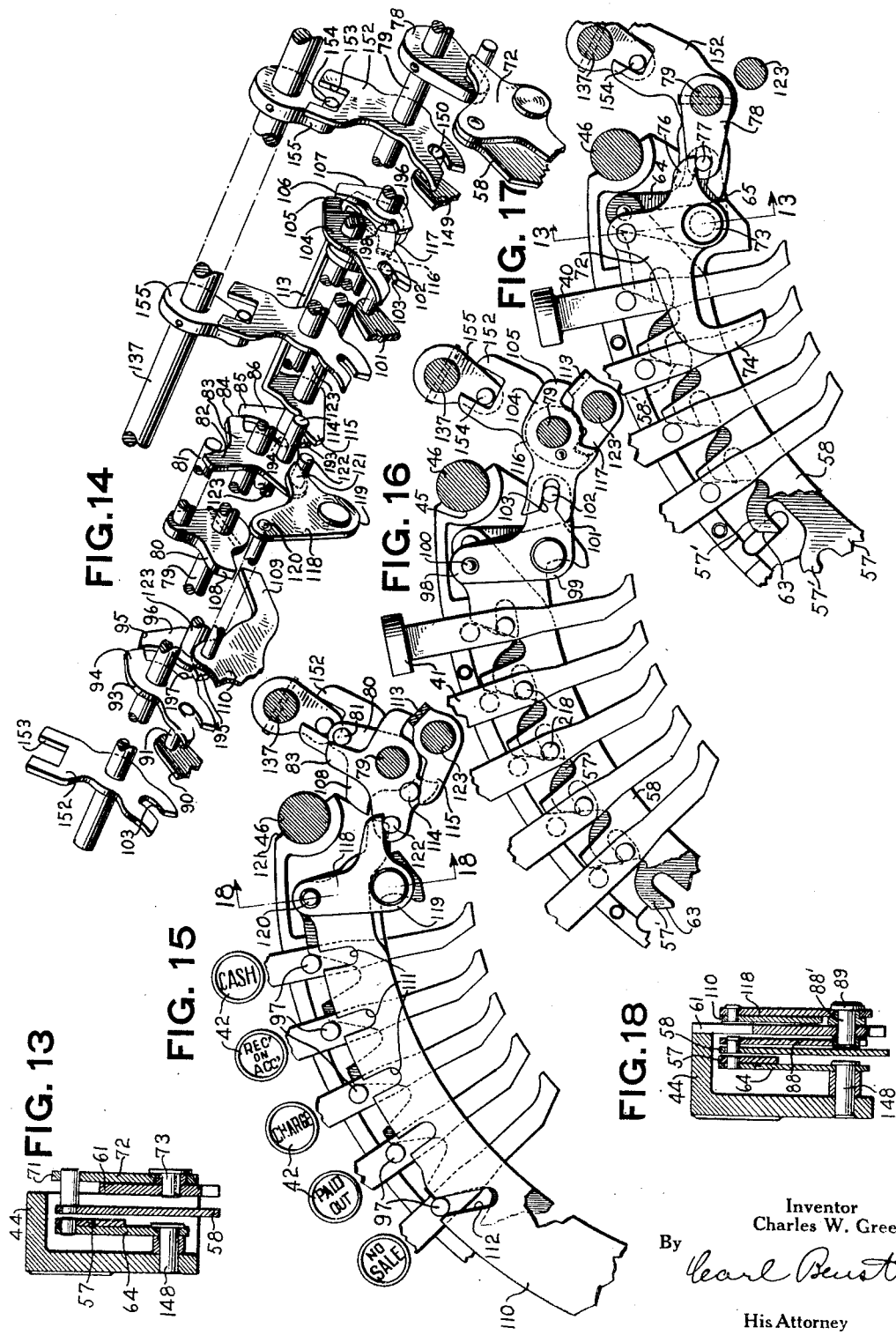

Oct. 17, 1939.  C. W. GREEN  2,176,130
CASH REGISTER
Original Filed March 27, 1931  34 Sheets-Sheet 11
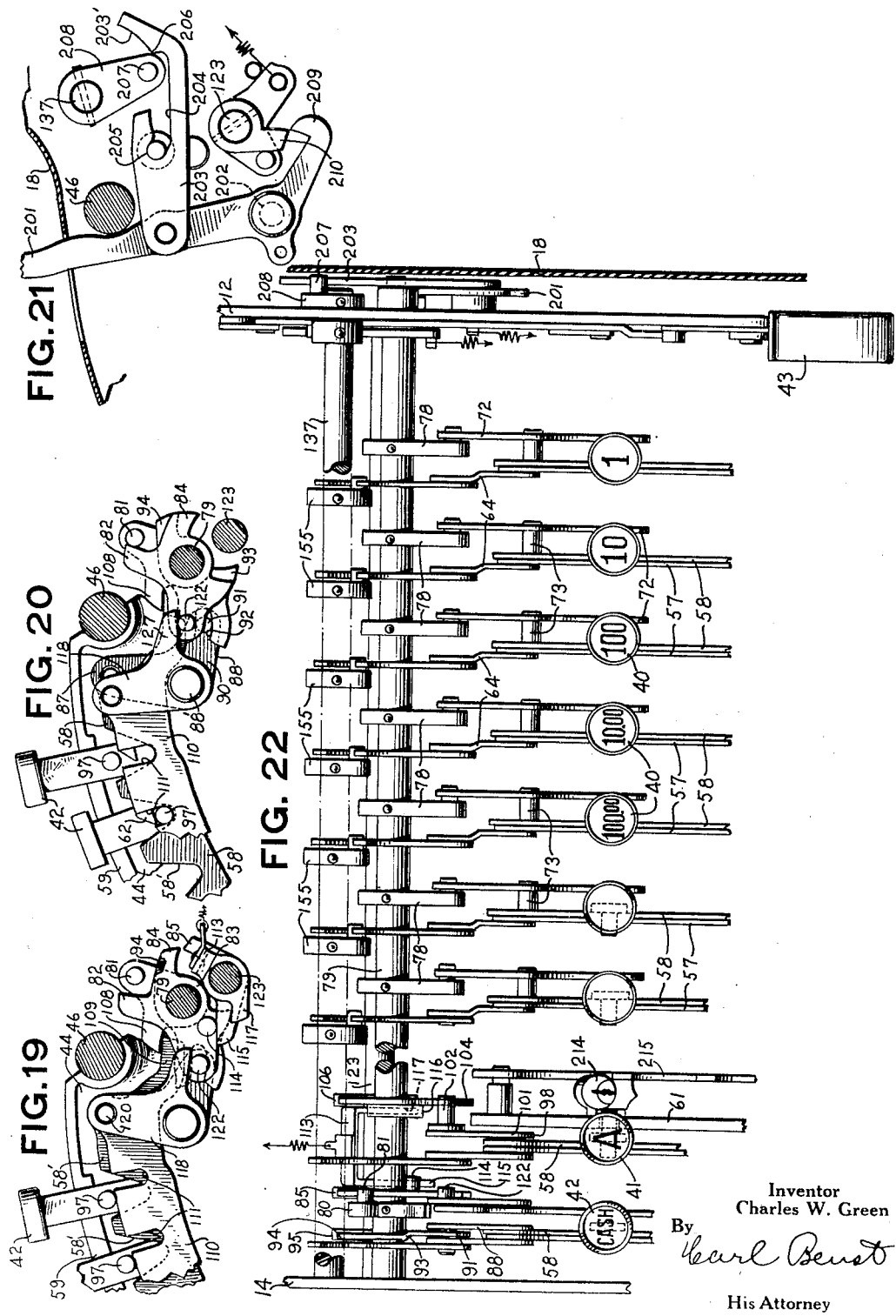

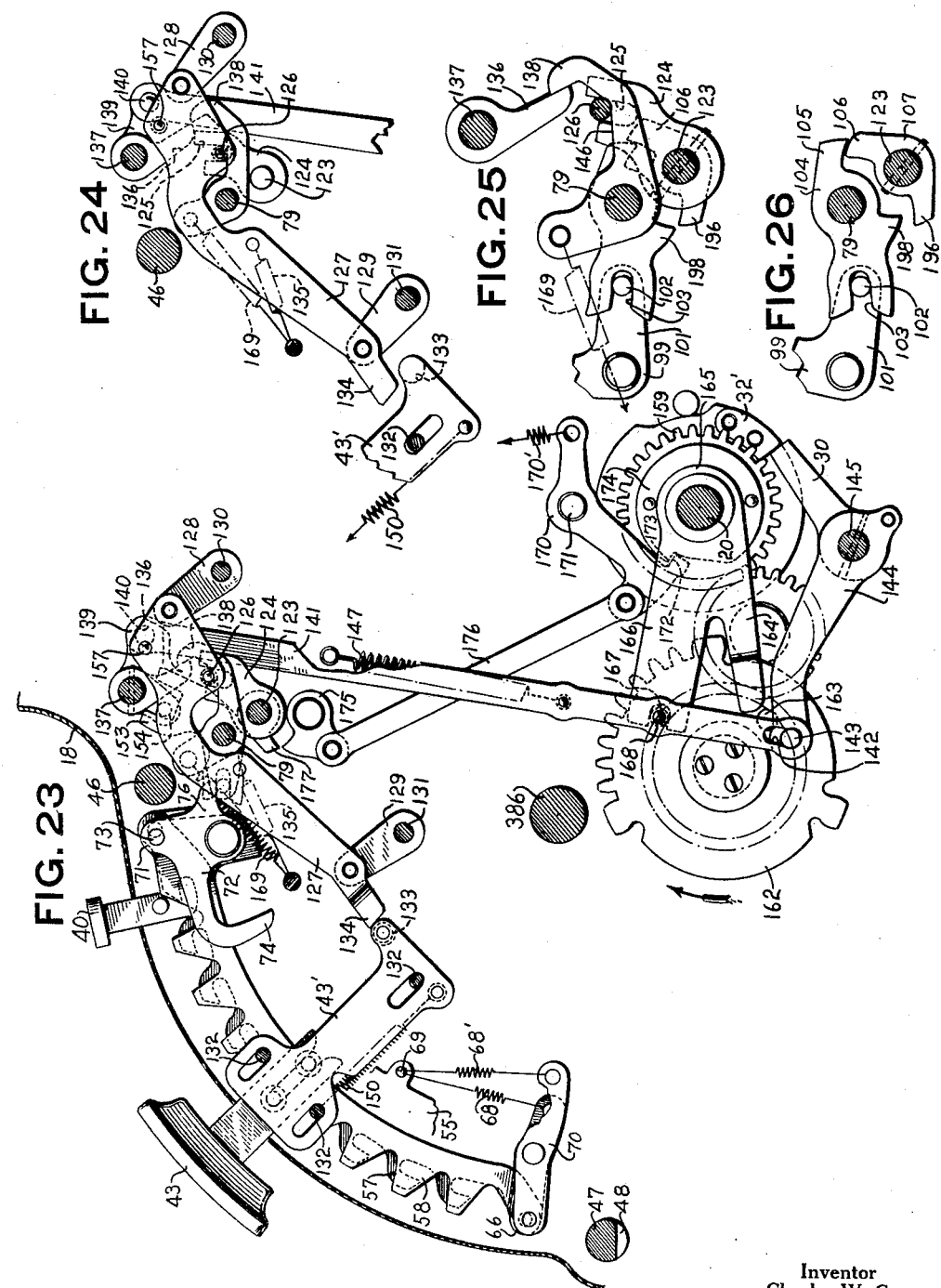

Oct. 17, 1939.   C. W. GREEN   2,176,130
CASH REGISTER
Original Filed March 27, 1931   34 Sheets-Sheet 13

Inventor
Charles W. Green
By
Cecil Beust
His Attorney

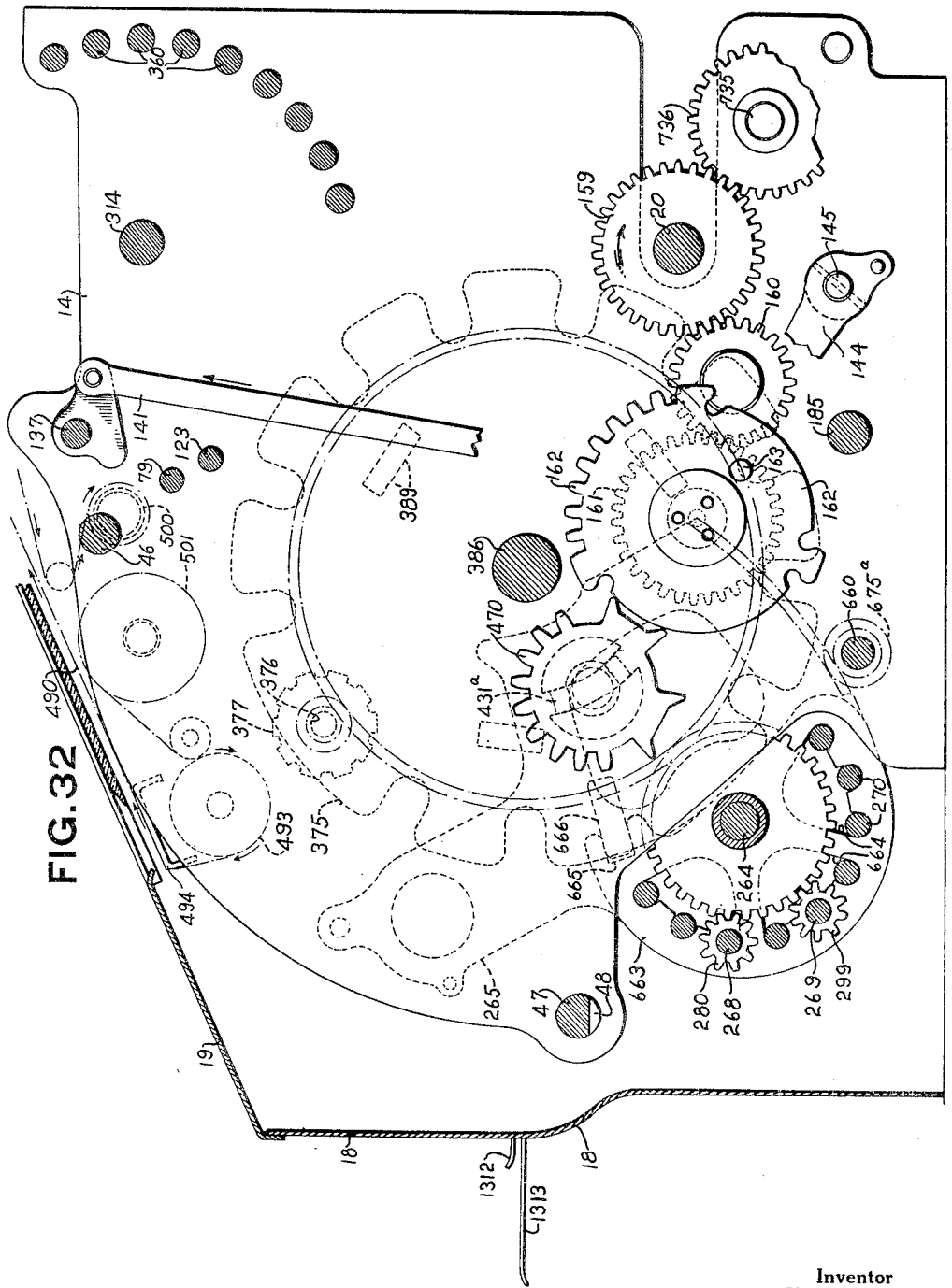

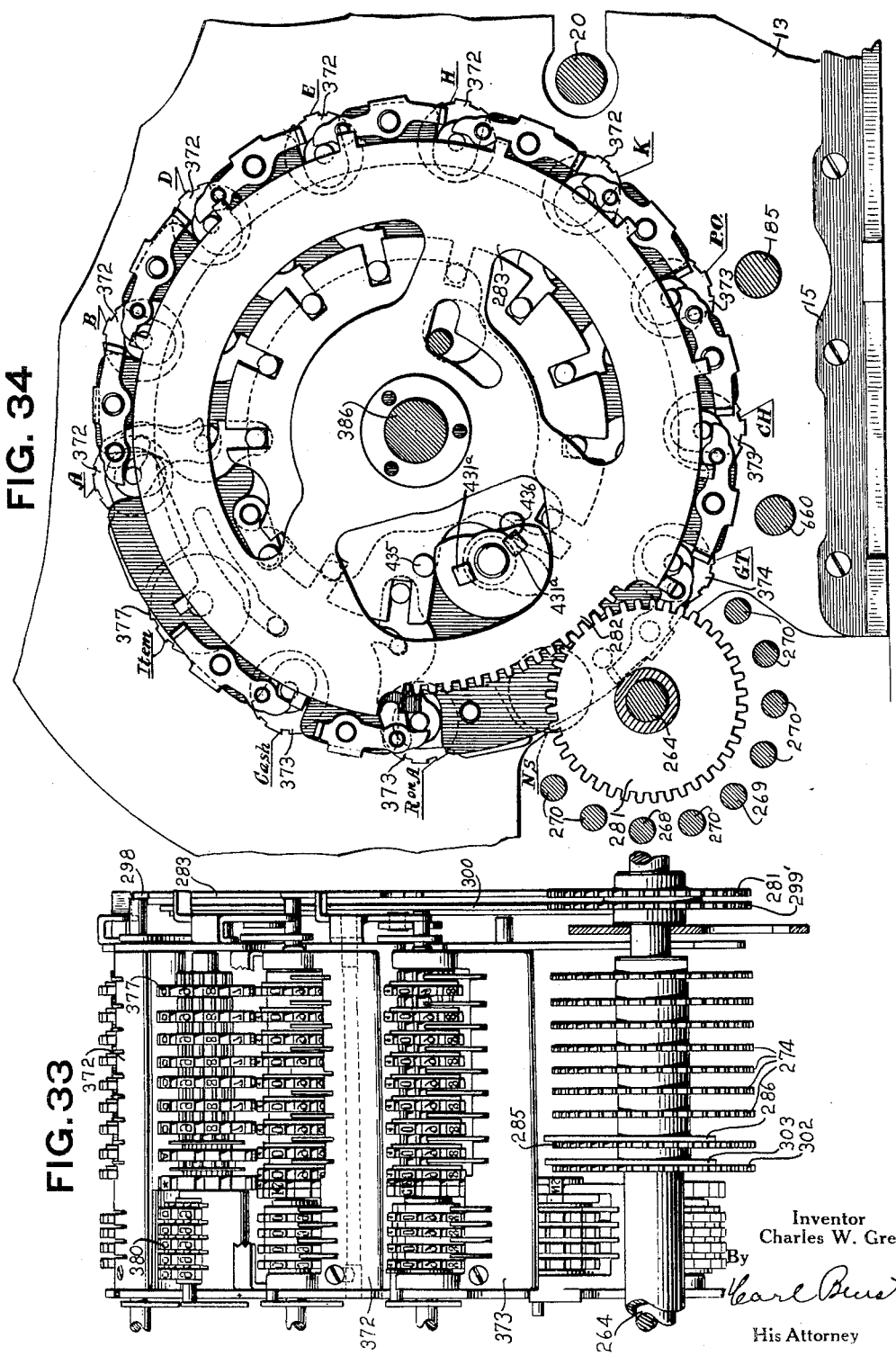

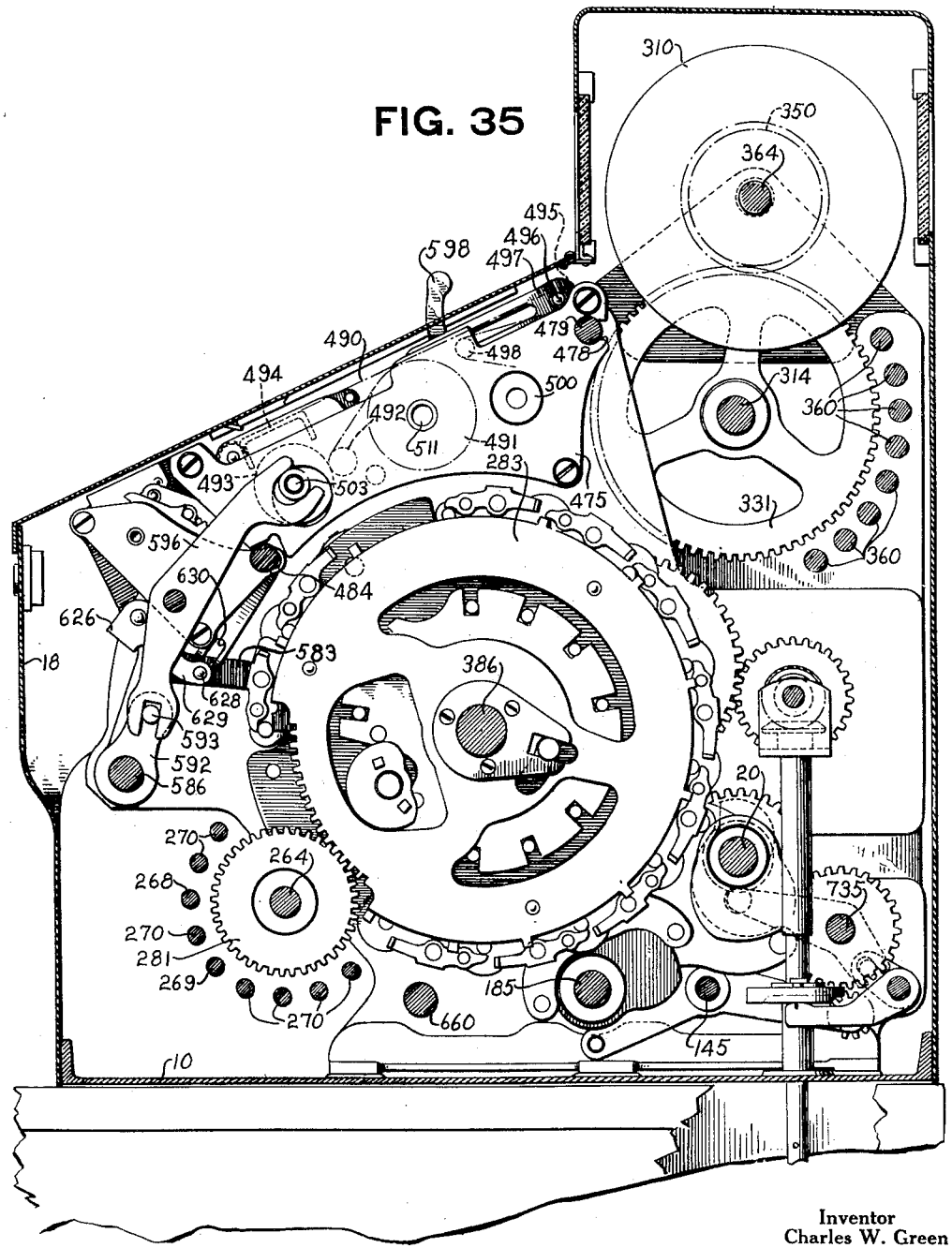

Oct. 17, 1939.  C. W. GREEN  2,176,130
CASH REGISTER
Original Filed March 27, 1931   34 Sheets-Sheet 17

Inventor
Charles W. Green
By Carl Benst
His Attorney

Oct. 17, 1939.   C. W. GREEN   2,176,130
CASH REGISTER
Original Filed March 27, 1931   34 Sheets-Sheet 19

Inventor
Charles W. Green
By
His Attorney

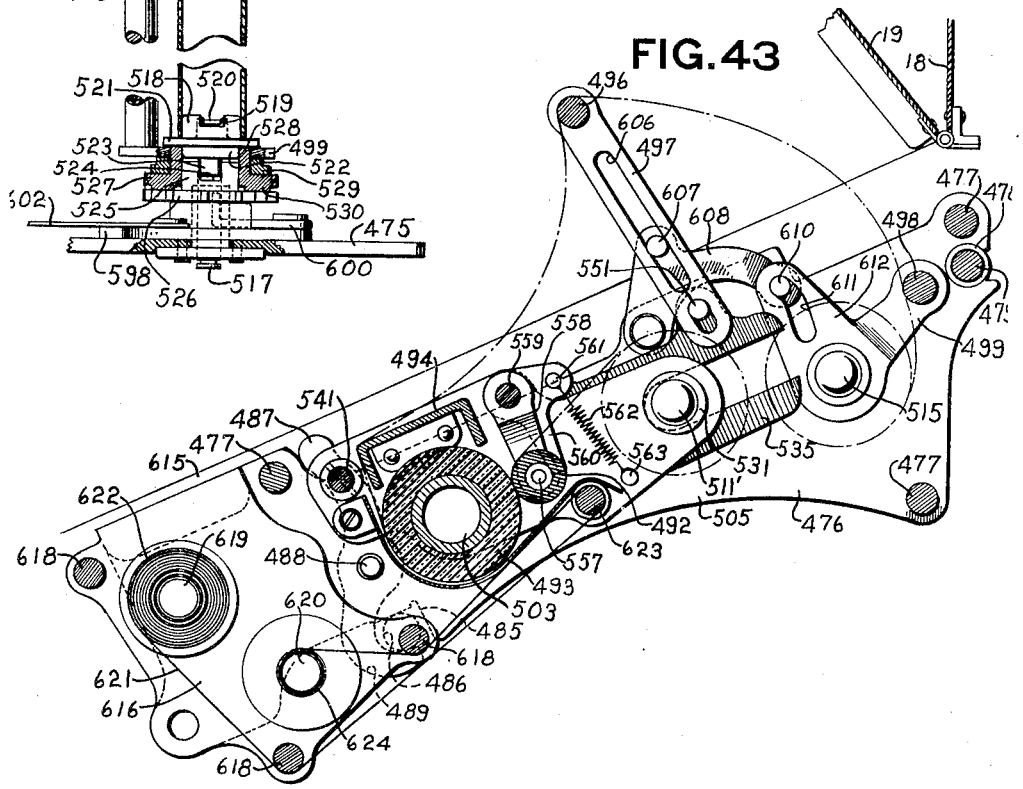

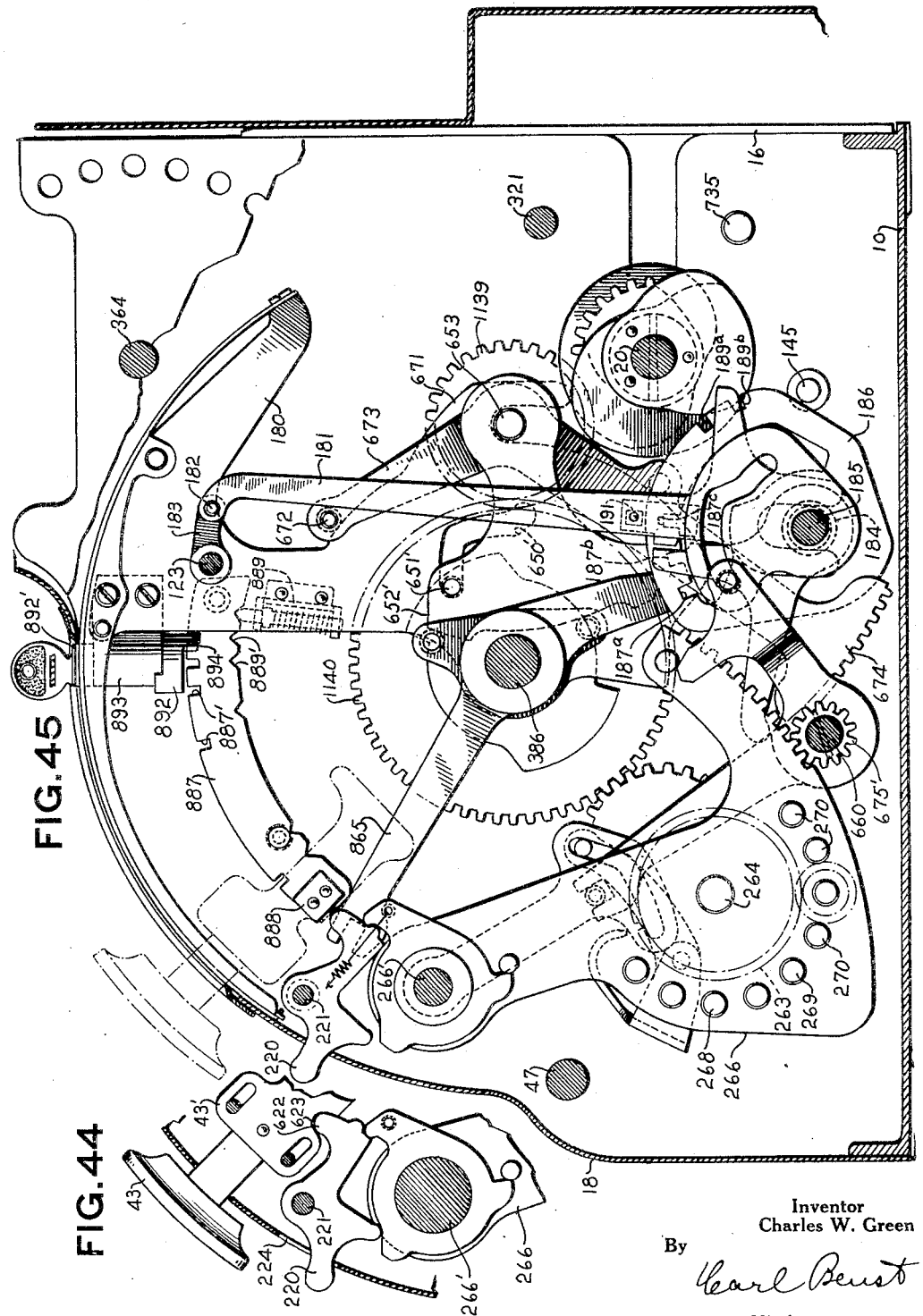

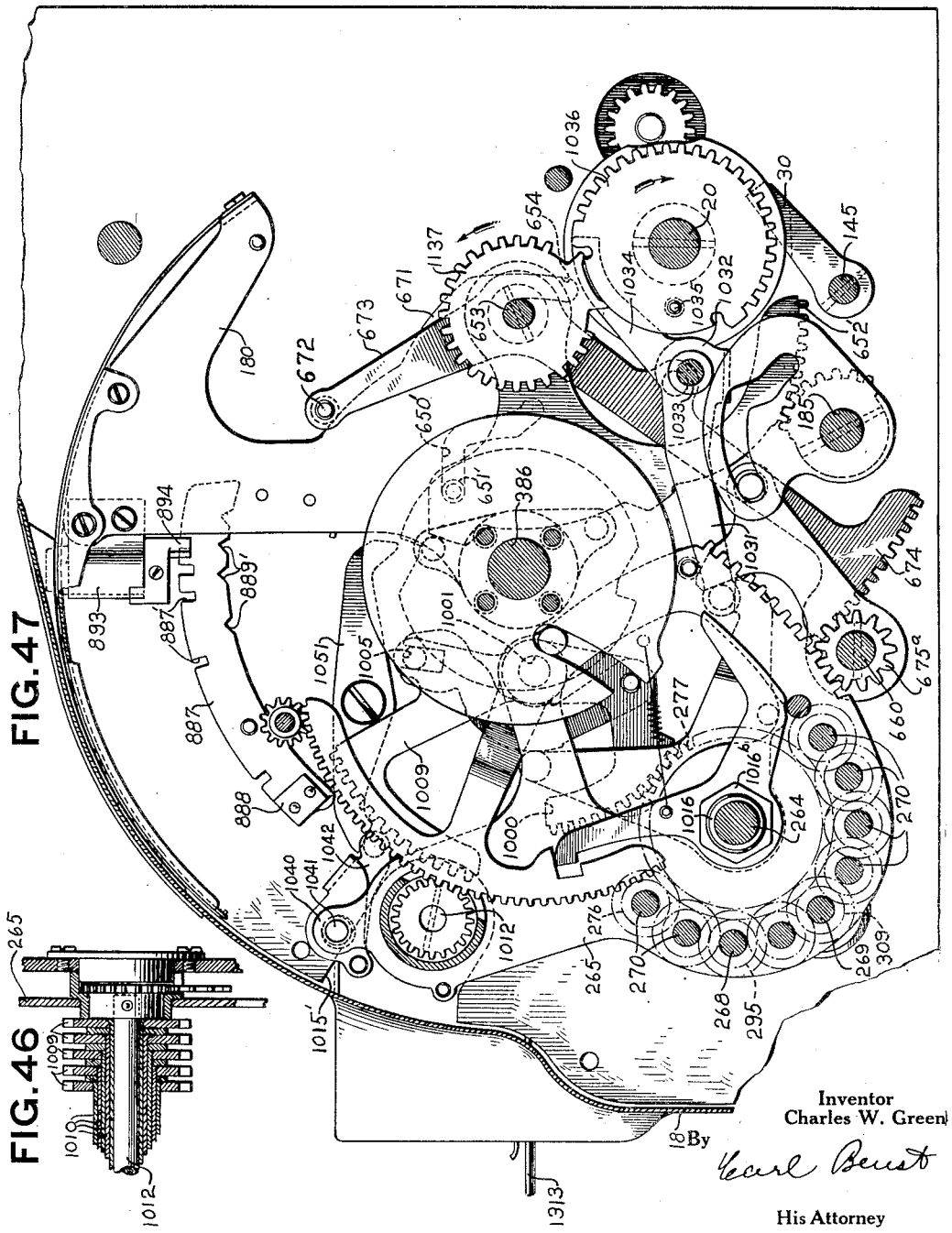

Oct. 17, 1939.   C. W. GREEN   2,176,130
CASH REGISTER
Original Filed March 27, 1931   34 Sheets-Sheet 23

Inventor
Charles W. Green
By
His Attorney

Oct. 17, 1939.  C. W. GREEN  2,176,130
CASH REGISTER
Original Filed March 27, 1931  34 Sheets-Sheet 24
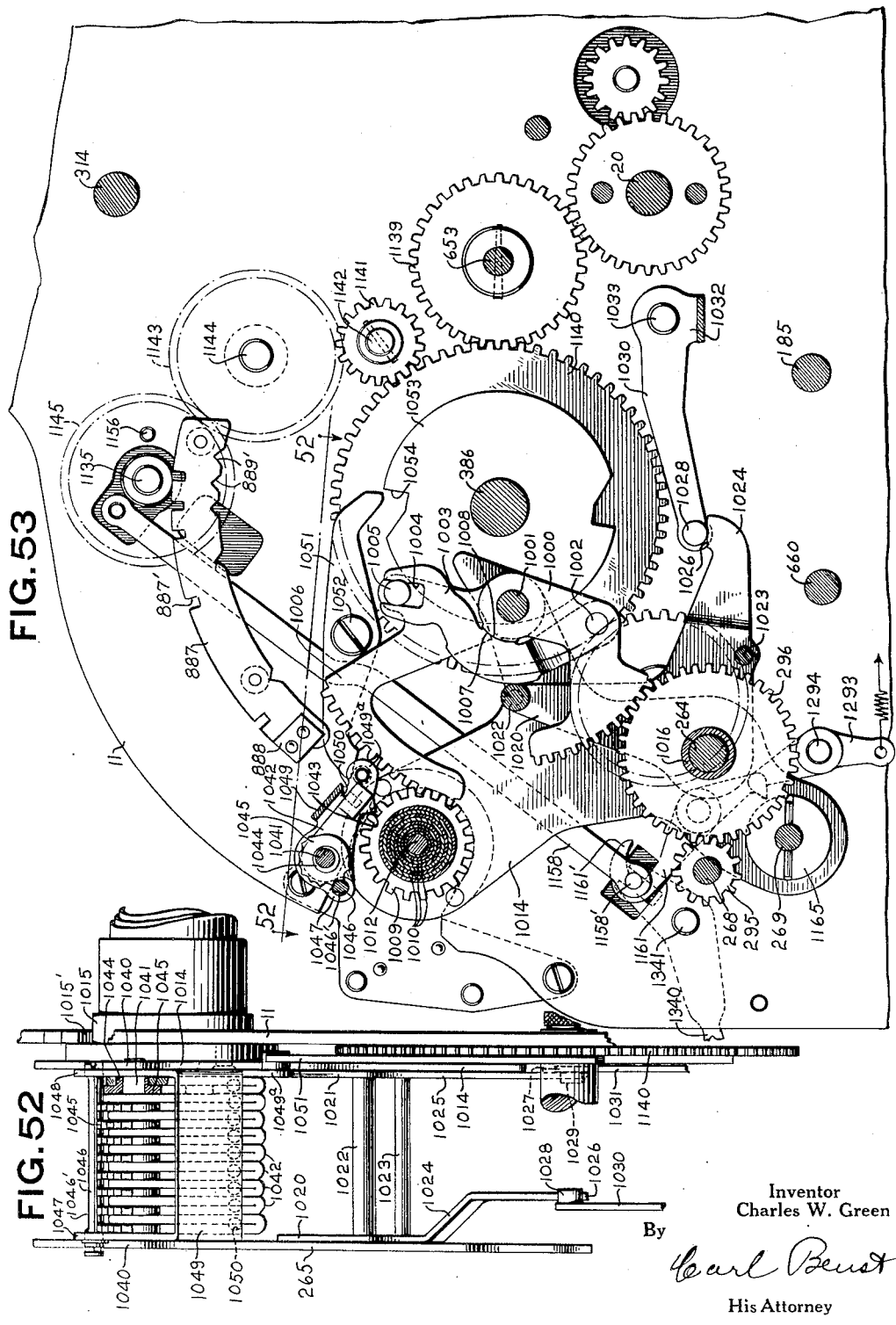
Inventor
Charles W. Green
By
Carl Beust
His Attorney Oct. 17, 1939.   C. W. GREEN   2,176,130
CASH REGISTER
Original Filed March 27, 1931   34 Sheets-Sheet 25

Inventor
Charles W. Green
By Earl Beust
His Attorney

Oct. 17, 1939.   C. W. GREEN   2,176,130
CASH REGISTER
Original Filed March 27, 1931   34 Sheets-Sheet 26
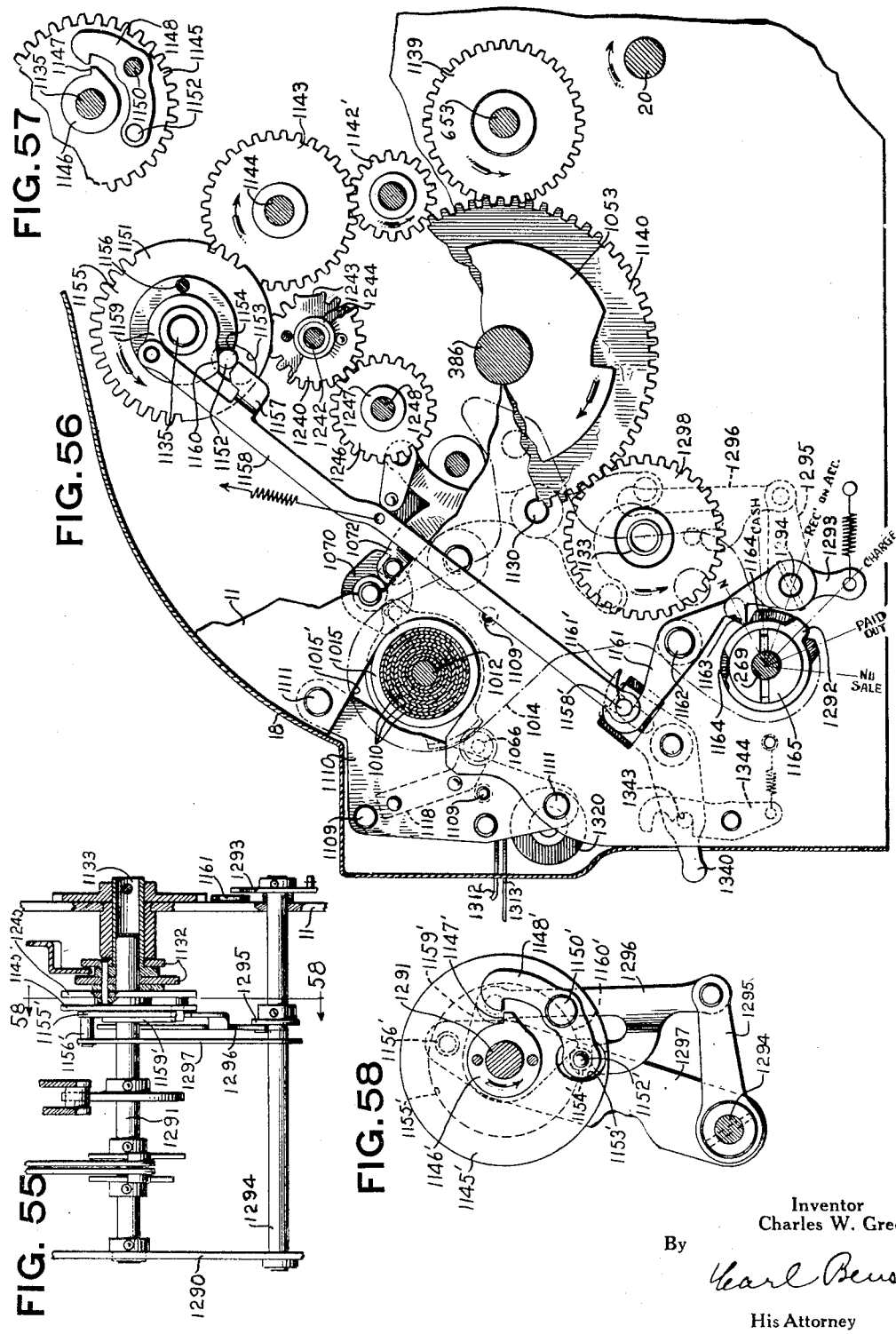
Inventor
Charles W. Green
By Earl Benst
His Attorney Oct. 17, 1939.  C. W. GREEN  2,176,130
CASH REGISTER
Original Filed March 27, 1931   34 Sheets-Sheet 27
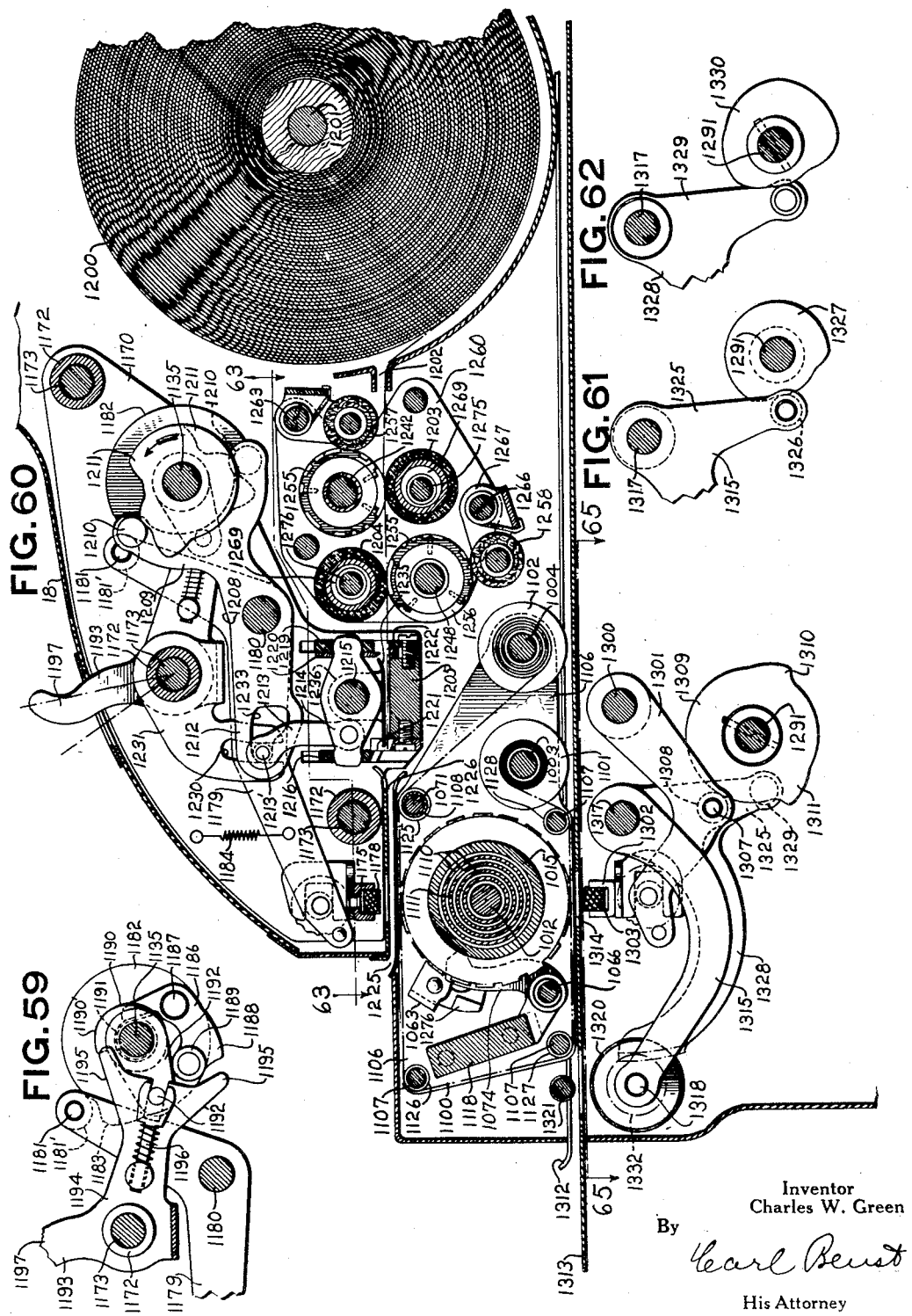
Inventor
Charles W. Green
By
Carl Beust
His Attorney

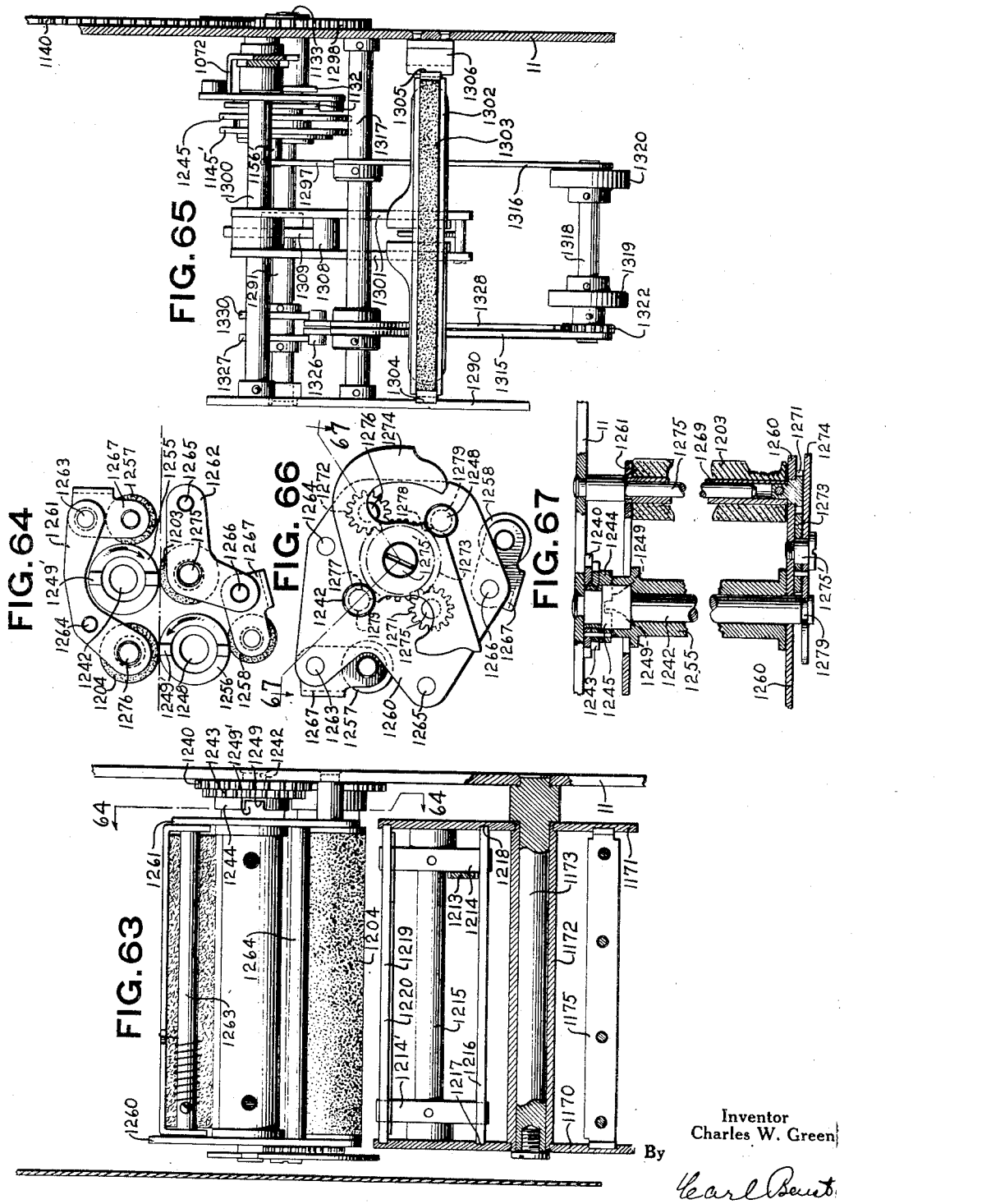

Oct. 17, 1939.  C. W. GREEN  2,176,130
CASH REGISTER
Original Filed March 27, 1931  34 Sheets-Sheet 29

Inventor
Charles W. Green
By
Carl Benst
His Attorney

Oct. 17, 1939.　　　C. W. GREEN　　　2,176,130
CASH REGISTER
Original Filed March 27, 1931　　34 Sheets-Sheet 30

Inventor
Charles W. Green
By
Earl Benst
His Attorney

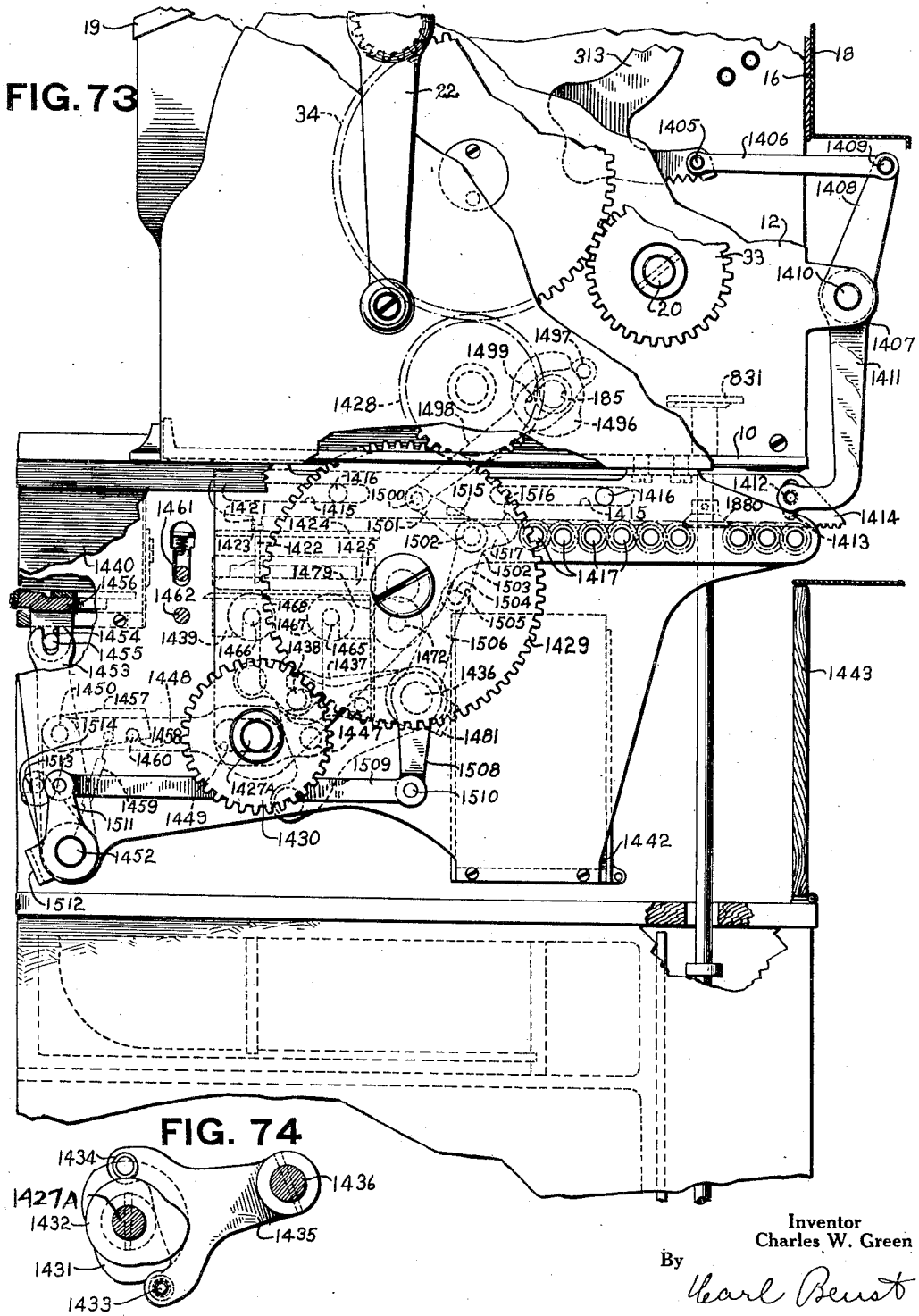

Oct. 17, 1939.  C. W. GREEN  2,176,130
CASH REGISTER
Original Filed March 27, 1931  34 Sheets—Sheet 32
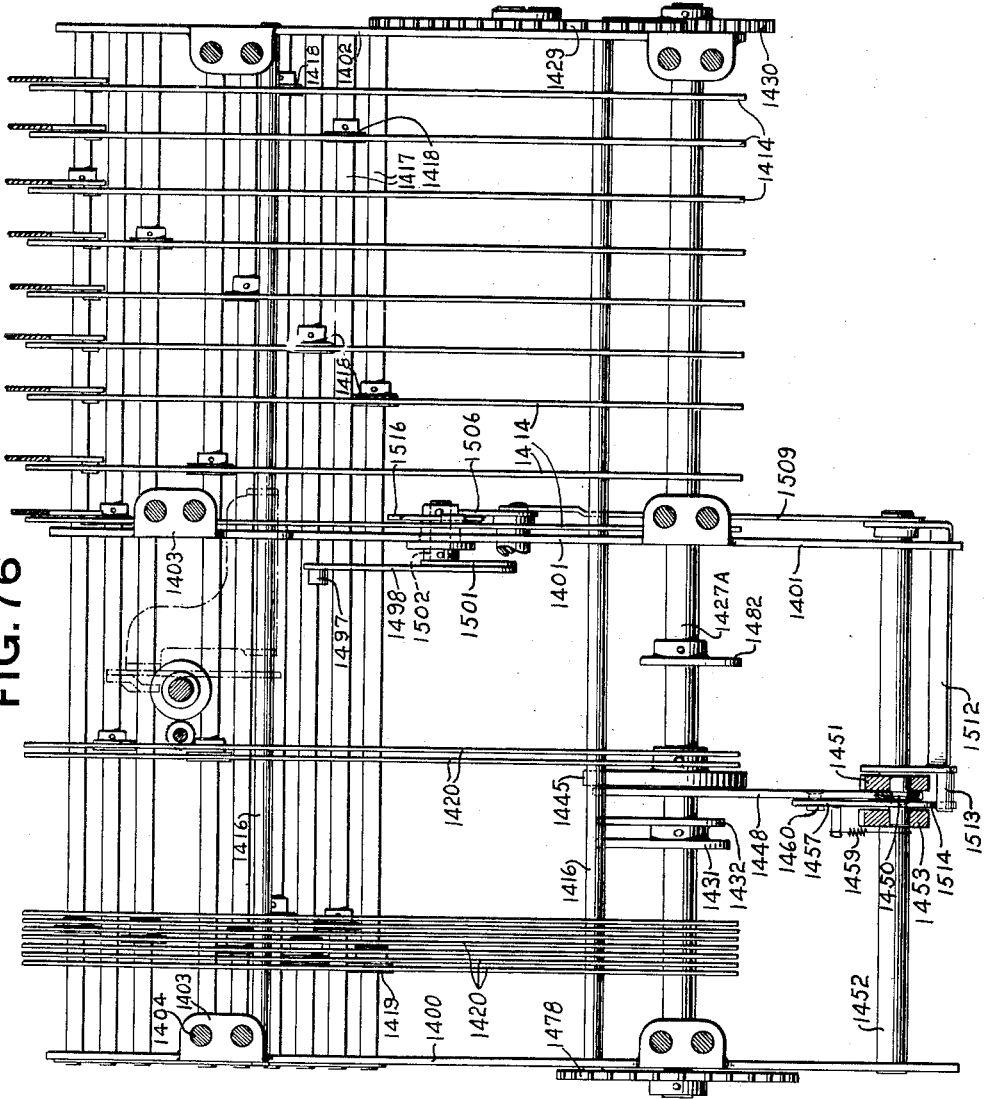
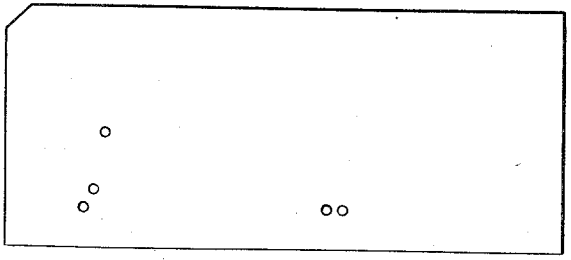
Inventor
Charles W. Green
By
His Attorney Oct. 17, 1939.     C. W. GREEN     2,176,130
CASH REGISTER
Original Filed March 27, 1931     34 Sheets-Sheet 33
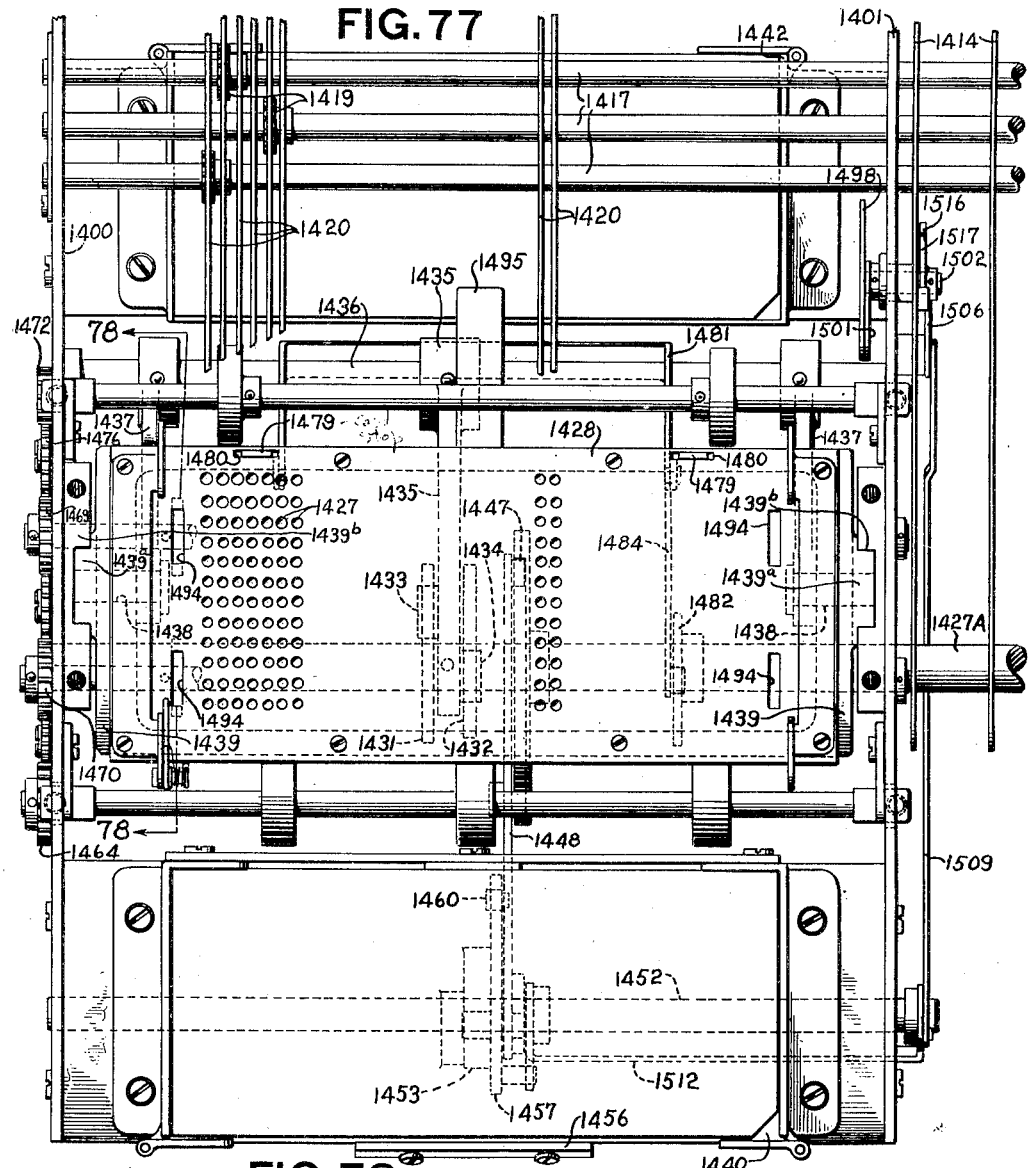
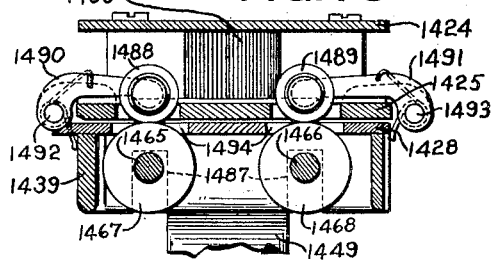
Inventor
Charles W. Green
By Carl Beust
His Attorney Oct. 17, 1939.    C. W. GREEN    2,176,130
CASH REGISTER
Original Filed March 27, 1931    34 Sheets-Sheet 34
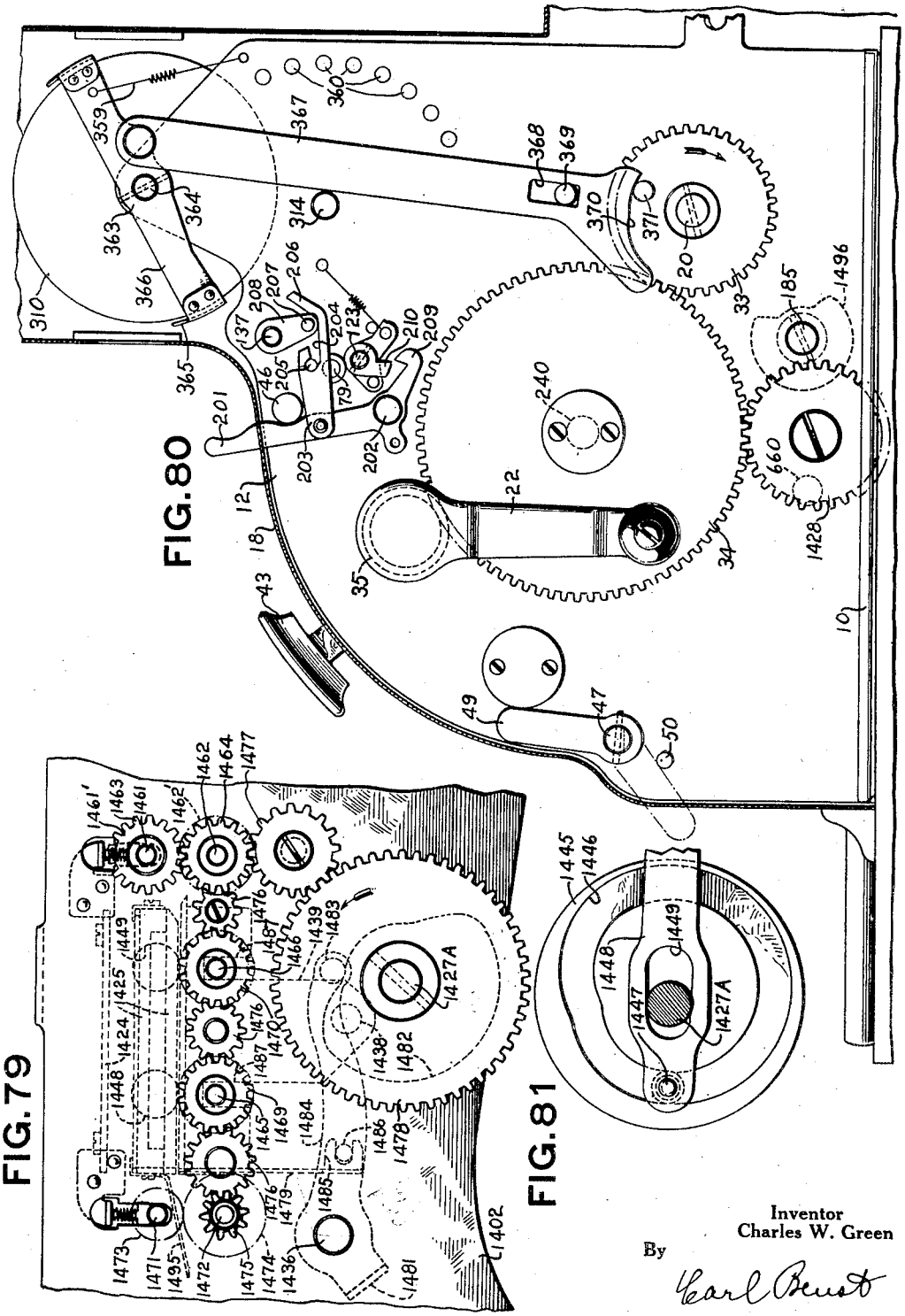
Inventor
Charles W. Green
By
Earl Benst
His Attorney Patented Oct. 17, 1939

2,176,130

UNITED STATES PATENT OFFICE 2,176,130

CASH REGISTER

Charles W. Green, Dayton, Ohio, assignor to The National Cash Register Company, Dayton, Ohio, a corporation of Maryland Original application March 27, 1931, Serial No. 525,630. Divided and this application April 23, 1936, Serial No. 76,004

15 Claims. (Cl. 164—112)

This invention relates to cash registers and analogous devices and particularly to that type having a plurality of totalizers some of which are provided for separately registering the totals of the various transactions entered in the machine by the individual clerks while others are provided for separately registering the totals of the different kinds of transactions entered in the machine, and is a division of the application for United States Letters Patent, Serial No. 525,630, of Charles W. Green, filed March 27, 1931 which issued on December 8, 1936, as Patent No. 2,063,091.

This invention also relates to the type of machines capable of printing upon a detail strip a record of each transaction entered in the machine, and also of the type which issues checks or receipts and prints upon inserted slips so that a customer may also have a record of his purchase. The invention further relates to machines capable of punching or marking a record card at each operation thereof to correspond with certain of the printed matter appearing on the issued checks or slips, or any other entries which can be registered in the machine.

Another object of the present invention is to provide mechanisms which are controlled by the various keys for automatically printing upon a record strip and issued checks or sales slips, data corresponding to the keys depressed, and to automatically punch a record card to correspond with this matter. After a record card has been punched, it is fed into a storage compartment and retained in the machine and thus a true record of each transaction entered in the machine is obtained, which cannot be altered.

A further object of the present invention is to provide a unitary control mechanism for controlling the various modes of operation in the machine. A still further object is to provide a machine in which the various moving parts therein are positive in operation. Another important object of the present invention is to construct many of the parts in such a manner that they may readily be stamped from the sheet metal blanks, thus lowering the cost of manufacture to a minimum. Another object of the present invention is to construct the various mechanisms of the machine in such a manner that they may be assembled in units and then placed in the machine in their assembled state. This feature also tends to lower the cost of manufacture.

Further objects of the present invention are to effect improvements in indicator mechanisms, differential mechanisms, keyboard and lock-line mechanisms, power transmission mechanisms, machine control mechanisms, interlocking mechanisms, check and slip printing and issuing mechanisms and controls therefor, and record strip printing and feeding mechanisms.

With these and incidental objects in view, the invention includes certain novel features of construction and combinations of parts, the essential elements of which are set forth in appended claims and a preferred form or embodiment of which is hereinafter described with reference to the drawings which accompany and form part of this specification. In the drawings:

Fig. 9 is a sectional view on line 9—9 of Fig. 10.

Fig. 10 is a elevational view illustrating the relative positions of the parts comprising in the differential when the revolution shaft has been operated substantially 100° and when a key in an amount section has been depressed.

Fig. 13 is a section on line 13—13 of Fig. 17.

Fig. 14 is an extended perspective view of the mechanism associated with each bank of keys for controlling the release of the machine.

Fig. 15 is a similar view of the transaction key section.

Fig. 16 is a similar view of a portion of the clerk's key section.

Fig. 17 is a side view of a portion of an amount key section with the retaining plate removed.

Fig. 18 is a section on line 18—18 of Fig. 15.

Fig. 19 is a view of the same key section showing arrangement of the parts when a no sale key is depressed.

Fig. 20 is a partial detail view of the transaction key section showing the received on account key depressed.

Fig. 21 is a detail view of the mechanism for manually releasing any depressed keys.

Fig. 22 is a plan view, with certain parts omitted, to show the mechanism for releasing the machine for operation and compelling a sequence of operation between the keys.

Fig. 23 is a general view of the motor release bar and all of the parts associated therewith for controlling the release of the machine and also shows the means for restoring the parts to normal during an operation of the machine.

Fig. 24 is a view showing the position of the parts immediately after the motor release bar has been depressed.

Fig. 25 is a detail view showing some of the locking elements for the operating mechanism in their normal positions.

Fig. 26 is a detail view showing the position of some of the locking elements immediately after the motor bar has been depressed.

Fig. 32 is a sectional view taken on line 32—32 of Fig. 3 showing the driving mechanism for certain of the parts positioned within the totalizer reel.

Fig. 33 is a front elevational view of the totalizer reel.

Fig. 34 is a view of the totalizer reel taken on line 34—34 of Fig. 3.

Fig. 35 is a sectional view taken substantially on line 35—35 of Fig. 2.

Fig. 40 is a perspective view of a portion of the spool around which the record strip is wound.

Fig. 41 is a cross section view showing the mechanism associated with the storage roll for the record strip.

Fig. 42 is a sectional view taken substantially on line 42—42 of Fig. 36 showing the manual feeding mechanism for the record strip.

Fig. 43 is a sectional view taken substantially on line 43—43 of Fig. 36 showing certain parts in adjusted position when the mechanism is conditioned for replenishing or removing the record strip.

Fig. 44 is a detail view of the mechanism for controlling the motor bar retaining latch.

Fig. 45 is a general elevational view of the control mechanism and its associated parts.

Fig. 46 is a fragmentary view showing the arrangement of the nested sleeves associated with the check and slip type wheels.

Fig. 47 is a sectional view taken on line 47—47 of Fig. 3.

Fig. 52 is a sectional plan view taken on line 52—52 of Fig. 53 showing in detail the locking pawl for retaining the type carriers in adjusted position.

Fig. 53 is a cross-sectional view taken on line 53—53 of Fig. 54. This figure shows principally the train of gears for operating the check and slip printing mechanisms and also illustrates in detail the means for adjusting the clerk's type carrier associated with these mechanisms.

Fig. 55 is a view partly in elevation and partly in section showing the clutch associated with the slip printing mechanism.

Fig. 56 is a fragmentary view taken adjacent the left-hand side frame of the machine showing the operating connections for the check and slip printing mechanisms.

Fig. 57 is a detail view of a portion of the clutch for imparting movement to the check mechanism.

Fig. 58 is a detail view of the clutch shown in Fig. 55.

Fig. 59 is a detail view of the mechanism for controlling the number of printing impressions to be made upon issued checks.

Fig. 60 is a view taken on line 60—60 of Fig. 54 looking in the direction of the arrows.

Fig. 61 is a detail view showing the cam for moving the pressure roll into engagement with the inserted slip.

Fig. 62 is a detail view of the cam for actuating the pressure roll to feed the inserted slip.

Fig. 63 is a view taken on line 63—63 of Fig. 60.

Fig. 64 is an end view taken on line 64—64 of Fig. 63 showing in detail the construction of the feeding rollers associated with the check printing mechanism.

Fig. 65 is a general plan view of the slip printing mechanism taken on line 65—65 of Fig. 60.

Fig. 66 is an elevational view of the assembly which contains the feeding rollers described in Fig. 64.

Fig. 67 is a sectional view taken on line 67—67 of Fig. 66.

Fig. 73 is a side elevational view with parts of the cabinet removed, showing generally the card perforating mechanism and the operating means therefor.

Fig. 74 is a detail view of the cam for operating the card perforating die plate.

Fig. 75 shows a sample of a perforated card.

Fig. 76 is a general plan view of the differential mechanism for selecting the punches associated with the card perforating mechanism.

Fig. 77 is a plan view with parts removed, showing the die plate, the card compartments and the operating mechanism, associated with the card perforating mechanism.

Fig. 78 is a cross-sectional view taken on line 78—78 of Fig. 77.

Fig. 79 is a side view of the card feeding rollers and the operating means therefor.

Fig. 80 is a right end view of the machine with a portion of the cabinet removed.

Fig. 81 is a detail view of the cam for actuating the mechanism for feeding a card from the supply compartment to the feeding rollers.

GENERAL DESCRIPTION

Figure 1:
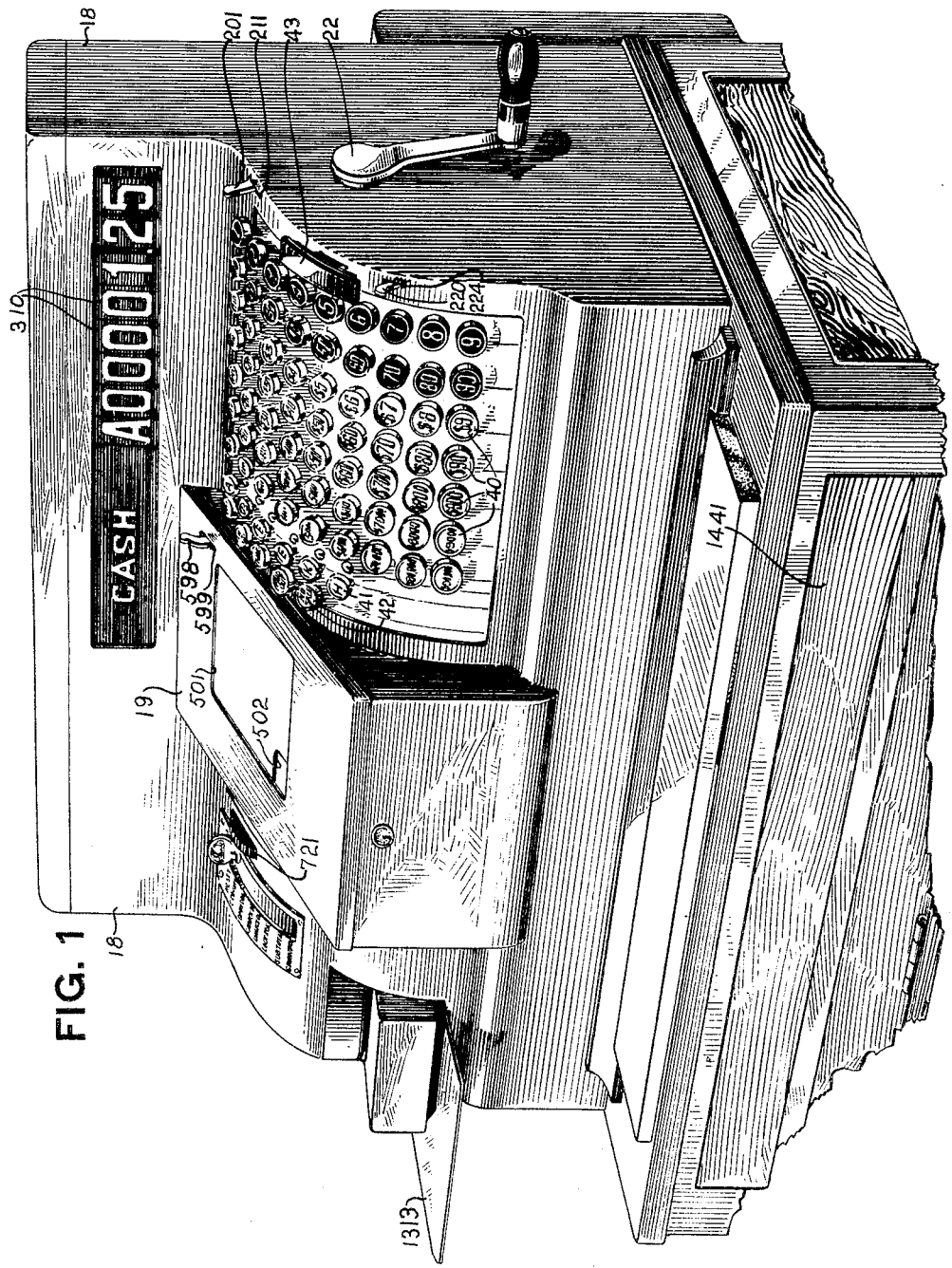
Fig. 1 is a perspective view of the complete machine embodying this invention.

Before describing in detail the various mechanisms comprised in this machine, a general description of the machine will first be given. This machine is of the well known key set motor or crank operative type. The illustrated machine contains seven banks of amount keys, one bank of clerks' keys and one bank of transaction keys. These keys operate with what is commonly known as a lock line which is so constructed that upon an adding operation of the machine it is necessary to depress a key in one of the amount banks, a transaction key, a clerk's key and a motor bar to release the machine for operation. This lock line and associated mechanism is also so constructed that for no sale transactions, it is only necessary to depress the no sale key, a clerk's key and the motor bar to release the machine for operation. Upon depression of the no sale key, all of the amount keys will be locked against operation. Likewise, upon depression of any one of the amount keys, the no sale key will be locked against operation. Mechanism is also provided to compel the depression of an amount key before a clerk's key can be depressed for all transactions involving the use of the amount keys. This interlock also compels the depression of the no sale key for no sale transactions before a clerk's key can be depressed. Associated with each bank of keys is a positively driven differential segment from which motion is imparted to the mechanisms for adjusting the various type carriers and totalizer elements provided in the machine.

Located approximately at the mid-portion of the machine is a normally stationary reel in which are mounted several totalizers. In the present divisional case, these totalizers are only generally shown and are but briefly described.

Near the left-hand end of the machine is mounted the check and slip printing mechanism. Motion is transmitted from the differential segments to the actuating gears for the totalizers, to the various selecting mechanisms in the reel, and to the check and slip printing mechanism by a gear transmission mechanism. This transmission mechanism is mounted in three supporting frames which are suitably pivoted to the main side frame of the machine so that it may be swung out of engagement with the various gears in the machine proper.

Also associated with the differential segments are a series of connections for adjusting the indicators. The indicators provided in the illustrated machine are of the drum type and are so arranged that the amount of each transaction entered in the machine as well as a legend representing the clerk who entered the transaction and a legend designating the kind of transaction are displaced at both the front and rear of the machine. The connections for adjusting the indicator mechanism are so constructed that the indicators will be positioned from one position to another without first being returned to a zero or starting position.

A record strip printing mechanism is also provided in the illustrated machine and is positioned at the top of the cabinet directly over the totalizer reel. The various items entered in the machine may be viewed from the record strip through a window provided in the top of the cabinet. This window is so provided that autographic notations may be made upon the record strip adjacent the printed items. The record strip printing mechanism is of such a nature that the record strip is first shifted from normal position to bring the proper portion thereof over the item type carriers, when a printing impression will then be made thereon. The paper is then shifted in the reverse direction and advanced one step to present a new surface to be written and printed upon.

The check issuing mechanism provided in the illustrated machine is of such a nature that either "straight" checks or "stub" checks may be issued from the machine. This mechanism is provided with manually controlled means for predetermining which kind of check is to be issued. Suitable electro-rolls are provided for printing any desired advertisements upon the issued checks as they are fed from the supply roll. When "straight" checks are to be issued, the platen associated with the check printing mechanism is rocked into engagement with the upper set of type characters provided on a series of type wheels but once during an operation of the machine. When "stub" checks are issued, the platen is operated twice to effect duplicate printing upon the issued check. A perforating mechanism is also provided for perforating the checks between the printing impressions effected thereon. A severing mechanism is also provided which severs the check after the printing and perforating operations have been effected thereon. Adjacent the item type carriers, associated with the check and slip printing mechanisms is a printing consecutive counter. This counter is operated each time the consecutive counter in the reel is operated so that it will correspond at all times therewith. Adjacent the counter wheels are a series of date printing wheels and adjacent the date printing wheels are two special type carriers which print respectively, the number of the machine and also the number of the store in which the machine is installed. All of these type wheels are provided with duplicate sets of type, the upper set of which being provided for printing upon issued checks, while the lower set thereof is provided for printing upon inserted sales slips. A platen cooperates with the lower set of type wheels for effecting printing upon inserted sales slips. This platen is operated twice during an operation of the machine to effect duplicate printing upon the inserted sales slips. Both the mechanism for printing upon inserted slips and that for printing upon issued checks are normally disconnected from the main operating mechanism. The check issuing mechanism is automatically rendered operative for cash and received on account and paid out transactions, while the slip printing mechanism is rendered effective for received on account and charge transactions. For all other transactions these mechanisms remain ineffective. A manual means is also provided to disable the check issuing mechanism for all operations of the machine when it is desired to operate that machine without this feature.

Mechanism is also provided in the illustrated machine for punching record cards. This mechanism is adjusted by the indicator differentials so that the data punched on the record cards will correspond with that indicated. Certain throw-out mechanisms are provided to disable the card punching mechanism for certain transactions, such as the no sale transaction. The card punching mechanism is also disabled during total printing operations of the machine.

The illustrated machine is provided with a two key single lock control mechanism comprising a control lever which is movable to seven positions of adjustment. The six upper positions, or all except grand total, are made accessible by a key in the hands of the store manager, and all positions including grand total are made accessible to an auditor by inserting a different key in the same lock. When this lever is in the uppermost position, the machine is conditioned to reset the consecutive counter provided in the reel and also that associated with the check and slip printing mechanism. When the control lever is moved to the next position, or open drawer position, the machine is conditioned for operation regardlessly of whether a cash drawer is open or closed. When the control lever is moved to the next position, or closed drawer position, the machine can be operated only when the cash drawers are closed.

When the control lever is moved to the next position, or the unlocked clerks' keys position, the individual locks associated with the clerks' bank of keys may be moved to ineffective position so that any one of the clerks' keys may then be depressed without first unlocking the same by the individual lock associated therewith. This position of the control lever is not a permanent position, but is simply provided to permit release of the clerks' keys; the control lever must then be moved to either closed drawer or open drawer position to condition the machine for operation. Suitable mechanism is also provided to retain the individual clerks' locks in either effective or ineffective position.

When the control lever is moved to lock register position, the entire machine is locked against operation. Suitable locking mechanism is also provided for locking the control lever in any one of its positions of adjustment with the exception of the unlocked clerks' keys position, which position it is remembered is simply a temporary one, and the further exception of the grand total position.

Frame work

The various parts of the machine are supported by a suitable frame work comprising a base casting 10 (Fig. 2), two main side supporting frames 11 and 12 and two intermediate supporting frames 13 and 14. These frames are fastened to brackets 15 attached to the base casting, by screws, rivets or any other suitable means. A plate 16 extending across the back of the machine is fastened to brackets 17 provided along the rear edge of each of the frames. This plate acts as a brace for all of the frames. The mechanisms contained in this machine are enclosed by a cabinet 18, which has hinged thereto a flat lid 19 so that access may be had to the printing mechanism for removing the printed record strip and also for replenishing the paper supply. The cabinet is also provided with suitable openings for receiving key sections and several of the control mechanisms as is clearly shown in Fig. 1.

Operating mechanism

Figure 3:
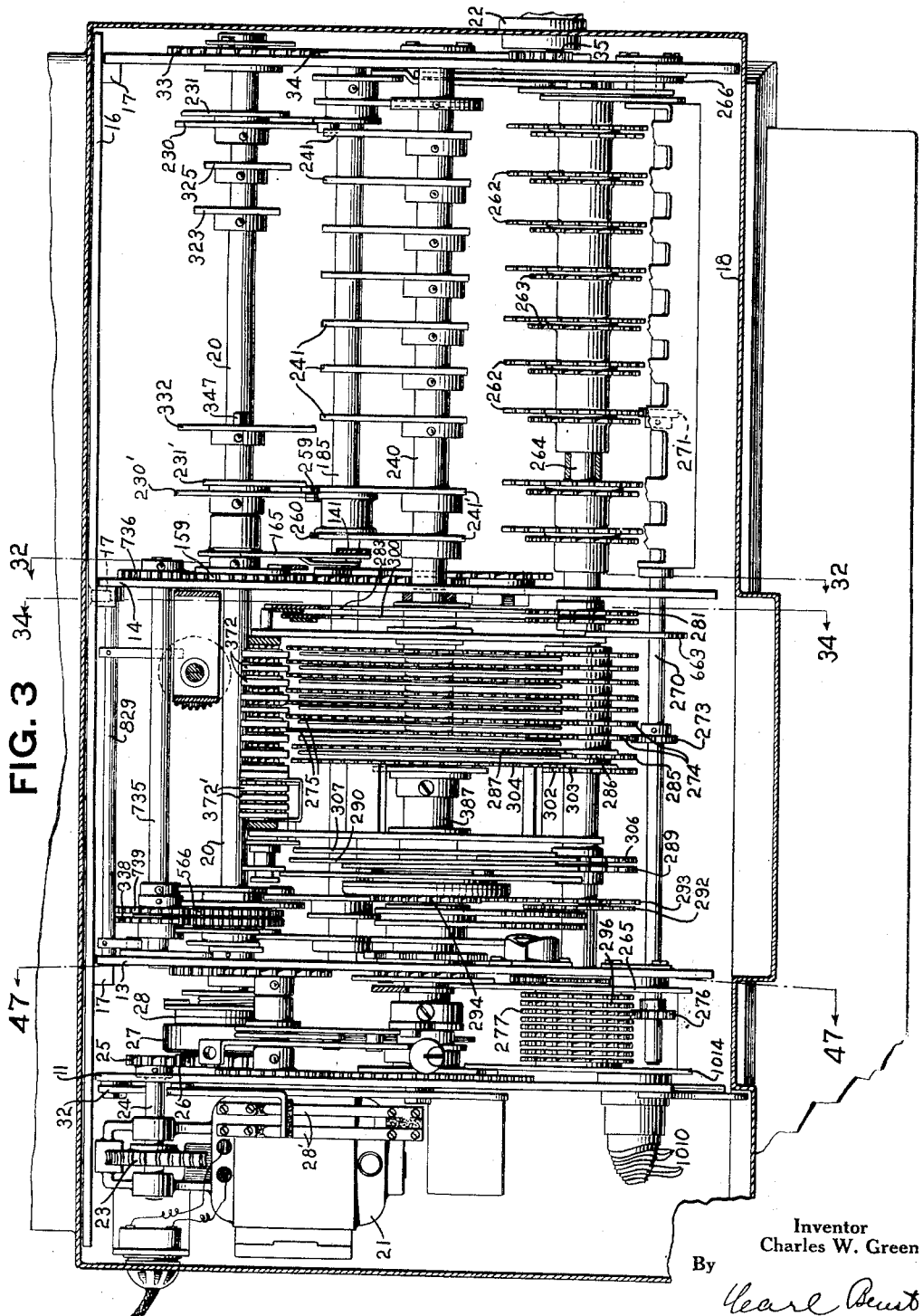
Fig. 3 is a plan view of the mechanisms located substantially below the mid-portion of the machine.

The power is imparted to various mechanisms of the machine by a main driving shaft 20 (Figs. 3 and 4), which is driven either by an electric motor 21 or a hand operated crank 22. Shaft 20 is given one complete rotation at each operation of the machine. As shown in Fig. 3 the usual reduction gearing, designated generally by reference character 23, is provided between the electric motor 21 and a short shaft 24. Shaft 24 extends through an enlarged opening in side frame 11 and carries a pinion 25 at the inner end thereof which meshes with a gear 26 attached to a flanged disc 27 of clutch 28. A cooperating clutch member 29 is fixed to the left-hand end of the main operating shaft 20 and operates within the flanged portion of disc 27 to cause the clutch members to drive shaft 20 when the motor is operated. The control mechanism for the motor switch 28' is also shown generally in Figs. 3 and 23. The clutch and the switch control mechanism associated with the electric motor 21 are of a well known type and will not be described in detail herein. For a full disclosure thereof reference may be had to United States Patent No. 1,144,418 issued June 29, 1915, to Charles F. Kettering and William A. Chryst. In order to cause operation of the motor, it is only necessary to rock an arm 30 (Figs. 4 and 23) out of engagement with plate 32' and notches (not shown) provided in the locking plates associated with the clutch and switch control mechanism. The mechanism for performing this function and also that for restoring arm 30 to normal position will be fully described hereinafter.

The electric motor 21 is mounted on a support 32 which is attached to side frame 11 by screws or bolts. This not only facilitates assembling of the parts but renders the motor assembly readily detachable from the machine.

Referring to Figs. 3 and 80 it will be seen that a pinion 33 is fixed to the right-hand end of shaft 20. This pinion meshes with a large idler gear 34 which gear in turn meshes with a smaller gear 35 which is driven by hand crank 22. Thus it is seen that mechanism is provided for driving shaft 20 either manually by crank 22 or automatically by electric motor 21. A suitable clutch mechanism is provided between hand crank 22 and pinion 35 which permits movement of gears 33, 34 and 35 without moving crank 22 when the machine is operated by the electric motor 21. Suitable mechanism is also provided to permit removal of crank 22.

*Keyboard*

Figure 5:
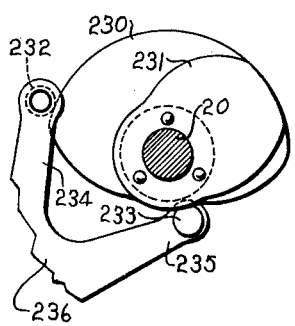
Fig. 5 shows the cams for operating the driving members for the amount differential segments.
Figure 6:
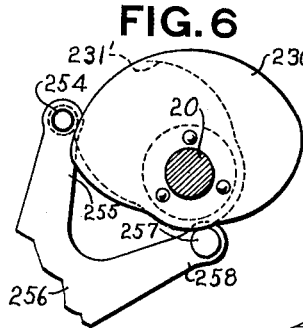
Fig. 6 shows the cams for operating the driving members for the clerks' and transaction differential segments.

The keyboard (Fig. 1) is comprised of seven banks of amount keys 40, one bank of clerks' keys 41, and one bank of transaction keys 42. A motor bar 43 is also provided for effecting release of the machine. Each bank of keys comprises a complete section which may be inserted in the machine or removed therefrom as a unit. The casting 44 (Figs. 27, 28, 30 and 31) forming the body of each of the key sections, is provided with notches 45 formed at either end thereof, which are received by a pair of parallel rods 46 and 47 (see also Fig. 27) journalled in frames 12 and 14. Rod 47 is provided with a flat surface 48 (Fig. 27) which permits the removal of the key sections from the machine. A lever 49 (Fig. 80) is fixed to the right-hand end of rod 47 and is positioned adjacent the outer side of frame 12. Thus, it is seen that in order to remove or insert the key sections in the machine, lever 49 is moved downwardly to the dotted line position shown in Fig. 5, thereby bringing the flat surface 48 of rod 47 adjacent the inner ends of the lower notches 45. The sections may then be lifted from the supporting rods. When the lever 49 is moved to the dotted line position shown in Fig. 80 a portion thereof extends beyond the front extremity of the cabinet and the cabinet obviously cannot be placed on the machine until lever 49 is moved to the full line position. A stud 50 acts as a stop for the lever 49 in the dotted line position. The parts are arranged in this manner to prevent the placing of the cabinet on the machine until the key sections are locked in place. To lock the key sections in position, the lever 49 is simply moved to the full line position shown in Fig. 5 which movement rotates rod 47 to the position shown in Fig. 27 thereby bringing the flat surface 48 thereof out of alinement with the inner end of the notches.

Figure 28:
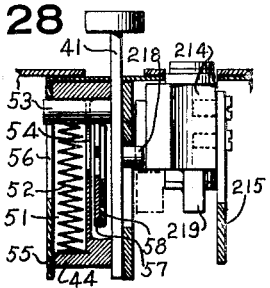
Fig. 28 is a sectional view taken on line 28—28 of Fig. 27.
Figure 29:
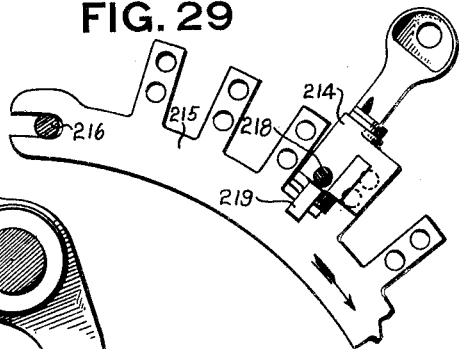
Fig. 29 is a detail view of a portion of the plate for supporting the individual locks for the clerks' keys.
Figure 31:
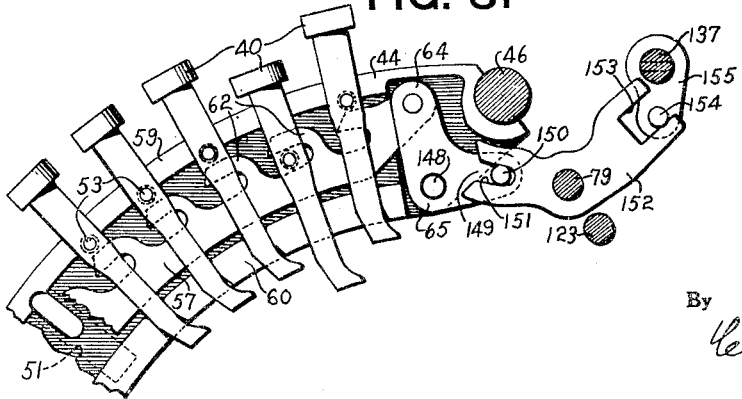
Fig. 31 is a view of the same parts during an operation of the machine.

Referring more particularly to Figs. 9, 28 and 31 it will be seen that each key section casting 44 is provided with a plurality of radial depressions 51 each of which receives a key restoring coil spring 52. A pin 53 carried by each key stem extends through an opening 54 provided in the wall of the casting and rests upon the spring associated therewith. These pins are thus effective to compress their respective springs when the keys are depressed. A side plate 55 is attached to each casting 44 for the purpose of retaining all of the springs 52 in position with their respective depressions. This plate is also provided with a series of radial guide slots 56 (Figs. 9 and 28) which receive the ends of pins 53 to prevent any lateral movement thereof during movement of the keys. The other side of each casting 44 is formed with an elongated depression for receiving the detent plate 57 (Figs. 23 and 28) and the segmental cam plate 58 associated with its related bank of keys. The flanged portions 59 and 60 respectively of the casting 44 are formed with radially alined notches for guiding the keys during their reciprocating movement. A differential latch detent plate 61 (Fig. 10) is fastened to the flanged portions of each casting by screws 62 and thus the keys, as well as the associated detent and segmental cam plates, are retained in proper position. Each casting 44 is also formed with depressions near the upper and lower ends thereof for receiving certain levers connected with the detent and segmental cam plates 57 and 58 respectively.

The type of keyboard embodied in this machine is that commonly known as the flexible type; that is, when a key is depressed in any one of the banks the remaining keys in that bank are not locked against operation but any one may be operated with the result that the initially depressed key is restored to normal position by its associated spring. The construction and operation of the mechanism for permitting such action of the keys is the same in all of the banks of keys so that a description of one will suffice for all. For the purpose of illustration, a description of the mechanism associated with an amount bank of keys will be given.

Referring to Figs. 9, 10, 17, 23 and 31 it will be seen that the detent plate 57 is provided with a plurality of hook-shaped portions 57' (Fig. 17) one for each key. Each portion 57' is provided with an inclined cam face 63 positioned immediately beneath a pin 53 provided on its associated key. The upper end of the detent plate 57 is pivoted to the substantially vertical arm 64 of a bell crank lever 65, while the lower end thereof is pivoted to a lever 66 (Fig. 10) which is pivoted intermediate its ends on a stud 67 provided in the casting 44. A spring 68 is attached at one end to the inner end of lever 66 and at its other end to a projection 69 (Fig. 9) provided on key spring retaining plate 55. It is, therefore, clear that when a key is depressed detent plate 57 will be cammed upwardly against the tension of spring 68 until pin 53 has cleared the cam face 63 when the spring 68 will restore the detent plate 57 to normal position. The pin 53 of the depressed key will thus be engaged by the hooked portion of its corresponding detent and consequently the key will be held in depressed position. It is obvious that when another key in the bank is depressed the detent plate 57 will again be moved upwardly thereby freeing the previously depressed key, which is then immediately restored to normal by its spring 52, and the second key is retained in depressed position in the manner just stated.

The segmental cam plate 58 is pivoted at its lower end to lever 70 which also is pivoted on stud 67. A spring 68' is connected at one end to the inner end of lever 70 and at the other end to projection 69 of key spring retaining plate 55. The upper end of plate 58 is pivoted to the substantially vertical arm 71 of zero stop pawl 72 pivoted at 73. Cam plate 58 is provided with a series of inclined cam faces 58', one for each key which are located adjacent their respective pins 53 as shown in Figs. 10, 15, 16 and 17. Thus, it is clear that, when a key in any bank is depressed, both detent plate 57 and cam plate 58 associated therewith will be moved upwardly. When pin 53 moves past cam 63, the detent plate 57 will be restored to normal position by spring 68, but cam plate 58 will be held in its operated position by pin 53 and will remain in this position until the depressed key is restored to normal position, when its associated spring 68' will restore it to normal position.

In all transactions with the exception of the no sale transaction, it is necessary to depress a key in each of the groups and also the motor bar in order to release the machine for operation. For no sale transactions, however, it is only necessary to depress the no sale and a clerk's key, together with the motor bar, to effect release of the machine. Mechanism is also provided to compel the depression of an amount key before a clerk's key can be depressed for transaction. Mechanism is also provided for locking the no sale key against operation when an amount key has been depressed and also for locking the amount keys against operation when the no sale key has been depressed. The mechanisms for accomplishing these functions will now be described in detail.

Each segmental cam plate 58 associated with the amount banks of keys as has been pointed out is pivoted to the upper arm 71 of its associated zero stop pawl 72 as shown in Figs. 13 and 17. This pawl is provided with a depending arm 74 which is adapted to effect disengagement of the differential latch from its driver when no key in a bank has been depressed. The pivot 73 of pawl 72 extends only through the differential latch retaining plate 61. A rearwardly extending arm 76 of this pawl engages a pin 77, provided on an arm 78 fixed to a rod 79, which is journaled in side frames 12 and 14. As is clearly shown in Fig. 22 there is a similar arm 78 fixed to rod 79 for each bank of amount keys. Rod 79, near the left-hand end thereof has pinned thereto, a two-arm lever 80, as shown in Figs. 14 and 22. When an amount key 40 is depressed the segmental cam plate 58 associated therewith will be moved upwardly, thereby rocking zero stop pawl 72 on its pivot 73, thus removing the depending arm 74 from the path of movement of its associated differential segment. By this action rod 79 will be rocked in a counterclockwise direction, as viewed in Fig. 17, which movement is imparted to lever 80, which lever it will be remembered is also fixed to rod 79. The upper arm of lever 80 carries a pin 81 which is adapted to engage a projection 82 provided on a release arm 83 loosely mounted on rod 79. Release arm 83 is provided with a rearwardly extending projection 84 which normally lies in the path of movement of the upper arm 85 of a two-arm detent 86 pinned to shaft 123 (Fig. 14). It is therefore clear that when lever 80 is rocked in the manner aforesaid, pin 81 will engage projection 82 on release arm 83 thereby rocking the latter in a counterclockwise direction to bring the rearwardly extending projection 84 thereon out of the path of arm 85. All of the arms 78 provided on shaft 79 are moved in a counterclockwise direction upon the depression of a key in any one of the amount banks, and accordingly no further rocking of rod 79 will occur when the keys of the other amount banks are depressed.

Figs. 14, 15, 19, 20 and 22 show the mechanism associated with the transaction bank of keys. By reference to these figures it will be seen that the upper end of segmental cam plate 58 associated with this bank of keys is pivoted to the substantially vertical arm 87 (Fig. 20) of bell crank lever 88; bell crank lever 88 being pivoted on a collar 88' mounted on the supporting stud 89 (Fig. 18) fixed to plate 61. The substantially horizontal arm 90 (Fig. 20) of bell crank 88 carries a pin 91 which engages in an open slot 92 provided in the forward end of a release arm 93 pivoted on rod 79. Release arm 93 is provided with a rearwardly extending projection 94 which normally lies in the path of movement of the upper arm 95 (Fig. 14) of detent 96 which detent is also pinned to shaft 123. Thus, it is seen that when a transaction key is depressed, the pin 97 carried thereby will engage its corresponding cam face 58' provided on plate 58 and will cam the latter upwardly thereby rocking bell crank 88 in a clockwise direction which in turn will rock release arm 93 in a counterclockwise direction bringing the rearwardly extending projection 94 thereon upwardly and out of the path of movement of arm 95 of detent 96. A similar mechanism is also associated with the clerk's bank of keys. The segmental cam plate 58 (Figs. 16 and 22) associated with the clerk's bank of keys is pivoted to the upper arm 98 of bell crank lever 99 (Fig. 16) at 100. The substantially horizontal arm 101 of bell crank lever 99 carries a pin 102 which engages in slot 103 provided in the forward end of release arm 104. A rearwardly extending projection 105 is provided on release arm 104 which normally lies in the path of movement of the upper arm 106 (Fig. 14) of a detent 107 which is also fixed to shaft 123. Thus, it is seen that when a clerk's key is depressed, bell crank 99 will be rocked in a clockwise direction, thereby rocking release arm 104 in a counterclockwise direction to bring projection 105 out of the path of the upper arm 106 of detent 107.

The mechanism for compelling a sequence of operation between the keys and also the interlock between the amount keys and the no sale key will now be described. Referring particularly to Figs. 14, 15, 16, 18 and 22, it will be seen that lever 80 is provided with a forwardly extending arm 108 which is positioned adjacent a foot 109 provided at the rearward end of a plate 110. Plate 110 is pivoted at its upper end to the substantially vertical arm 118 of bell crank lever 119 and at its lower end to an arm (not shown) pivoted on a stud fixed to plate 61. As shown in Fig. 18, plate 110 lies adjacent the outer side of plate 61. Thus, it is seen that when arm 80 is rocked, upon depression of an amount key, arm 108 will be moved in the path of the inner end of foot 109 provided on plate 110 and obviously plate 110 is locked against operation. It will be noted that plate 110 is provided with a series of radial slots 111 positioned immediately beneath pins 97 on all transaction keys with the exception the no sale key. An inclined cam slot 112 (Fig. 15) is formed in plate 110, the upper end thereof lying beneath the pin 97 extending from the no sale key. Therefore, when the no sale key is depressed pin 97 thereon will move plate 110 upwardly with the result that foot 109 will be brought beneath the arm 108 of lever 80, thereby locking the amount keys against operation.

In order to compel the depression of an amount key or a no sale key before a clerk's key can be depressed, a bail 113, shown in Figs. 14, 15, 19 and 22 is provided. Bail 113 is pivoted on shaft 123 to which are fixed the detents 86, 96, and 107, previously described. Release arm 83 is provided with a pin 114 which is adapted to engage an arm 115 provided at the left-hand end of bail 113. Attached to release arm 104, as shown in Figs. 14, 16 and 22 is a lock arm 116. This arm is adapted to cooperate with arm 117 provided at the right-hand end of bail 113. Thus, it is seen that when an amount key is depressed, release arm 83 will be rocked in a counterclockwise direction as aforesaid causing pin 114 to rock bail 113 in a counterclockwise direction, thereby removing arm 117 from engagement with lock arm 116. A clerk's key may now be depressed. In order that the depression of a no sale key may permit the depression of a clerk's key the following mechanism is provided. As stated before plate 110 is pivoted to the upper arm 118 of bell crank lever 119 at 120. The rearwardly extending arm 121 of bell crank lever 119 is adapted to engage a pin 122 provided at the forward end of release arm 83. Thus, it is seen that when a no sale key is depressed plate 110 will be moved upwardly thereby causing bell crank lever 119 to also rock ball 113 in a counterclockwise direction to remove the arm 117 thereof from engagement with lock arm 116.

From the construction of parts just described, it is clear that when a key in each of the banks is depressed, the release arms 83, 93 and 104 are rocked out of the path of movement respectively of arms 85, 95 and 106 of their respective detents, which it will be remembered are pinned to shaft 123. Mounted on shaft 123 in close juxtaposition to the inner side of side frame 12 is an arm 124, as shown more clearly in Figs. 23 and 25. The upper portion of arm 124 is provided with an open slot 125 which receives a pin 126 provided on link 127. Link 127 is pivotally supported by arms 128 and 129 pivoted respectively on studs 130 and 131 provided in side frame 12. Fixed to motor release bar 43 is a plate 43' slidably mounted on studs 132 as shown in Fig. 23. A roller 133 provided at the lower end of plate 43' normally engages a foot 134 provided at the lower end of link 127. Thus, it is seen that when the motor bar 43 is depressed roller 133 will be moved out of engagement with foot 134 and spring 135 will move link 127 downwardly if shaft 123 has been released in the manner hereinbefore described. A depending arm 136 is fixed to a shaft 137, which shaft is also journaled in side plates 12 and 14. A hook member 138 pivoted on shaft 79 normally engages the lower end of arm 136 as shown in Fig. 25. Also fixed to shaft 137 is a substantially horizontal arm 139 having pivoted to the outer end thereof at 140, a spring urged link 141. The lower end of link 141 is provided with a slot 142 which receives a pin 143 attached to the forward end of an arm 144. Arm 144 is fixed to shaft 145 which, it will be remembered, has also fixed thereto the arm 30 which normally engages the locking plates associated with the clutch and motor switch control mechanism as shown in Fig. 23. Thus, it is seen that when a key in each of the banks has been depressed, or the no sale key and a clerk's key for no sale transactions, and the motor bar 43 is depressed, roller 133 will be moved out of the path of projection 134 and spring 135 will move link 127 downwardly to the position shown in Fig. 24. By this action, shaft 123 will be rocked in a counterclockwise direction, thereby carrying arm 124 with it. Pin 126 on link 127 will then engage cam face 146 (Fig. 25) provided at the upper side of hook 138, thereby disengaging hook 138 from arm 136. Spring 147 attached to link 141 will then move the latter upwardly thus rocking shaft 145 in a clockwise direction as viewed in Fig. 23, to remove arm 30 from locking engagement with plate 32', with the result that the switch control mechanism will close the electric motor switch and cause the motor to drive shaft 20 through the connections previously mentioned.

Figure 30:
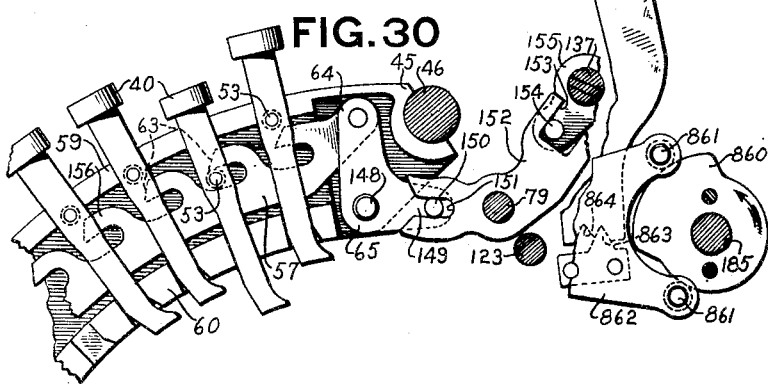
Fig. 30 is a detail view of a key section showing the position assumed by the detent plate and its associated parts after a key has been depressed.

Referring to Figs. 30 and 31 it will be seen that the detent plate 57 associated with each bank of keys as was pointed out hereinbefore, is pivoted at its upper end to the substantially vertical arm 64 of bell crank lever 65. Bell crank 65 is pivoted on a stud 148 provided in the key section casting 44 as shown in Figs. 13 and 15. The substantially horizontal arm 149 of bell crank lever 65 carries a pin 150 which engages in slot 151 of the substantially horizontal arm of a lever 152 pivoted on shaft 79. The rearwardly extending arm of lever 152 is provided with an enlarged open slot 153 which receives a pin 154 provided on an arm 155 fixed to shaft 137. The enlarged slot 153 is provided to permit relative movement between the keys and shaft 137 before the machine has been released for operation. From the above description, it is clear that when link 141 (Fig. 23) is moved upwardly by spring 147, shaft 137 will be rocked in a counterclockwise direction and, obviously, through the connections just described, bell crank lever 65 will be rocked in a counterclockwise direction about its pivot 148, thereby moving detent plate 57 downwardly. By this movement each detent 62 will further embrace its related pin 53 associated with the key depressed in that bank and at the same time the flat surfaces 156 (Fig. 30) provided at the top of each detent will be brought beneath the pins 53 of the unoperated keys, thereby positively locking the latter against operation. Fig. 31 shows the above described parts in operated position.

Referring to Figs. 23 and 24, it will be seen that link 127 carries a pin 157 near the upper end thereof. This pin lies in the path of movement of arm 136 but is spaced therefrom to permit downward movement of link 127 to cam hook 138 out of engagement with arm 136. From the foregoing description, it is seen that immediately upon disengagement of hook 138 from arm 136, spring 147 will rock shaft 137 in a counterclockwise direction, causing arm 136 to engage pin 157 and thereby move link 127 upwardly. Since pin 126 of link 127 projects into slot 125 of arm 124, shaft 123 will be rocked in a clockwise direction, when link 127 is actuated by arm 136 in the manner just described. When this occurs it is obvious that abutment 134 will be moved clear of the path of movement of roller 133 and spring 150 will restore the motor bar 43 to normal position, thereby bringing roller 133 into engagement with abutment 134 of link 127 as is shown in Fig. 23.

Referring to Figs. 23 and 32, it will be seen that a pinion 159 is fixed to driving shaft 20. Pinion 159 meshes with an idler gear 160, which in turn meshes with a gear 161 fixed to an intermittent gear 162. Intermittent gear 162 carries a pin 163 which normally occupies a position a short distance below the lower arm 164 of a two-arm lever 165 (Fig. 23), which is loosely pivoted on shaft 20. The upper arm 166 of lever 165 is provided with an open slot 167 at its forward end which receives a pin 168 extending laterally from link 141. Intermittent gear 162 is driven in the direction of the arrow, shown in Fig. 23, and from the arrangement of the parts just described it is clear that near the end of a complete rotation of gear 162, pin 163 will engage arm 164, thereby rocking the same downwardly. By this action, arm 165 will move link 141 downwardly against the tension of spring 147. These parts are so constructed that by the engagement of pin 163 with arm 164 in this manner, rod 137 will be rocked in a clockwise direction substantially 20° beyond its normal position. When the parts have been thus moved, pin 163 will have moved out of engagement with arm 164 and spring 147 will restore the parts to normal position. By this movement of rod 137 beyond normal, the pins 154 provided on arms 155 shown in Figs. 30 and 31 will move across the slots 153 of their related levers 152. When pin 154 engages the left-hand wall of said slots, levers 152 will be rocked in a counter clockwise direction thereby rocking their associated bell crank levers 65 in a clockwise direction with the result that all of the detent plates 57 will be moved upwardly beyond their normal position to free the pins 53 from their respective detents 62 and the springs 52 will then restore the depressed keys to normal position. When link 127 was elevated by arm 136 and held in its upper position by engagement of its lower end with roller 133, spring 169 rocked hook 138 in a counter clockwise direction so that the end of arm 136 reengaged the end of the hook when link 141 was drawn downwardly and released, thereby locking link 141 in normal position as shown in Fig. 23. A slot 142 provided at the lower end of link 141 permits a small movement of the link without a corresponding movement of lever 44.

Referring to Fig. 23 it is seen that a spring urged arm 170 is pivoted on a stud 171 located above the main driving shaft 20. A projection 172 provided at the lower end of arm 170, engages in a notch 173 provided in a cam 174. A pivoted locking pawl 175 is connected to arm 170 by a link 176. Locking pawl 175 is adapted to engage an arm 177 fixed to shaft 123 when the machine is operated by motor 21 or crank 22. The cam 174 is so designed that immediately upon rotation of shaft 20 pawl 175 will be moved into engagement with arm 177 and thereby lock shaft 123 against movement during an operation of the machine, as would be the case if the motor bar 43 was held depressed during the operation of the machine. A spring 170' is employed to restore arm 170 and the parts connected thereto to normal position.

The locking elements above described are also adapted to be controlled by movement of the control lever 180 (Figs. 45, 47, 48 and 51) toward sub-total and grand total positions. In these figures it is seen that a pitman 181 is pivoted at its upper end at 182 to a substantially horizontal arm 183 fixed to shaft 123. The lower end of pitman 181 is bifurcated to straddle a collar 184 provided on shaft 185. A cam plate 186 is fixed to shaft 185 and is adjusted by control lever 180 in a manner which will hereinafter be described. Plate 186 (Fig. 48) is formed with a plurality of radial slots 187a, 187b, and 187c, provided at the lower side of arcuate portion 188 thereof. Two radial slots 189a and 189b are provided along the outer periphery of arcuate portion 188. Pitman 181 is provided with a stud 190 which is adapted to move into any one of slots 187 depending upon the position of the control lever. The purpose for which slots 187 are provided will be fully described hereinafter. A second stud 191 is formed on the same side of pitman 181 as is projection 190 and is spaced therefrom a distance equal to substantially the width of arcuate portion 188. Cam faces 192 are provided at each side of portion 188 and are adapted to engage studs 190 and 191 to move pitman 181 downwardly when the control lever is moved to certain positions of adjustments. When the control lever is in the lock register or the sub-total position, stud 191 will register with slot 189a and when it is in grand total position, stud 191 will register with the slot 189b. It is seen from the construction of the parts just described that when the control lever is moved to lock register, subtotal or grand total position, pitman 181 is moved downwardly by the engagement of stud 190 with the inner cam face 192. This movement of pitman 181 rocks shaft 123 in a clockwise direction, thereby moving arm 124, Figs. 23, 24 and 25, in a clockwise direction so that the left-hand side thereof will assume a position beneath pin 126 provided on link 127. Upon movement of shaft 123 in this manner the lower arms 193, 195 and 196 (Fig. 14) of detents 86, 96 and 107, are brought into engagement with projections 194, 197, and 198 of release arms 83, 93, and 104, respectively, thereby locking all of the keys against operation. Upon depression of motor bar 43 (Fig. 23), link 127 will be moved to the left in the manner described heretofore, causing pin 126 carried thereby to move along the upper side of arm 124 and at the same time releasing hook 138 from engagement with arm 136 in the manner described hereinbefore. When hook 138 moves out of engagement with arm 136, spring 147 will urge link 141 upwardly with the result that arm 30 will be moved out of engagement with the motor switch control mechanism and the motor will again operate in the usual manner.

Mechanism is also provided to lock shaft 145 against movement until the totalizer reel has been properly positioned in bringing one of the totalizers and counters into printing position for a total taking operation.

The illustrated machine is also provided with mechanism for releasing any erroneously depressed keys before the machine has been released for operation. Referring to Figs. 1, 21, and 80, it will be seen that a lever 201 is pivoted on a stud 202 extending laterally from the outer side of supporting frame 12. Lever 201 carries a link 203 intermediate its ends, which is formed with an open cam slot 204. This cam slot also receives a pin 205 fixed to supporting frame 12. Near the rearward end of link 203 a hook 206 is provided, which is adapted to engage a pin 207 attached to the lower end of depending arm 208 fixed to rod 137. The lower end of lever 201 is formed with a hook 209 which is adapted to move into engagement with a depending arm 210 fixed to shaft 123. It will be noted from Fig. 1 that a portion of lever 201 extends through a slot 211 provided in cabinet 18. Thus it is seen that in order to release the keys the operator simply grasps lever 201 and draws the same forwardly. By this action link 203 will be cammed upwardly, bringing the hook 206 provided thereon into engagement with pin 207 (see Fig. 21) carried by arm 208. Upon further movement of lever 201 in this manner, shaft 137 will be rocked in a clockwise direction. By rocking shaft 137 in this manner, detent plate 57 (Figs. 30 and 31) for each bank of keys will be moved upwardly by the train of connections shown, to release any depressed keys from their detent 62. The key spring associated with each of the depressed keys will return the latter to normal position. At the same time, hook 209 (Fig. 21) will be moved into engagement with arm 210 and shaft 123 will be locked against movement. The concentric portion 203' provided at the outer end of link 203 permits movement of shaft 137 in a counter-clockwise direction during a normal operation of the machine and therefore locks the lever 201 against movement when the parts are out of normal position.

As shown in Figs. 1, 27, 28 and 29, it will be seen that the bank of clerks' keys is also provided with a series of individual locks 214 one for each key. These locks are provided to prevent, in normal operations of the machine, anyone but the authorized clerk from depressing his key.

These individual locks 214 are mounted on a plate 215 which is slidably supported on a pair of studs 216 and 217 (Fig. 27) provided near the top and bottom, respectively, of the differential latch retaining plate 61 associated with the clerk's bank of keys. Each lock 214 is attached to plate 215 by screws or other suitable means so that when it is desired to change a lock for some reason, it may be readily removed from plate 215 and another lock placed thereon. As shown in Fig. 28, each clerk's key 41 is provided with a laterally extending pin 218 which normally engages a projection 219 attached to the bolt of its corresponding lock. Thus in order to release his key the clerk simply inserts a key in the lock and rotates the bolt thereof to move the projection 219 out of the path of pin 218 attached to a respective key 41. Mechanism is also provided whereby the proprietor or other authorized person may release all of the clerks' keys upon movement of the control lever 180 to one of its positions of adjustment. The mechanism for performing this function will be fully described hereinafter.

During rush hours it may be desirable to hold the motor bar 43 in depressed position so that it will only be necessary to depress a key in each group to release the machine for operation. To this end a lever 220 shown in Figs. 1, 44 and 45 is provided. This lever is pivoted on a stud 221 attached to the side frame 12, of the machine. The lower end of lever 220 is provided with a projection 622 which is adapted to engage in a notch 623 formed near the left end of the plate 43' attached to motor bar 43. The upper portion of lever 220 extends through a slot 224 provided in the top of the cabinet as shown in Figs. 1 and 44. It, therefore, is clear that by simply drawing lever 220 forward after the motor bar 43 has been depressed, projection 622 will enter notch 623 in plate 43' and the motor bar will thus be held in depressed position. In total taking operations, however, it is not desirable to hold the motor bar in a depressed position. To this end mechanism is provided for releasing lever 220 and holding the same in inoperative position. This mechanism is operated upon movement of the transmission frame when the control lever is moved to either sub-total or grand-total positions. The mechanism for performing this function will also be fully described hereinafter.

*Differential mechanism*

Figure 7:
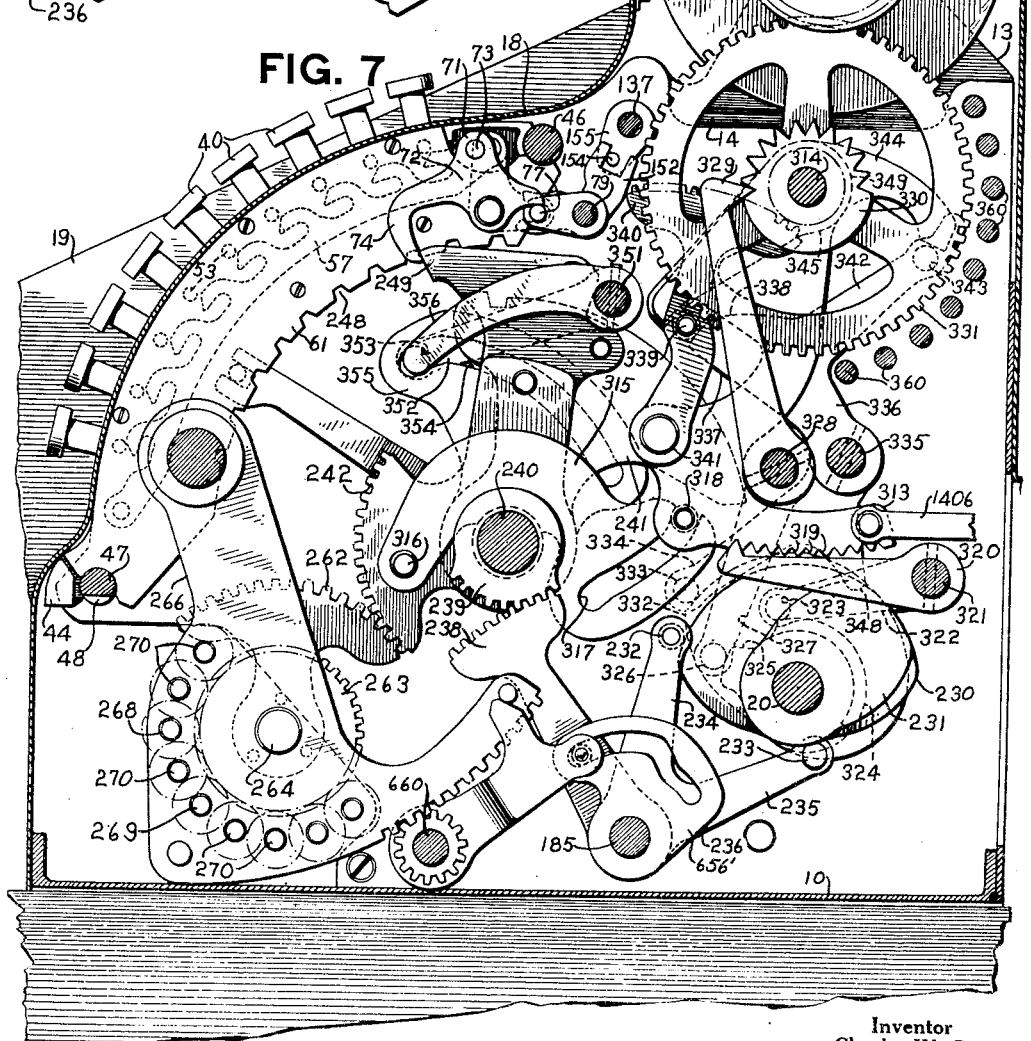
Fig. 7 is an elevational view taken on line 7—7 of Fig. 2.

The illustrated machine is provided with a mechanism for differentially positioning the various type carriers and actuating gears which is fully positive in operation. As shown in Figs. 3, 4, 5, 7, 8, 10 and 12, cams 230 and 231 are fixed to the main driving shaft 20 and cooperate with rollers 232 and 233 (Figs. 5, 7, 8, 10, and 12) provided, respectively, on arms 234 and 235 of a two-arm lever 236 loosely pivoted on shaft 185 (Figs. 7 and 10). Integral with lever 236 is a segmental gear 238 which meshes with a gear segment 239 fixed to shaft 240. Also fixed to shaft 240 is a series of driving segments 241, one for each bank of amount keys.

Figure 8:
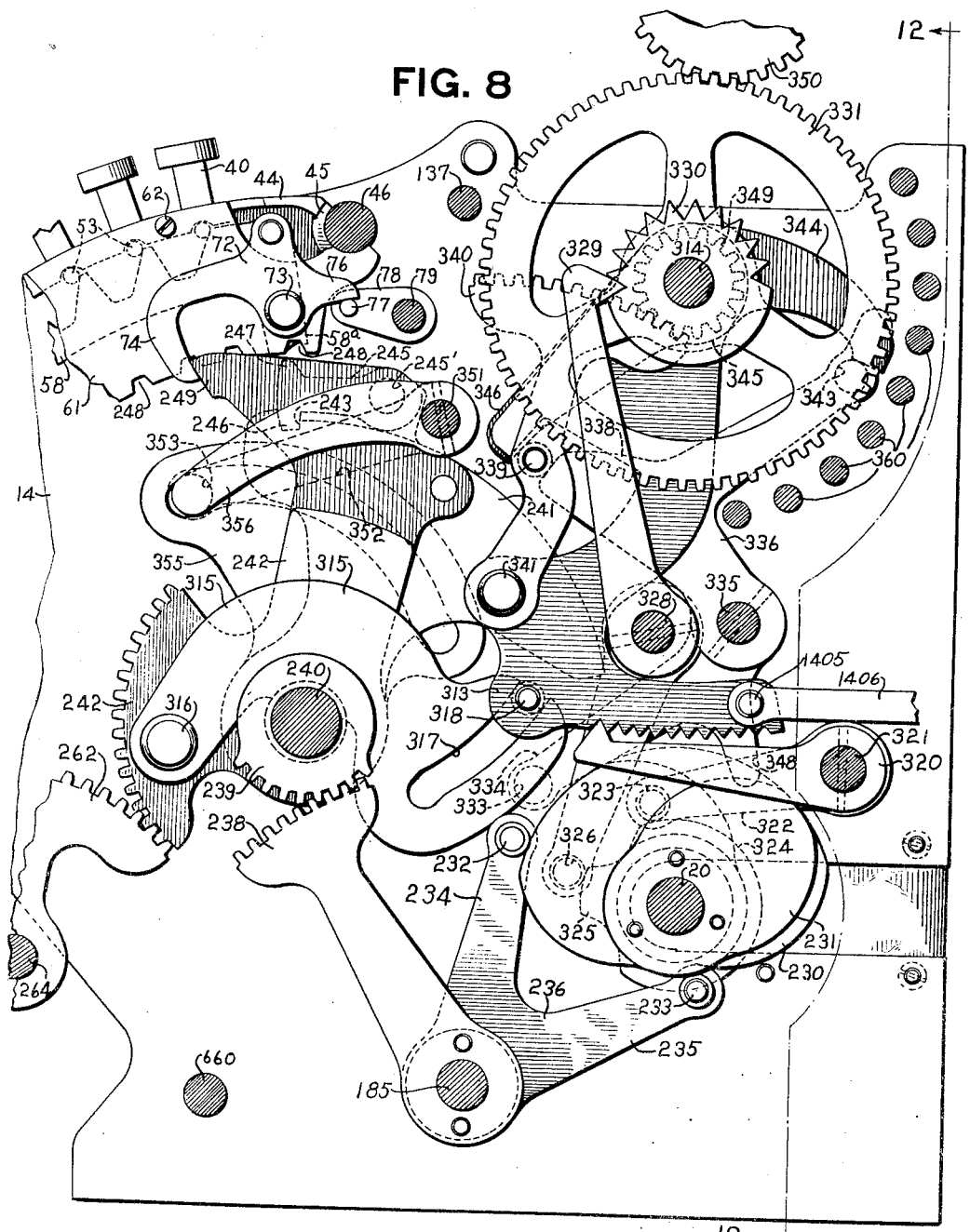
Fig. 8 is a partial elevational view showing the differential and indicator mechanisms and a portion of the key section.

Since the structure and operation of the driving segments and the differential mechanism associated therewith is the same for all of the amount banks of keys a description of the structure and operation of one will suffice for all. For the purpose of illustration, a description of the differential mechanism associated with the units bank of keys will be given. Loosely mounted on shaft 240 adjacent driving segment 241 is a differential segment 242. As will be seen in Fig. 10, a pawl 245 pivoted to the upper portion of differential segment 242 at 245' is provided with a depending projection 246 at the forward end thereof which normally engages in a notch 243 provided near the forward end of its related driving segment 241. The forward end of pawl 245 is also provided with a projection 247 which is adapted to engage in any one of a series of notches 248 provided on the corresponding differential latch retaining plate 61. Fig. 8 shows the parts in normal position. In this position it will be noted that nose portion 249 of differential segment 242 engages the depending arm 74 of the corresponding zero stop pawl 72. Thus, if no key in that bank is depressed, upon operation of driving shaft 20, cams 230 and 231 will rock lever 236 in a clockwise direction which, in turn, through segments 238 and 239 will rock the shaft 240 carrying all of the driving segments 241 in a counterclockwise direction. Immediately upon movement of shaft 20 as aforesaid, the differential segment 242 will be held against movement by the engagement of nose portion 249 thereof with the depending arm 74 of zero stop pawl 72 with the result that projection 246 (Fig. 10) of pawl 245 will be cammed out of the notch 243 in the segment 241, causing the upper projection 247 to enter into the first notch 248 in the differential latch retaining plate 61. The segments 241 continue their movement downwardly until they reach their limit of movement, after which the cams 230 and 231 will return the segments to their normal positions. It will be noted that the segments 241 are provided with a surface 244 (Fig. 10) which is concentric with shaft 240 and provided to engage beneath projection 246 of pawl 245 to positively retain the pawl in engagement with notch 248 during the invariable movement of the driving segment 241. Upon return of the driving segment to normal position, notch 243 will again register with projection 246 and pawl 245 will drop into engagement therewith by gravity. When, however, a key is depressed in an amount bank, the depending arm 74 of zero stop pawl 72 will be swung out of engagement with nose 249 and the driver 241 associated therewith will carry the differential segment 242 downwardly until stopped by the particular key depressed.

When a key is depressed, a foot 58A (Fig. 10) on the segmental cam plate 58 associated therewith, will close the first notch 248 which normally is adapted to receive projection 247 of pawl 245 when the machine is operated and no key in the bank has been depressed. The lower end of each key has a cam face 250 and the forward end of each latch pawl 245 has a notch 251. Thus, it is clear that when a differential segment 242 is moved downwardly by its driving segment 241, the notch 251 provided in the associated pawl 245 will engage the end of the depressed key and will be cammed upwardly, as shown in Fig. 10, causing the upper projection 247 of pawl 245 to enter in a notch 248 adjacent the depressed key. In this manner the differential segment 242 will be disengaged from its driver 241, and will be held in adjusted position by virtue of the engagement of projection 246 of latch pawl 245 with the concentric surface 244 of the driver 241. During the same operation of the machine, each driver 241 will be returned to normal position, thereby causing the projection 253 provided at the forward end thereof to engage the projection 246 of its associated pawl 245. By this action, projection 246 of pawl 245 will reenter notch 243 of its driving segment 241 and consequently, the associated differential segment 242 will also be returned to normal position. Thus, it is seen that during an item entering operation of the machine, the differential segments will first, be positively adjusted by their drivers a distance determined by the respective keys depressed, and then positively restored to normal position. Fig. 10 shows the parts associated with the pennies bank of keys in operated position when the five cent key has been depressed. The nose portion 249 of each differential segment 242 swings between a related retaining plate 61 and the key spring retaining plate 55 of the next adjacent key section. Thus, the differential segments are prevented from moving laterally.

The differential mechanism associated with the clerks' and transaction banks of keys is substantially the same as that associated with each of the amount banks with the exception that the drivers for the clerks' and transaction differential segments are not restored to normal position simultaneously with the restoration of the drivers for the amount differential segments. The clerks' and transaction banks of keys are not provided with zero stop pawls since the differential segments for these banks of keys will be operated for all transactions entered in the machine. For total taking operations the differential segments associated with the clerks' and transaction banks of keys will be held against movement by a mechanism which will be described hereinafter.

Referring to Figs. 3, 4, 6 and 11, it will be seen that cams 230' and 231' are provided for actuating the driving segments 241' for the clerks' and transaction differential segments 242. As will be seen in Fig. 6, these cams engage rollers 254 and 257 provided on arms 255 and 258 respectively of the two-arm lever 256. Lever 256 is also loosely pivoted on shaft 185. Integral with lever 256 are actuating segments 259 and 260 which mesh with gear segments 259' and 260' attached respectively to the drivers 241', see Figs. 11 and 12. Driving segments 241' are loosely mounted on shaft 240. Thus, it is seen that when shaft 20 is rotated, the driving segments 241' for the clerks' and transaction differential segments 242 will also be actuated to drive those segments the proper amounts. Cams 230 and 230' and their companion cams 231 and 231' are so designed that both the driving segments for the amount differentials and those for the clerks' and transaction differentials will be moved downwardly at substantially the same time. However, as was pointed out before, the clerks' and transaction drivers will remain in their operated positions for a certain period while the drivers associated with the amount differentials are restored to normal position. During a later period in the operation of the machine, the drivers 241' will also be restored to normal position which, in turn, will restore their respective differential segments also to normal position.

Figure 2:
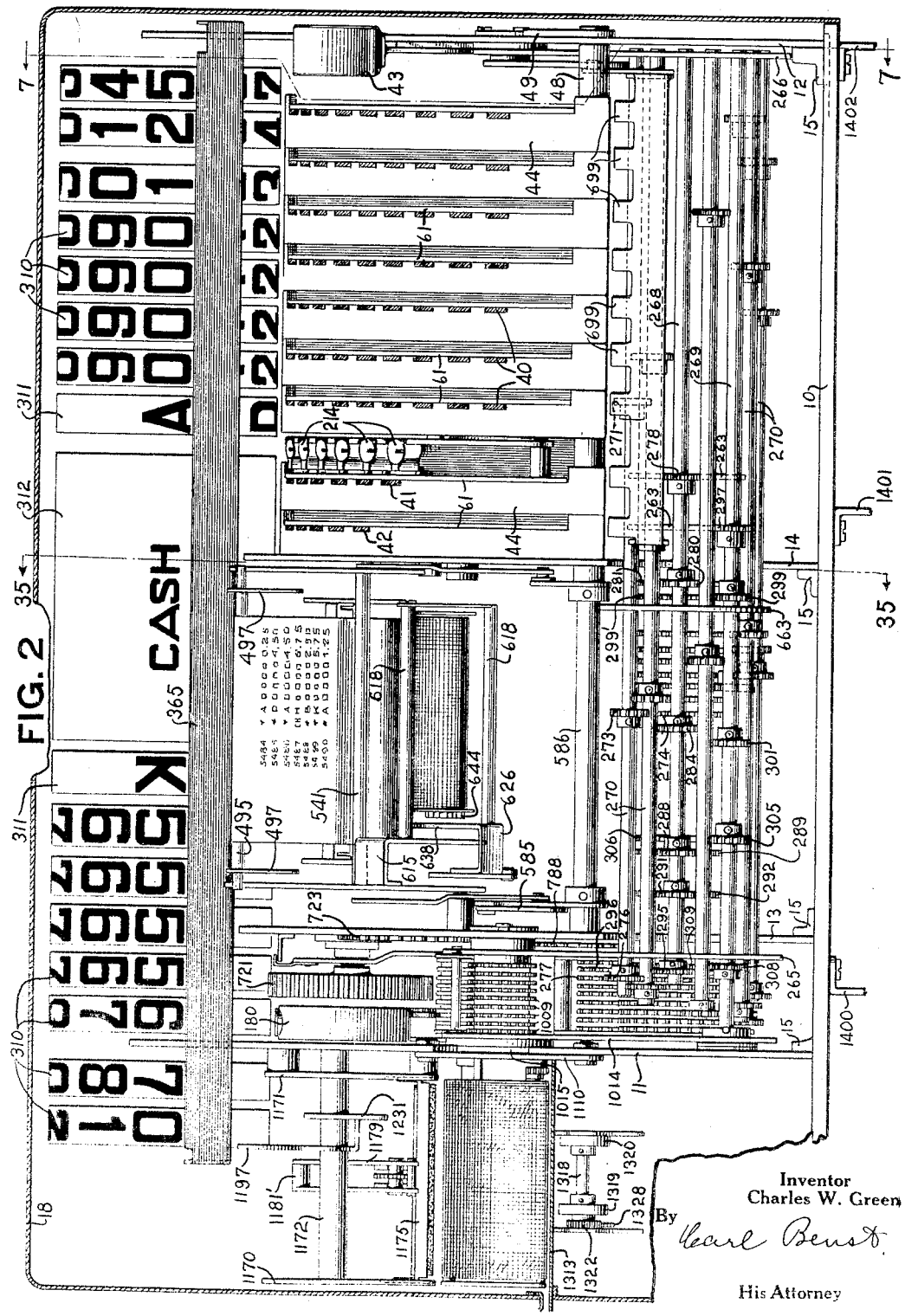
Fig. 2 is a front elevational view with the front portion of the cabinet removed, showig the general arrangement and location of various of the mechanisms contained in the machine.
Figure 11:
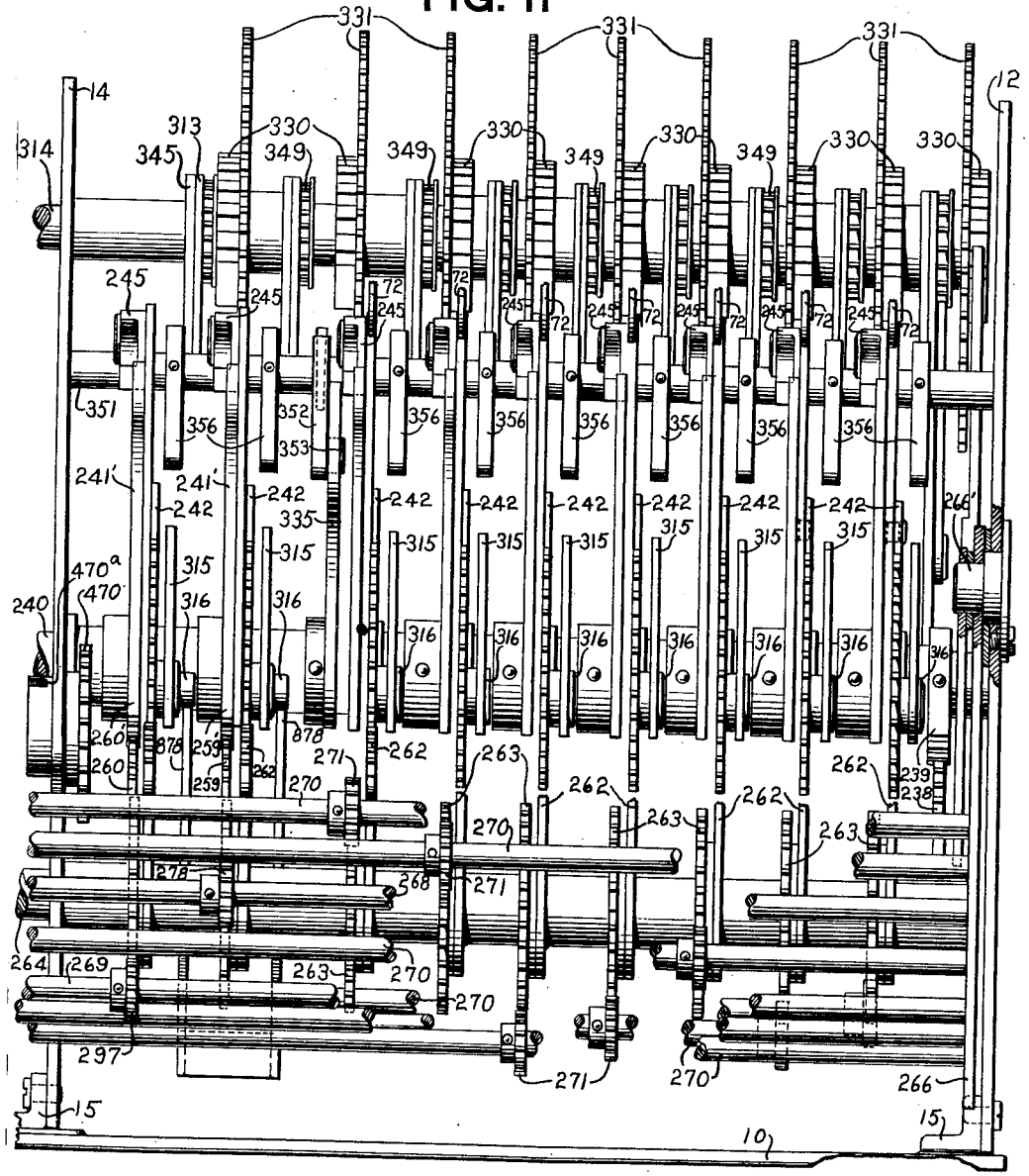
Fig. 11 is a partial front elevational view showing the differential mechanism and the associated transmission line.

Referring to Fig. 7 it will be seen that each differential segment 242 meshes with a segmental gear 262 which is fixed to a corresponding gear 263 loosely pivoted on a shaft 264 journaled in the frames 265, 266 and 1014 (Fig. 2). The transmission mechanism comprises nine shafts journaled in frames 265 and 266, which shafts are mounted in an arc about gears 263 (see also Figs. 45 and 47). Frames 265 and 1014 (Fig. 2) are pivoted around shaft 1012 (Fig. 47) while frame 266 is pivoted on a stud 266' (Figs. 7 and 45) fixed to supporting frame 12 (Fig. 2) and in axial alignment with shaft 1012. As shown in Figs. 2 and 11, it is seen that shaft 268 is provided to transmit motion from the differential segment associated with the clerk's bank of keys while shaft 269 is provided to transmit motion from the transaction differential segment. The shafts 270 of the transmission mechanism transmit motion from their respective amount differential segments 242 to the totalizers.

Referring to Figs. 2, 3 and 11, it will be seen that the top shaft 270 is that associated with the tens of thousands bank of amount keys. Pinned to this shaft is a pinion 271 (Fig. 11) which meshes with a gear 263 loosely mounted on shaft 264, which gear in turn, has a segment 262 fixed thereto which meshes with the differential segment 242 for the tens of thousands bank of keys. Spaced from pinion 271 is a second pinion 273 which is also pinned to shaft 270. This pinion meshes with a gear 274 similar to gear 263, and is also loosely mounted on shaft 264. Gear 274 meshes with a large gear 275 (Fig. 3) provided in the totalizer reel for adjusting the item type carriers and for actuating the totalizer element for the tens of thousands denominational order.

Spaced from pinion 273 is a third pinion 276 also pinned to the shaft 270 and meshing with a gear 277 loose on a sleeve 1016 (Figs. 47 and 53) provided on the shaft 264. The gear 277 meshes with a gear segment 1000 for positioning the type carriers for that denominational order in the check and slip printer.

Each shaft 270 associated with an amount differential segment 242 is provided with a similar set of pinions for actuating corresponding gears in the totalizer reel and the check and slip printing mechanism.

The shaft 268 (Fig. 2) associated with the clerk's differential segment 242 is provided with six small pinions fixed thereto. The first pinion 278 meshes with a gear 263 (Fig. 3) loosely mounted on shaft 264. Gear 263 has fixed thereto a segmental gear 262 which meshes with the differential segment 242 for the clerk's bank of keys. Spaced from pinion 278 on shaft 268 is a second pinion 280 also fixed to said shaft, which meshes with a gear 281, (Figs. 3 and 34) loosely mounted on shaft 264, which gear in turn meshes with gear segment 282 on the selecting plate 283 for selecting a clerk's totalizer for operation. Spaced from the pinion 280 is a third pinion 284 (Fig. 2) which meshes with a gear 285 (Fig. 3) loose on the shaft 264 which gear has fixed thereto a segmental gear 286 meshing with a large gear 287 for adjusting the clerk's item type carrier. Spaced from the pinion 284 (Fig. 2) is a fourth pinion 288 meshing with a gear 289 (Fig. 3) loose on the shaft 264 which gear in turn meshes with a gear segment 289' integral with a selector plate 290 for selecting a special clerk's counter for operation. Spaced from pinion 288 (Fig. 2) is a fifth pinion 291 meshing with a gear 292 (Fig. 3) loose on the shaft 264 which gear has fixed thereto a gear segment 293 meshing with a gear 294 associated with drawer selecting mechanism. Neither the special counter nor the drawer selecting mechanism is shown in this divisional case. Spaced from pinion 291 (Fig. 2) is a sixth pinion 295 which meshes with a gear 296 loose on the sleeve 1016 (Fig. 53), which gear in turn meshes with the gear segment 1000 for positioning the clerk's type carrier associated with the check and slip printing mechanism.

From the description of the above mechanism, it is clear that when gear 263 (Figs. 2 and 3) is adjusted by the clerk's differential segment 242, shaft 268 will be rotated which in turn will cause the pinions described to rotate and transmit the motion from the differential segment 242 to the mechanisms just described.

The shaft 269 associated with the transaction differential segment 242 has five pinions fixed thereto. The first pinion 297 meshes with a corresponding gear 263 loosely pivoted on shaft 264 which gear has fixed thereto a gear segment 262 which meshes with differential segment 242 for the transaction bank of keys. Spaced from pinion 297 is a second pinion 299 which meshes with a corresponding gear 299' loosely mounted on shaft 264, which gear in turn meshes with a gear segment integral with selector plate 300 (Fig. 3) for the transaction totalizers. Spaced from the pinion 299 (Fig. 2) is a third pinion 301 meshing with a gear 302 (Fig. 3) loose on the shaft 264 which gear has fixed thereto a gear segment 303 meshing with a gear 304 which adjusts the transaction item type carrier. Spaced from the pinion 301 is a fourth pinion 305 meshing with a gear 306 on the shaft 264, which gear meshes with a gear segment 307' on a selector plate 307 associated with the special counter related to the transaction totalizers. Spaced from pinion 305 is a fifth pinion 308 meshing with a gear 309 on the sleeve 1016 (Fig. 53) which gear meshes with the gear segment 1000 for adjusting the type carrier 1011 bearing the transaction characters and being associated with the check and slip printer.

Thus, it is seen that when an amount key, a transaction key, and a clerk's key are depressed and the machine operated, the movement of the differential segments associated therewith will be positively transmitted to the various selecting mechanisms of the machine through the transmission line just described. For total taking operations, the entire transmission line is swung out of engagement with the gears associated therewith by movement of the control lever to a total taking position. The mechanism for performing this function is fully illustrated and described in detail in the parent case.

It will be noted that the gears 287 and 304 (Fig. 3) for adjusting the checks and transaction type carriers respectively, have a diameter slightly less than the gears 275 adjacent thereto. The gears 287 and 304 are constructed so as not to interfere with the totalizer elements to the left of those which are adapted to be engaged by the gears 275.

Indicator mechanism

The indicators provided in the illustrated machine are of the drum type, and are arranged so as to display indicia corresponding to each key depressed at both the front and rear of the machine. The amount and clerks' indicators 310 and 311 respectively (Figs. 2, 4 and 12), are arranged in pairs and are simultaneously operated by mechanism which will be described in detail, hereinafter. One transaction indicator 312 is provided and is positioned between the front and rear indicators. This indicator is provided with two similar sets of transaction indicia, one for displaying at the front of the machine the indicia representing the kind of transaction entered in the machine and the other for displaying similar information at the rear of the machine.

Referring more particularly to Figs. 7, 8, 10, 11 and 12, it will be seen that there is one indicator differential segment 313 and associated mechanism for each bank of keys. Since the structure and operation of each is the same, a description of one will suffice for all. For the purpose of illustration, a description of the mechanism associated with the units order will be given.

Each indicator differential segment 313 is pivoted on a shaft 314 journaled in the main supporting frames 11, 12 and 14, and is differentially actuated by a beam 315 pivoted at 316 to a stud provided on a corresponding differential segment 242. A cam slot 317 is provided in the rearwardly extending portion of each beam 315 which receives a roller 318 provided at the lower forward end of a corresponding indicator differential segment 313. The lower edge of each segment 313 is provided with a series of serrations 319 (Figs. 7 and 8) which are adapted to be engaged by a corresponding holding pawl 320. Pawls 320 are pinned to a shaft 321 which is journaled in supporting frames 12 and 14. An arm 322 carrying a roller 323 at the forward end thereof is also pinned to shaft 321. A cam 324 fixed to the main driving shaft 20 engages roller 323 and is provided for the purpose of imparting a rocking movement to all of the arms 320 to engage them with their respective serrations 319, aforesaid, and thus positively hold segment 313 in adjusted position. Also pinned to shaft 20 is a cam 325 which engages a roller 326 provided at the lower end of an arm 327 fixed to a shaft 328, which shaft is also journaled in supporting frames 12 and 14. Also fixed to shaft 328 are a series of alining pawls 329 which are adapted to engage in the serrations provided in the alining wheels 330 attached to gears 331 for adjusting the indicator drums.

Figure 12:
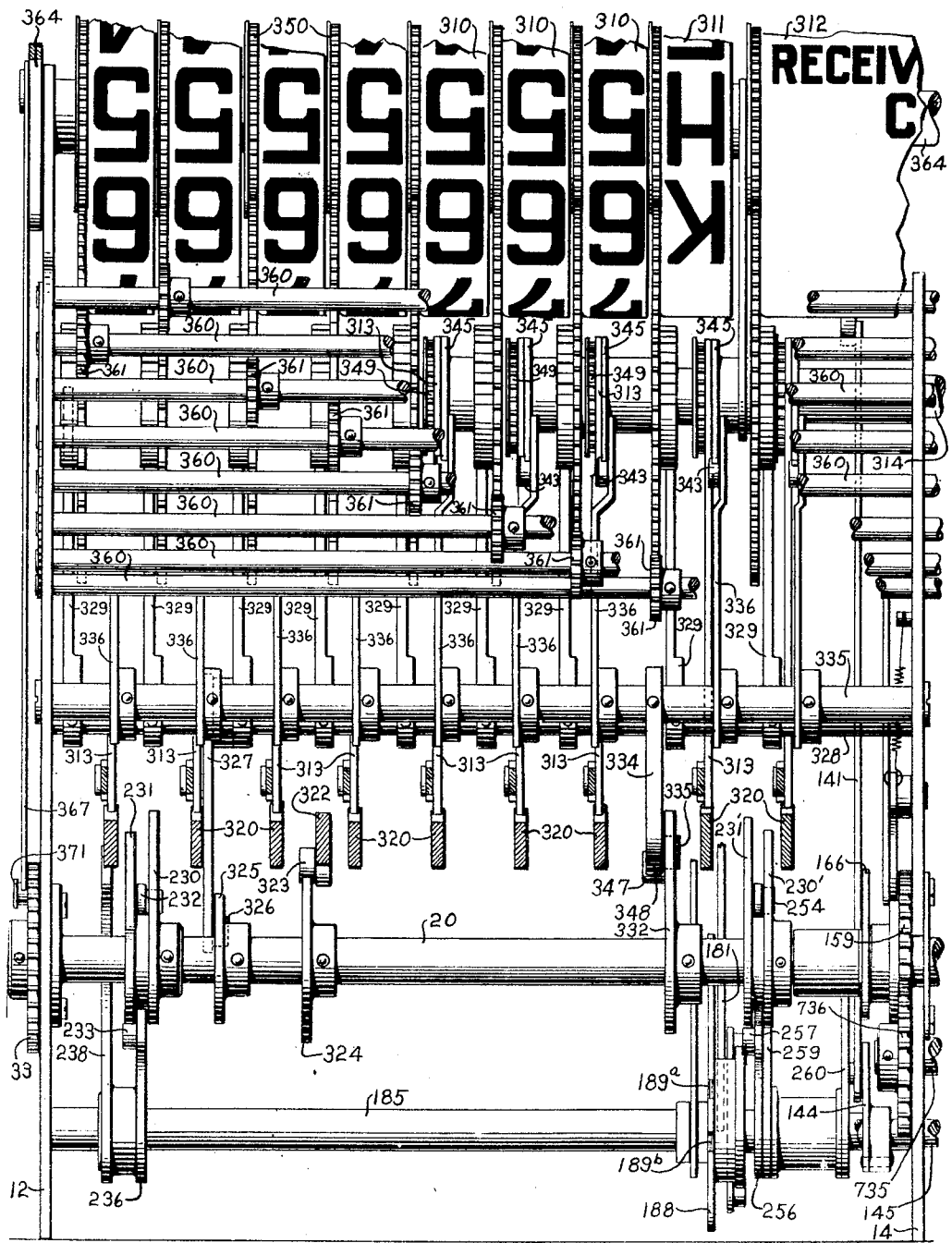
Fig. 12 is a partial rear elevational view showing the mechanisms located substantially to the rear of the differential mechanism.

As shown in Figs. 7 and 12, a cam 332 pinned to shaft 20 engages roller 333 provided at the lower end of an arm 334 pinned to a shaft 335, which shaft is journaled in supporting frames 12 and 14. Also pinned to shaft 335 are a series of two-arm levers 336, one for each indicator unit. The forward arm 337 of lever 336 is provided with a cam face 38 which is adapted to engage a pin 339 carried by a segmental gear 340. Segmental gear 340 is pivoted at 341 to its respective indicator differential segment 313. The upper rearwardly extending arm 342 of lever 336 carries a pin 343 which is adapted to be engaged by an arm 344 of a two-arm lever 345 loosely mounted on shaft 314. The forwardly extending arm 346 of lever 345 is adapted to also engage the pin 339 provided on segment 340.

The above described parts are so constructed and arranged that immediately upon rotation of shaft 20 a cut-away portion of cam 324 will register with roller 323 on arm 322 and thereby permit all of the alining pawls 320 to drop out of engagement with the indicator differential segments 313. At substantially the same time, or shortly thereafter, the differential segments 242 will be actuated by their respective segments 241 with the result that the beams 315 will be actuated in a counter-clockwise direction about shaft 240. By this movement each beam will be moved about shaft 240, as a pivot, a distance commensurate with the value of the particular key depressed. During this movement, cam 317 will actuate its corresponding differential segment 313 a corresponding amount. When the differential segments 313 are thus positioned, cam 324 will engage roller 323 and rock the alining pawls 320 into engagement with their respective indicator differential segments 313, thereby holding them in adjusted position. At substantially the same time that the holding pawls 320 are disengaged from the indicator differential segments 313, a pin 347 (Fig. 12) on the cam 332 will engage a tail 348 provided on arm 334 and will rock shaft 335 in a counterclockwise direction thereby bringing pin 343 out of engagement with arm 344 of lever 345. The indicator differentials may now be moved in either direction.

It is clear from the construction of the parts, that when they are in the position shown in Figs. 7 and 8, the indicators as well as the actuating parts are locked against operation due to the engagement of arms 344 and 346 of lever 345, with pins 339 and 343 and the engagement of the forward arms 337 of levers 336 with the pins 339. However, when each lever 336 is rocked to the position shown in Fig. 10, the corresponding two-arm lever 345 will be free to move, thereby permitting movement of the indicator differential segments 313 in either direction. Before the differential segments 313 have been thus positioned, cam 325 will have released roller 326 and thereby rock the indicator alining pawls 329 out of engagement with their respective alining wheels 330. Upon further operation of the main driving shaft 20 the cam 332 operating on the roller 333 attached to the lower end of lever 334 will rock the shaft 335 in a clockwise direction thereby causing the cam face 338 provided on lever 336 to engage pin 339 and rock segment 340 on its pivot 341. The gear segment 340 meshes with a pinion 349 (Fig. 10) attached to a corresponding large gear 331 (Fig. 7) which in turn meshes with a gear 350 attached to a corresponding indicator drum.

From the construction of the parts just described, it is seen that the pin 339 will occupy the same position at the end of each operation of the machine. In this manner the indicators will be positioned the proper amount. It will be remembered that when an indicator differential 313 is positioned in the manner aforesaid, it is locked in adjusted position by locking pawl 320. Thus, when the differential segment 242 associated therewith is returned to normal position the pivot point of beam 315 will be restored to normal position with the result that the beam will fulcrum about its corresponding pin 318 as a pivot, thereby moving the beam away from shaft 240.

At the beginning of a subsequent operation of the machine, it is necessary to restore the beams 315 to normal in order to properly position the indicator differentials to a new position. Restoration of the beams takes place simultaneously with the movement of the differential segments 242 after the locking pawls 320 have been moved out of engagement with their indicator differential segments 313. Thus, both movements are effected at substantially the same time with the result that the indicator differential is moved a distance corresponding to the resultant of the two movements of the beam, or the resultant of the movement of its corresponding beam 315 toward the shaft 240 and also of the movement thereof about shaft 240 as a pivot.

In order to restore the beams 315 into engagement with shaft 240 the following mechanism is provided:

Fixed to a shaft 351, Figs. 7 and 8, and journaled in side frames 12 and 14 is an arm 352 carrying a roller 353 at the forward end thereof which roller operates in a cam slot 354 provided in a segmental plate 355 fixed to shaft 240. Also pinned to shaft 351 are a series of curved arms 356, one for each beam 315.

From this construction it is seen that when shaft 240 is rocked counterclockwise, the cam plate 355 will rock the shaft 351 counterclockwise thereby bringing the end portions of arms 356 into engagement with the upper surface of their respective beams 315. At this time, it will be remembered, the indicator differential segments 313 have been released for operation and this motion is transmitted to the respective segments 313 by cam slot 317 acting on rollers 318 of each indicator differential segment. When shaft 240 is returned by rocking in a clockwise direction the arms 356 will be moved away from the beams and the latter are then permitted to again move away from the shaft 240 to permit the indicator differentials 313 associated therewith to remain in adjusted positions. By this construction it is seen that the indicators are positioned from one position to another without first returning them to a zero or starting position. This constructional arrangement obviously eliminates considerable stress on the parts and provides an efficient operating mechanism for the indicators.

Figure 4:
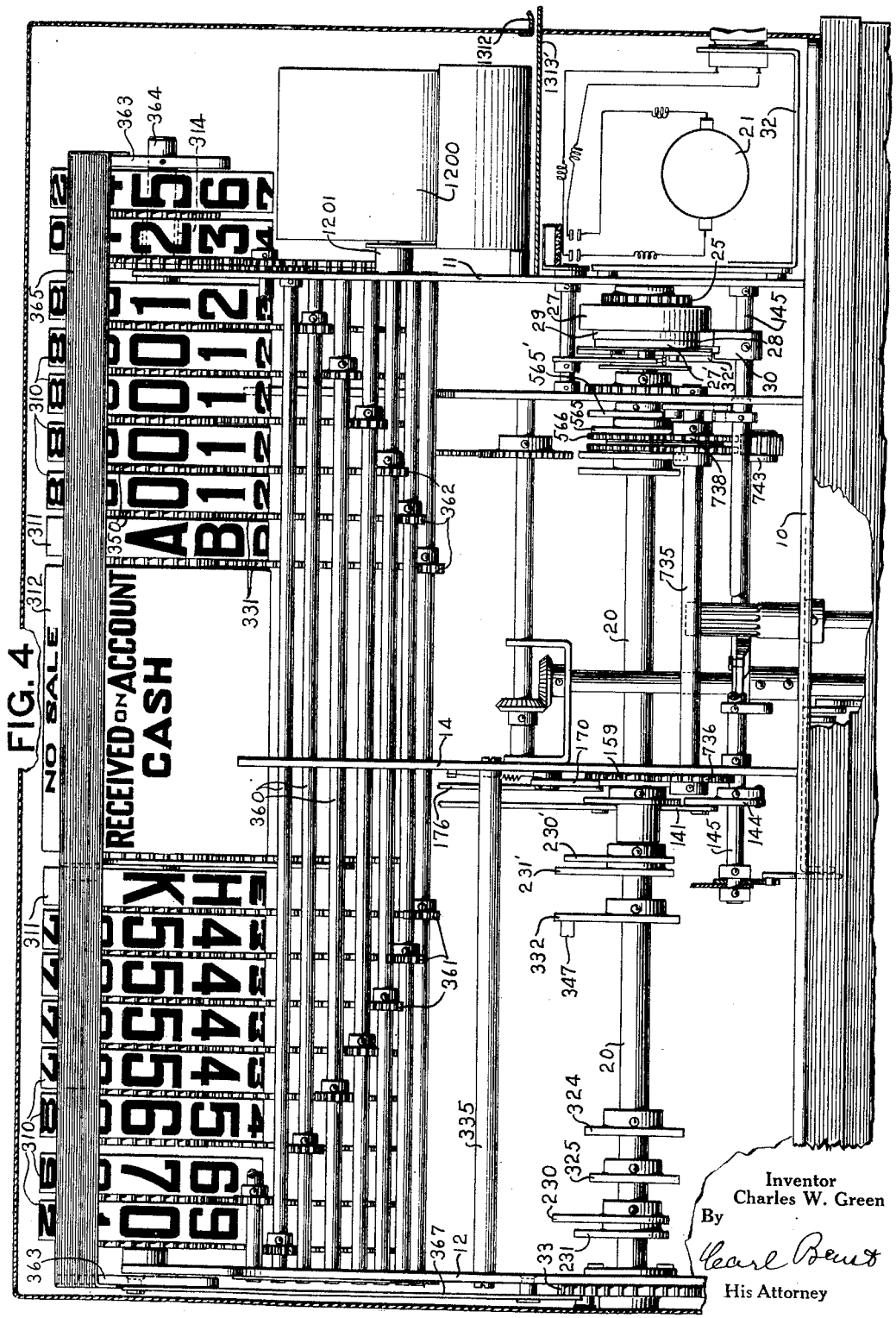
Fig. 4 is a rear elevational view of the machine with the back portion of the cabinet removed.

In order to adjust the indicators so that the indicia may be viewed from the rear of the machine, a transmission line is provided. Referring to Figs. 4, 7 and 12, it will be seen that a plurality of shafts 360 are provided which shafts are journaled in supporting frames 11, 12 and 14 (Fig. 7). These shafts are mounted in an arc about gears 331, as shown in Figs. 7 and 8. A pinion 361 is pinned to each shaft 360, which pinion meshes with a corresponding gear 331. Spaced from each pinion 361 on its respective shaft 360 is another pinion 362 which meshes with a similar gear 331 for adjusting a corresponding rear indicator drum. There is one such shaft and pair of pinions for each amount indicator and also one for the clerk's indicator. Thus, it is clear that when the gears 331 are actuated in the manner previously described, this movement through pinions 361 and 362 is transmitted to a similar gear 331 associated with the rear indicators. It will be noted from Fig. 4 that the rear indicator drum for the unit denominational order is moved through a sleeve 314' in order to avoid the necessity of an extension of its respective shaft 360 to the right of side frame 11.

It is desirable to conceal the indicators during adjustment thereof and to this end a flash 363 (Figs. 4 and 80), is provided. This flash is mounted on indicator supporting shaft 364 journaled in side frames 11, 12 and 14. This concealing means is in the form of a bail having arcuate shaped concealing portions 365 located at substantially diametrically opposite sides of the drum. These concealing portions are attached to a pair of arms 366 at each end thereof. Attached to one of the arms 366 adjacent the supporting frame 12 is a pitman 367 which is provided with a slot 368 near its lower end, which receives a pin 369 provided in side frame 12. The lower end of pitman 367 is provided with a cam face 370 which is adapted to be engaged by stud 371 fixed to gear 33. A spring 359 tends to rock the concealing member in a clockwise direction. From the description of the above mechanism, it is clear that when gear 33 is rotated in the direction of the arrow upon operation of the main driving shaft 20, stud 371 will be moved out of engagement with cam 370 and pitman 367 will be permitted to drop, thereby bringing the concealing portions 365 into position to conceal the indicators. Toward the end of an operation of the machine, stud 371 will again engage cam 370 thereby moving pitman 367 upwardly to move the concealing portions 365 to inoperative positions. The slot 368 is so constructed as to limit the movement of the concealing member in either direction.

Totalizer reel

In the illustrated machine there are six clerk's totalizers 372, (Figs. 33 and 34), four transaction totalizers 373, and one grand totalizer 374. Fig. 34 shows the arrangement of the totalizers and counters in the reel.

The A totalizer for registering the cash and received on account transactions effected by the A clerk is located substantially at the top of the reel. To the right thereof are arranged the B, D, E, H, and K totalizers for registering similar transactions effected by the B, D, E, H and K clerks, respectively. Next in order is the paid out totalizers for registering the total of the paid out transactions. Adjacent the paid out totalizer is the charge totalizer for registering the total of all charge transactions entered in the machine, and adjacent the charge totalizer is positioned the grand totalizer which registers the total of the cash and received on account transactions effected in the machine. Next in order is the no sale counter for registering the number of no sale transactions effected in the machine. Next to the no sale counter is mounted the received on account totalizer for registering each received on account transaction effected in the machine. Next in order is the cash totalizer for registering each cash transaction effected in the machine.

In the present case the totalizers will not be described any further except when it may be necessary to specifically refer to them. For a full illustration and description see the parent case.

Printing mechanism

The mechanism for effecting printing upon the record strip is mounted in unitary supports and is so constructed that it may be readily placed in the machine or removed therefrom as a unit. This mechanism is adapted to print from the item type carriers 311 (Fig. 32) and the totalizers.

Figure 36:
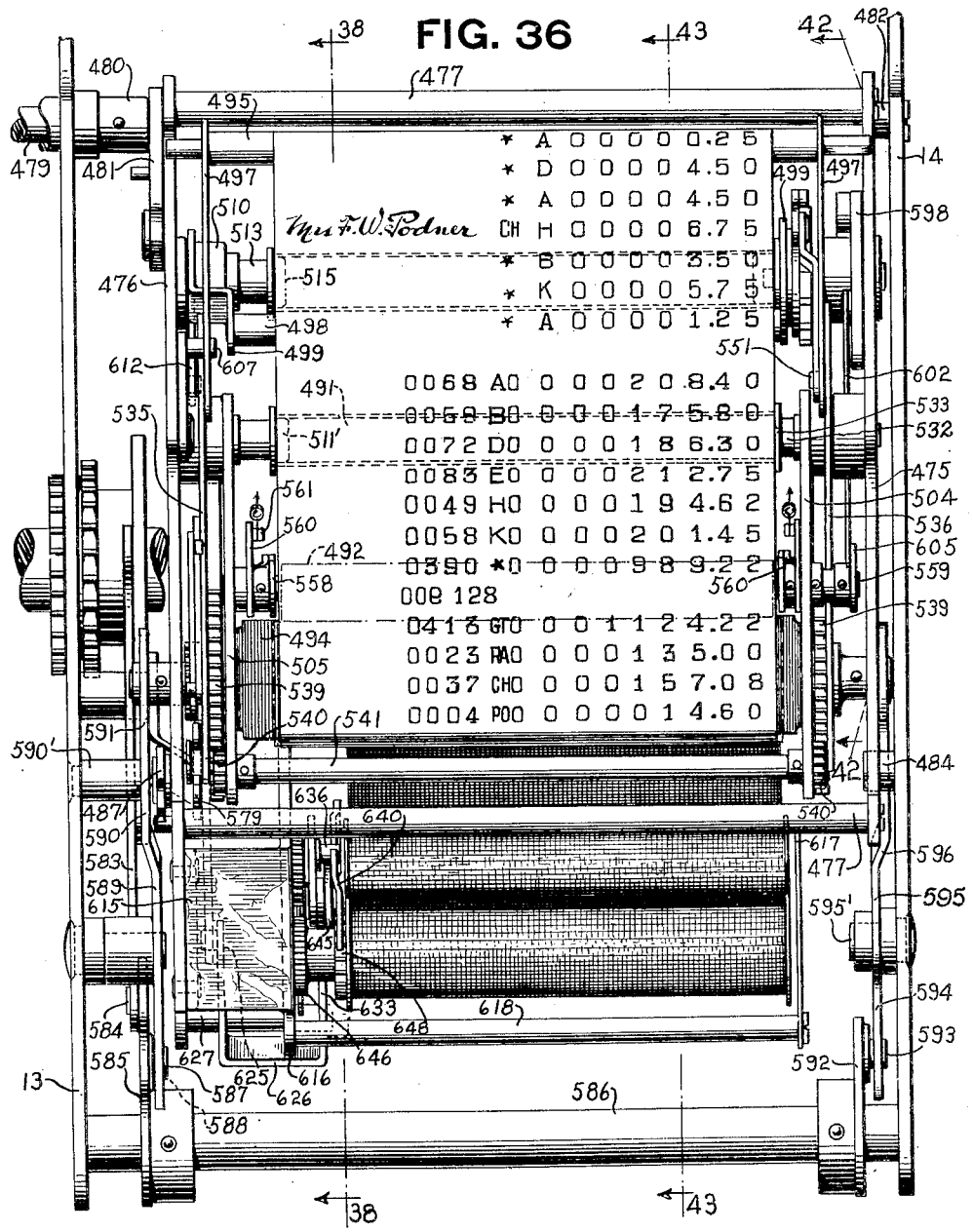
Fig. 36 is a general view of the printer showing printed totals and their identifying characters.

Referring to Figs. 35 to 43, and 54 to 72 it will be seen that the printer has two side frames 475 and 476 (Fig. 36), held rigidly in proper positions by three tie rods 477 (Figs. 36 and 43). Each side frame has a notch 478 (Fig. 43) adapted to engage a supporting rod 479 journaled in the frames 13 and 14 (Fig. 36). The rod 479 has a pair of grooves 479' to receive the side frames. A collar 480 is pinned to the rod 479, the inner end of the collar lies adjacent the groove in the rod 479 which receives the notch 478 in the frame 476. A collar 482 also pinned to the rod 479 extends inwardly from the frame 14, the inner end thereof being spaced to the right of the groove for frame 475 a distance equal to the width of the groove.

From the construction of the parts just described, it is clear that when it is desired to assemble the printer frame in the machine proper, it is only necessary to insert the reduced portion of the notches onto the grooves 479' formed in rod 479 and then slide the printer frame slightly to the right so that the enlarged portions of the side frames will embrace rod 479. This movement is stopped when side frame 475 engages the inner end of spacing collar 482.

Figure 37:
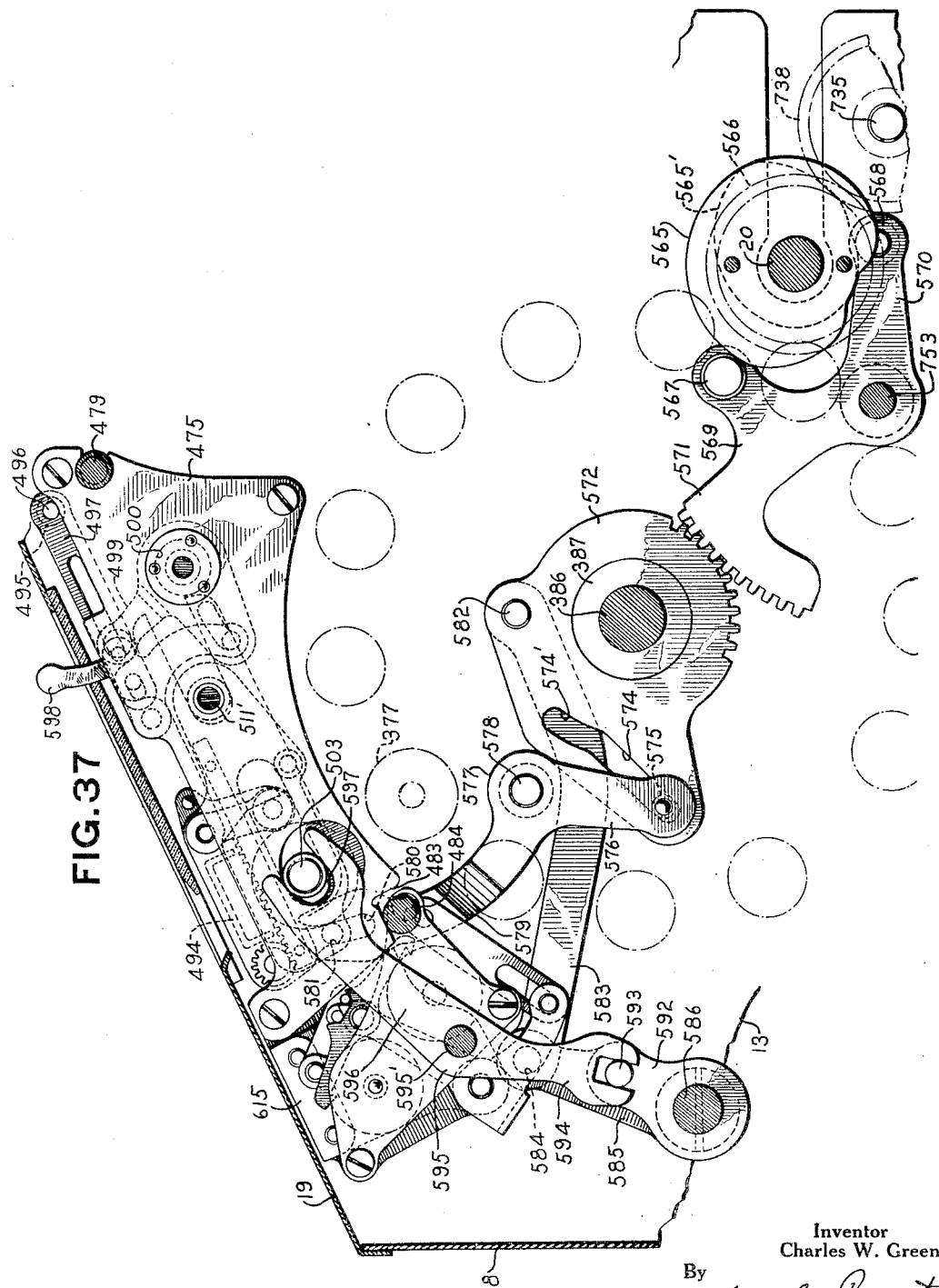
Fig. 37 is a right-hand side view of the printer showing the operating mechanisms associated therewith.

In order to prevent any lateral movement of the printer frame after it has been placed on rod 479, a manually operable latch 481 (Fig. 36) is provided. This latch is pivoted on the outer side of frame 476 near the top rearward end thereof, and is provided with a hook portion having a thickness substantially equal to the width of one of the peripheral grooves. Thus, it is seen that after the printer frame has been placed on rod 479 and slid to the right in the manner just described, latch 481 is moved downwardly to bring the hooked portion thereof into the peripheral groove adjacent side frame 476, as seen in Fig. 36. The printer frame is thus positively locked against lateral movement by the latch 481 and also against any movement away from rod 479 by virtue of the enlarged portions 478 of the side frames 478 embracing shaft 479 proper. As seen in Fig. 37, a comparatively large notch 483 is provided at the lower forward end of a side plate 475. A similar notch 485 (Fig. 43) is provided in the lower side of side frame 476. These notches receive supporting studs 484 and 486 respectively, projecting from supporting frames 14 and 13. In order to prevent any rocking movement of the printer about rod 479, a latch 487 (Fig. 43) is provided. This latch is pivoted to side frame 476 at 488 and is provided with a hook portion 489 at the lower end thereof which is adapted to embrace stud 486 projecting inwardly from frame 13. Thus, it is seen that the forward end of the printer frame is rigidly held in position.

The mountings for the record strip 490 are shown more clearly in Figs. 35, 37, 38 and 43, wherein it will be seen that the record strip 490 is trained from supply roll 491 over a compression roll 492, thence around platen roll 493 and over a writing table 494, thence rearwardly over a sleeve 495 mounted on a rod 496 supported by a pair of links 497, thence over a rod 498 supported by a pair of arms 499 and thence around the receiving or storage roll 500. A paper shifting and feeding mechanism is provided which is so constructed that it will shift the record strip from normal position to bring the autographic portion thereof to be printed upon to a position directly beneath the platen to receive a printing impression from the type carriers. The record strip is then shifted in the reverse direction and advanced one space so as to present a new surface to be written and printed upon. In Fig. 1 it will be seen that the detail strip is located directly below lid 19 of the cabinet. This lid is provided with a window 501 so that several of the preceding items recorded on the record strip may be viewed. The window 501 is provided with an opening 502 so that autographic notations may be made upon the detail strip adjacent the printed items. The platen 493 (Fig. 38) is mounted on an elongated sleeve embracing shaft 503 which is supported by a pair of arms 504 and 505 (Figs. 36 and 43) journaled respectively on the enlarged portions of studs 531 and 532 provided in the printer side frames 475 and 476, which studs also support the supply roll 491.

The receiving or storage roll is supported in the printer frame by the mechanism shown in Fig. 41, wherein it will be seen that the reduced portion of a tubular stud 506 is fitted in an aperture provided in side frame 476. Stud 506 is provided with a flange 508 which is fastened to the side frame 476 by rivets 509 or by any other suitable means. A grooved collar 510 embraces the inner end of stud 506, and forms a bearing for the arm 499 located toward the left of the printer which, it will be remembered, is one of the arms which supports rod 498. A plunger 511 is supported at one end within the reduced portion of tubular stud 506. Near its inner end plunger 511 is provided with an enlarged cylindrical surface 513 which is slidably received within the tubular portion of stud 506. A spring 512 is mounted on the reduced portion of plunger 511. The inner end of plunger 511 is provided with an enlarged flange 514 and a reduced tapered portion 515 which receives one end of core 516 about which the detail strip is wound. Mounted in suitable bearings provided in side frame 475 is a long stud 517. The inner end of stud 517 is provided with an enlarged cylindrical shoulder 518 which is slotted at 519 to receive an inwardly extending projection 520 formed at one end of core 516. Adjacent shoulder 518, stud 517 is provided with a flange 521. Adjacent flange 521 is a cylindrical shoulder 522 and adjacent the latter, stud 517 is formed with a key portion 523 which engages in a slot 524 provided in the hub 525 of a ratchet wheel 526. A second ratchet wheel 527 is journaled on hub 525 of ratchet 526 and also on shoulder 522 of stud 517. The arm 499 located toward the right hand side of the printer is journaled on a hub 528 of ratchet 527. Also journaled on hub 528 between arm 499 and ratchet 527 is an arm 529 which has pivoted thereto a feed pawl 553, as shown more clearly in Fig. 42. The inner end of hub 528 (Fig. 41) of ratchet 527 bears against the outer side of flange 521. Thus, in order to insert a core 516 in a printer frame it is only necessary to engage one end thereof on the reduced portion 515 of plunger 511 and force plunger 511 outwardly against the tension of its spring 512 until the other end of core 516 clears shoulder 518 of stud 517 when that end may then be fitted on shoulder 518 and the projection 520 provided in that end of the core positioned within slot 519 provided in shoulder 518. It will be noted that the outer side of ratchet wheel 527 is provided with a circular bearing surface 530 which engages the inner side of ratchet 526. Spring 512 associated with stud 506 urges core 516 against flange 521 which, in turn, engages the inner end of the hub 528 of ratchet wheel 527 and consequently surface 530 of ratchet wheel 527 is spring urged against ratchet wheel 526. Thus it is seen that upon movement of ratchet wheel 527, ratchet wheel 526 will also be actuated due to the friction between their contacting surfaces. The supporting means for the core carrying the supply roll is somewhat similar to that shown in Fig. 41 in that a spring pressed plunger 511' (Figs. 38 and 43) is provided within the tubular stud 531 fixed to frame 476. The support for the other end of the core, however, simply comprises the stud 532 (Fig. 36) which is provided with a flange 533 and a cylindrical shoulder 534 similar to that provided on stud 517 for the core 516 of the receiving roll.

Figure 38:
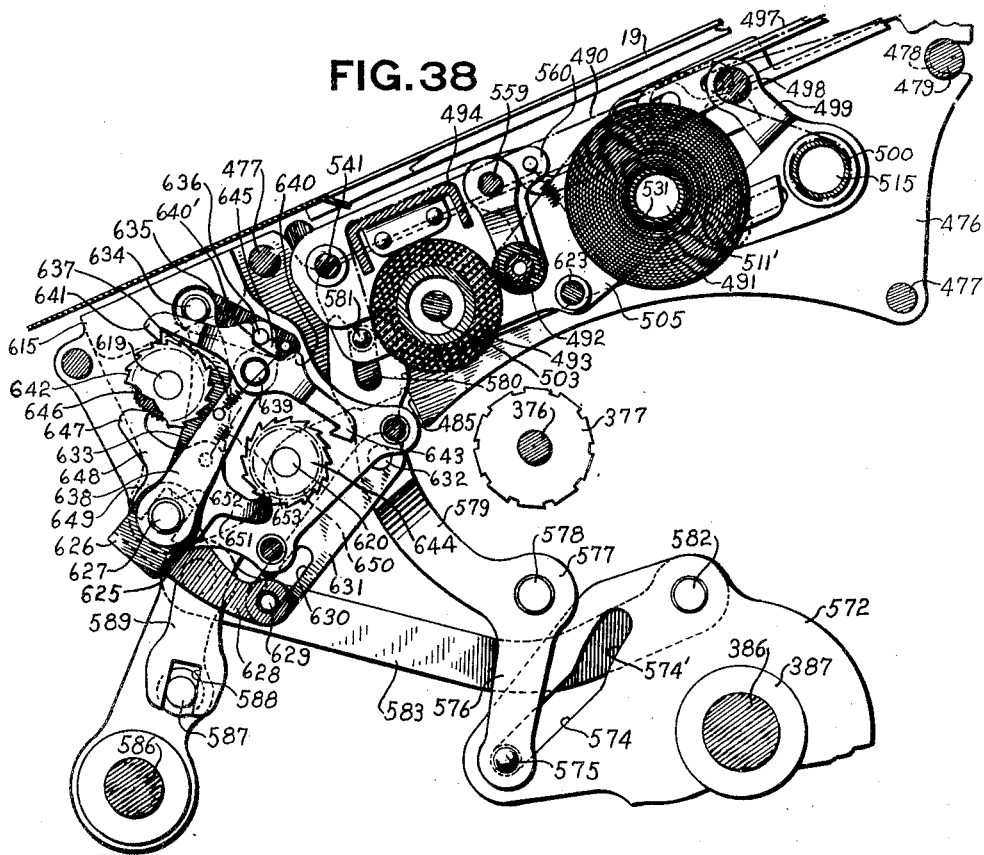
Fig. 38 is a sectional view taken substantially on line 38—38 of Fig. 36.
Figure 39:
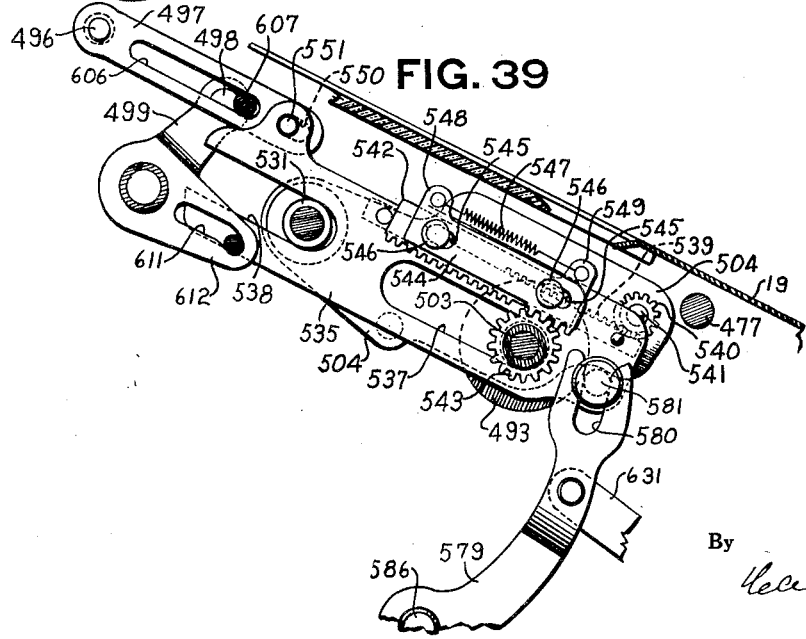
Fig. 39 is a sectional view showing the paper shifting mechanism for the record strip.

The mechanism for shifting and feeding the detail strip will now be described in detail. Referring to Figs. 36 and 39, it will be seen that a slidable member 535 is provided with a pair of elongated slots 537 and 538 for receiving platen shaft 503 and stud 531, respectively. A similar slidable member 536 is provided at the other side of the printer and also is formed with a pair of similar slots, one of which also receives the platen shaft 503 and the other the stud 532. A rack 539 is attached to the upper side of each slidable member 535 and 536 and meshes with a related pinion 540 pinned to a shaft 541. Shaft 541 is journaled in the forward ends of arms 504 and 505 which support the platen shaft 503. The racks 539 and pinions 540 are provided to compel slidable members 535 and 536 to move in unison. As shown more clearly in Fig. 39, slidable member 535 has also attached thereto a rack 542 which is normally out of engagement with a pinion 543 fixed to platen shaft 503. A short rack 544 is positioned adjacent rack 542 and is provided with a pair of slots 545 for receiving studs 546 carried by slidable member 535. Rack 544 is normally in engagement with pinion 543 attached to shaft 503 as shown in Fig. 39. Racks 542 and 544, by virtue of the pin and slot connection just described, are so arranged that an open tooth space is normally provided between the two racks. A spring 547 is mounted at one end to a stud provided on an upwardly extending projection 548 formed at the rearward end of rack 544 and at the other end to a stud provided on a projection 549 extending from the forward end of rack 542, which rack it will be remembered is fixed to slidable member 535. This spring tends to maintain racks 542 and 544 in extended position as shown in Fig. 39. It will also be seen that a slot 550 is provided near the forward end of each link 497 one of which receives a stud 551 provided on slidable member 535 while the other receives a similar stud 551 provided on slidable member 536. As shown in Fig. 42, the arm 529 has pivoted thereto at 552 the spring urged pawl 553 which engages ratchet wheel 527 (Fig. 41). A link 554 is pivoted at its rearward end to arm 529, while its forward end is pivoted to a stud 551 provided in slidable member 536. In Figs. 36, 38, and 43, it will also be seen that pressure roll 492 is fixed to a rod 557 which is supported by a pair of arms 558 pivotally mounted on a rod 559 journaled in the arms 504 and 505 previously described. Fixed to rod 559 adjacent arms 504 and 505 are a pair of depending arms 560. Each arm 560 is provided with a stud 561 to which one end of spring 562 is attached. The other end of each spring 562 is fixed to a related stud 563 provided in arms 504 and 505. Thus it is seen that pressure roll 492 is spring urged into engagement with platen 493.

From the construction of the parts just described it is seen that when slidable members 535 and 536 (Fig. 39) are moved forwardly in a manner to be described hereinafter, due to the friction existing between the platen and pressure roll, the short rack 544 will be held stationary until slidable member 535 has been moved sufficiently to cause studs 546 to traverse the length of slots 545 when racks 542 and 544 will move as a unit thereby rotating platen 493 in a clockwise direction as viewed in Fig. 39. Link 497 will also be held stationary until both racks move together due to the pin and slot connection 551 and 550 between the slidable members 535 and 536 and links 497. However, when this lost motion has been taken up links 497, which it will be remembered support rod 496, will also be carried forwardly by the movement of slidable members 535 and 536 with the result that sufficient slack is provided in the detail strip to permit platen 493, operating in conjunction with pressure roll 492, to shift the paper around the platen to bring the proper portion thereof into printing position. When the paper has been shifted to this position, a printing impression will be effected thereon from the type carriers in a manner which will be described in detail hereinafter. It will also be noted that due to the connecting link 554 (Fig. 42) between slidable member 536 and arm 529 which carries pawl 553, the latter will be moved forwardly to engage the next adjacent tooth on ratchet wheel 527 (Fig. 41) when the slidable members 535 and 536 (Figs. 39 and 42) are actuated to shift the paper to printing position. It will also be seen that when short rack 544 has been moved out of engagement with pinion 543, spring 547 will extend the racks, causing a space equal to substantially the width of one tooth to be provided between racks 542 and 544. Now, upon movement of slidable members 535 and 536 in the reverse direction, pinion 543 will be moved a greater distance in the reverse direction than it was moved when the paper was shifted to printing position. This is due to the fact that upon the return movement of racks 542 and 544 they are extended, as stated before, so that the last tooth on rack 544 will engage the second tooth on pinion 543 from that engaged by the first tooth on rack 542. When the parts are thus moved to normal position, pawl 553 will rotate ratchet 527 a distance equal to substantially the length of one tooth space of ratchet wheel 527 which movement will be transmitted to core 516 of the storage roll through the friction drive provided between ratchet 527 and ratchet 526. The friction connection between ratchets 527 and 526 is provided to compensate for the variation in the size of the storage roll thus insuring a constant feed of the record strip. From the foregoing description, it is clear that by virtue of the construction of racks 542 and 544 a constant amount of paper will be taken from the supply roll at each operation of the machine but due to the fact that the receiving roll is constantly increasing in size a progressively greater amount of paper would tend to be wound thereon. Since this amount of paper becomes greater than that paid off from the supply roll, the paper would be severed if no compensating mechanism were provided. For this reason, applicant has provided the friction clutch between ratchets 526 and 527 so that when binding of the paper occurs by the gripping action of friction roll 492 and platen 493 after a sufficient amount has been paid off the supply roll slippage will occur between ratchet 527 and ratchet 526 with the result that only an amount of paper equal to that paid off the supply roll will be wound on the receiving roll. This amount may be regulated so as to provide the desired space between the printed items.

Referring to Figs. 4 and 37, it will be seen that cams 565 and 565' are attached to a gear 566 loosely mounted on driving shaft 20. Gear 566 (Fig. 37) meshes with a pinion 738 fixed to a shaft 735 journaled in supporting frames 13 and 14. Shaft 735 has pinned thereto a second pinion 736 (Figs. 4 and 32) which meshes with a gear 159 fixed to the main driving shaft 20 as previously described. Thus it is seen that upon operation of main driving shaft 20, movement will be imparted to cams 565 and 565' to actuate the mechanisms for shifting and feeding the record strip and also the mechanism for effecting printing thereon. Cams 565 and 565' engage rollers 567 and 568 provided on arms 569 and 570, respectively, of a segmental gear 571 pivoted on shaft 753. Segmental gear 571 meshes with a segmental gear 572 which is loosely mounted on sleeve 387 provided on shaft 386. The upper portion of segment 572 is provided with a cam slot 574 which receives a stud 575 provided on the lower arm 576 of a bell crank lever 577 pivoted on a trunnion 578 fixed to frame 13. The upper arm 579 of bell crank lever 577 is provided with an open slot 580 which receives a laterally extending stud 581 fixed to slidable member 535 (Fig. 37). A laterally projecting stud 582 is also provided on segment 572 to which is pivoted the rearward end of a link 583. The forward end of link 583 is pivoted to a stud 584 provided at the upper end of an arm 585 fixed to a shaft 586. Shaft 586 is journaled in the frames 13 and 14 as is clearly shown in Fig. 36. Intermediate the ends of arm 585 is an inwardly extending stud 587 which engages in an open slot 588 provided in the lower arm 589 of a bell crank lever 590 pivoted on an inwardly extending stud 590' fixed to supporting frame 13. The upper rearwardly extending arm 591 of lever 590 is bifurcated to receive platen shaft 503. Also pinned to shaft 586 is a second arm 592 (Fig. 37) having a stud 593 in axial alinement with stud 587 on arm 585. Stud 593 operates in an open slot in the lower arm 594 of a lever 595 similar to that provided at the lower end of lever 590. Lever 595 is pivoted on a stud 595' extending inwardly from frame 14 (Fig. 36) and has an arm 596 (Fig. 37) which also is provided with a bifurcation 597 for receiving the platen shaft 503. The two arms 590 and 595 are provided to equalize the movement of the platen 493. Thus it is clear that when cams 565 and 565' are operated by gear 566, segment 572 will be rocked in a counterclockwise direction as viewed in Fig. 37, with the result that bell crank 577 will also be rocked in a counterclockwise direction which, through its connection with sliding member 535, will move the same forwardly to shift the record strip 490 to printing position. At this time stud 575 will enter the dwell 574' of cam slot 574 and the record strip will be held in shifted position. Dwell 574' is provided so that the record strip 490 will be held stationary during a printing operation. As segment 572 is rocked in a counterclockwise direction, as aforesaid, shaft 586 will also be rocked in a counterclockwise direction due to the engagement of link 583 with arm 585. This motion is transmitted to the platen shaft by levers 590 and 595 respectively. The parts are so constructed that when the paper has been shifted to printing position and stud 575 has entered the dwell 574' in slot 574, platen 493 will also have been rocked downwardly to a position slightly above the type carriers. At substantially the time that the record strip 490 has been brought to rest in shifted position, further movement of segment 572 will cause platen 493 to be brought into engagement with the type carriers thereby effecting a printing impression upon the record strip. When segmental gear 572 is rocked in the reverse direction it is seen that, because of the dwell 574' provided in cam slot 574, the platen will be moved out of engagement with the type carriers before the record strip 490 will be shifted in the reverse direction. When the cam portion of slot 574 reaches stud 575 the record strip will be shifted in the reverse direction and at the same time the platen will be restored to normal position.

At times it is desirable to feed the record strip manually to wind the record material upon the receiving roll. To this end a manually operable lever 598 is provided. As shown in Figs. 1, 37, and 42, lever 598 projects through a slot 599 provided in lid 19 of the cabinet so that the record strip may be fed without requiring the lid 19 to be opened. As shown in Figs. 41 and 42, lever 598 is pivoted on stud 517 in close juxtaposition to side plate 475. The lower end of lever 598 has pivoted thereto a pawl 600 which is urged into engagement with ratchet 526 by a spring 601. A link 602 is pivoted at its rearward end to a stud 603 provided intermediate the ends of lever 598. The forward end of link 602 is pivoted at 604 to a depending arm 605 fixed to rod 559. Rod 559, it will be remembered, has also fixed thereto the depending arms 560 (Fig. 43) which normally urge the pressure roll 492 into engagement with platen 493. Thus it is seen that by grasping lever 598 and urging the same rearwardly, pawl 600 will engage the teeth of ratchet 526 to rotate core 516 (Fig. 41) of the receiving roll thus causing paper to be wound thereon. At the same time, through link connections 602 with pressure roll 492, the tension between roll 492 and platen 493 is destroyed, and thus the record strip may be paid off from the supply roll without any binding action that normally exists between the pressure roll and the platen. In order to facilitate the removal and replenishing of the record paper in the printer the following mechanism is provided. Referring to Figs. 38, 39, and 43, it will be seen that the link 497 which is pivotally connected to slidable member 535 is provided with an elongated slot 606 intermediate its ends for receiving a stud 607 fixed to the upper portion of an arm 608 (Fig. 43) pivoted to the printer side frame 476 at 609. The rearward end of arm 608 is provided with a laterally extending stud 610 which operates in a slot 611 provided in an arm 612, integral with an arm 499, which, it will be remembered, is one of the arms supporting rod 498 over which the record strip 490 is trained before passing onto the receiving roll. By the connections just described it is seen that by simply lifting rod 496, arm 608 will be cammed upwardly causing the stud 610 thereon to rock arms 499 and supporting rod 498 rearwardly, thereby bringing all of the parts just described to the position shown in Fig. 43. When the parts are in this position, it is clear that the paper may be severed and both the supply and receiving rolls readily removed from their mountings.

*Ribbon mechanism*

The ribbon mechanism for the detail record strip printer is mounted on a bracket 615 (Figs. 36 to 38 and 43) which is fastened to the forward end of the printer side frame 476 by screws, rivets, or by any other suitable means. Spaced from side frame 476, bracket 615 is formed with a depending portion 616 (Figs. 36 and 43) for supporting a number of the parts associated with the ribbon mechanism. The lower end of depending portion 616 is rigidly secured to side frame 476 by suitable bracing rods. Spaced from depending portion 616 of bracket 615 is a plate 617 (Fig. 36), which is integrally secured to depending portion 616 by tie rods 618. Referring to Fig. 43 it will be seen that the inking ribbon 62 extends from roll 622 around tie rod 618, thrice around rod 623 provided in platen supporting arms 504 and 505, (Fig. 36) thence beneath tie rod 618 (Fig. 43) and around roll 624. Rolls 622 and 624 are supported on shafts 619 and 620 respectively, journaled in depending portion 616 and plate 617 (Fig. 36). To facilitate movement of the ink ribbon, tie rods 618 and rod 623 may be provided with rollers. The inking ribbon feeding mechanism is of such a construction that when the ribbon has been completely unwound from one roll, the mechanism will be automatically shifted so as to rewind the ribbon on that roll and pay it off from the other roll. The mechanism for feeding the ribbon will now be described in detail.

Referring particularly to Figs. 36 and 38 it will be seen that a bell crank lever 625 is formed with a bail-like portion 626 which is journaled on a rod 627 fixed to end plate 476 and depending portion 616 of bracket 615. One arm of this bail extends upwardly between side frame 476 and portion 616 of bracket 615 while the other arm thereof is positioned a short distance to the right of depending portion 616, as shown in Fig. 36. It will be seen from Figs. 36 and 38 that the lower arm 628 of bell crank lever 625 has fixed thereto a pin 629 which operates in an elongated slot 630 provided near the forward end of link 631. The rear end of link 631 is pivoted at 632 to the upper arm 579 of bell crank 577. Integral with bail 626 is an arm 633 extending upwardly and rearwardly from 627. Arm 633 has pivoted to its upper end at 634 a downwardly and rearwardly extending arm 635 carrying a pin 636. Arm 635 is normally urged downwardly by a spring 637. Loosely pivoted on rod 627 is an upwardly and rearwardly extending arm 638 which has pivoted at the upper end thereof at 639 a two-arm pawl 640. The upper arm 641 of pawl 640 engages a ratchet wheel 642 fixed to shaft 619 which supports ribbon roll 622 (Fig. 43). The lower arm 643 of pawl 640 is adapted to engage ratchet 644 fixed to shaft 620 supporting the ribbon roll 624. A comparatively broad notch 640' is provided at the top of pawl 640 for receiving pin 636 carried by arm 635. The upper end of arm 638 is provided with a nose portion 645 which is adapted to be engaged at either side thereof by the pin 636 on arm 635. Fixed to ratchet 619 is a serrated disc 646 which is engaged by a nose portion 647 provided on arm 648 of two-arm pawl 649. Also fixed to ratchet 644 is a serrated disc 650 which receives the other arm 651 of holding pawl 649. Holding pawl 649 is provided with an open slot 652 at its lower end which straddles rod 627 as shown in Fig. 38. A spring 646 urges pawl 649 upwardly so that arms 647 and 651 thereof engage discs 646 and 650 respectively. When the parts are in the position shown in Fig. 38 and segmental gear 572 is operated as was described heretofore, it will be seen that bell crank lever 625 will be rocked about its pivot first in a clockwise direction and then in a counterclockwise direction. When bell crank lever 577 is rocked by cam 574 provided in segmental gear 572, link 631 obviously will first be moved downwardly until the end portion of slot 630 therein engages the pin 629 provided at the lower end of arm 628 of bell crank 625 when the latter will be rocked in a clockwise direction with the result that arm 633 carrying arm 635 on the upper end thereof will also be rocked in a clockwise direction. By the engagement of pin 636 with nose 645 of arm 638 the latter will be moved downwardly thus causing the hook provided in arm 641 of pawl 640 to actuate ratchet wheel 642 and thereby feed the ribbon an increment.

When segmental gear 572 is moved in the reverse direction the parts will be restored to normal position. From the construction of the parts just described it will be seen that when the ribbon has been completely paid off from roll 624 and the machine is subsequently operated, binding of the ribbon will take place and ratchet wheel 642 will be held stationary. When this action takes place, pawl 640 will also be held stationary, but bell crank lever 625, however, will move on its pivot with the result that pin 636 will be cammed around nose portion 645 of arm 638 and will be moved into position on the other side of nose portion 645 by spring 637. Spring 637 will also rock arm 643 of pawl 640 into engagement with ratchet wheel 644 and arm 641 thereof out of engagement with ratchet wheel 642. Now, when the machine is subsequently operated, roll 624 will be actuated by arm 643 of pawl 640 and ratchet wheel 644 attached thereto, to wind the ribbon around roll 624 and pay it off from roll 622 until the ribbon has been completely paid off from roll 622, when pin 636 will again be cammed around nose 645 and into the position shown in Fig. 38. Thus it is seen that an automatic ribbon reverse is provided which effectively feeds the ribbon at each operation of the machine, thereby presenting a fresh portion to the printing line each time the platen is brought into engagement with the type carriers.

Total printing

When the machine is operated for item entering operations, as has been described hereinbefore, the selection of totalizers in the totalizer reel is effected by properly adjusting selector plates 283 and 300 (Figs. 33 and 34), but the reel itself remains stationary. In total taking operations, however, it is necessary to rotate the reel to bring each totalizer to printing position in order to effect printing therefrom.

Figure 49:
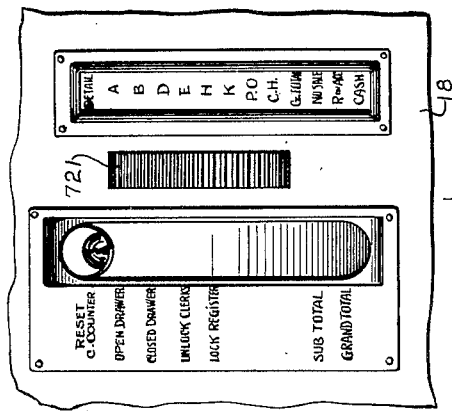
Fig. 49 is a view of the legend plates associated with the control lever and reel operating means.

In this divisional application it will not be necessary to describe the total printing operations. It will suffice to say that when it is desired to print either a sub-total or a total, the control lever 180 is moved into the desired one of those two positions and the totalizer to be used in the sub-total or total taking operation is selected by turning the thumb wheel 721 (Figs. 1, 2 and 49). The machine is then released by depression of the motor bar 43 and the mechanisms operate to print totals and sub-totals on the record strip.

Control mechanism

Figures 48, 50:
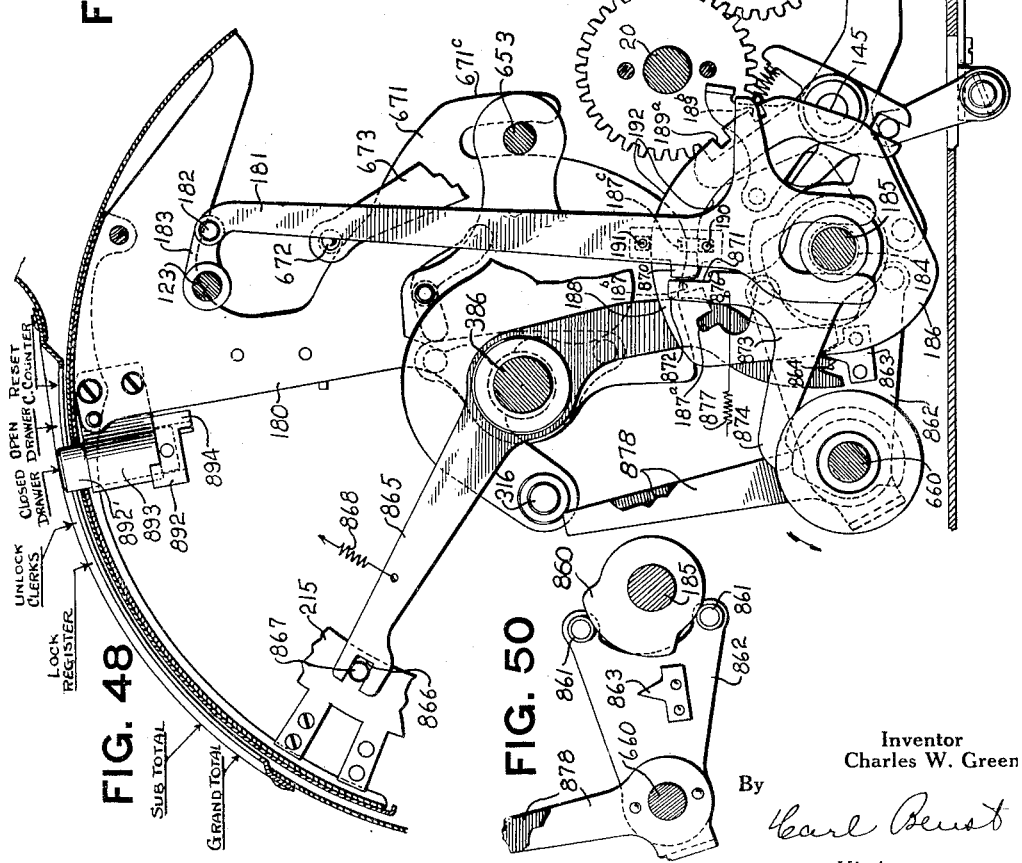
Fig. 48 is a general elevational view of the control mechanism, showing particularly the associated release mechanism for the machine and the series of interlocks controlled by the control mechanism.
Fig. 50 is a detail view of the cam which is fixed to the control shaft for locking the clerks' and transaction differentials during total taking.

The illustrated machine is provided with a single lock control mechanism which enables the proprietor or other authorized person having a key thereto to condition the machine for its various modes of operation. As shown in Figs. 48 and 49, the control lever may be moved to seven different positions of adjustment. In its uppermost position, the control lever, through its associated mechanism, will condition the machine for printing from and resetting the consecutive number counter. When moved to the next position, or open drawer position, the machine may be operated regardless of whether the drawer is open or closed. The next position in order is the closed drawer position. When the control lever is in this position, the machine is locked against operation when the drawer is open and is not released until the drawer has been fully closed. The next position in order is the unlock clerks' keys position. When the control lever is in this position, the plate supporting the individual locks for the clerks' keys may be shifted so that the clerks' keys may be operated in the usual manner without first releasing them from their individual locks. The control lever must then be moved to either open drawer or closed drawer position to condition the machine for operation. The next position in order is the lock register position, in which position all of the keys are locked against operation. The next positions in order are the sub-total and grand total positions, respectively. When the control lever is moved to sub-total position, the keys are locked against operation but the machine may be operated to effect printing, after the reel has been rotated to bring one of the totalizers to printing position, by simply depressing the motor bar. When the control lever is moved to grand total position, the resetting mechanism is conditioned for operation so that after a total is printed from the selected totalizer, it will be reset to zero by the resetting mechanism. The mechanisms associated with the control lever for conditioning the machine for the various modes of operation relating to the present divisional case, only, will be considered herein. For a full detailed description of all controls exercised by the control lever reference may be had to the parent case.

Figure 27:
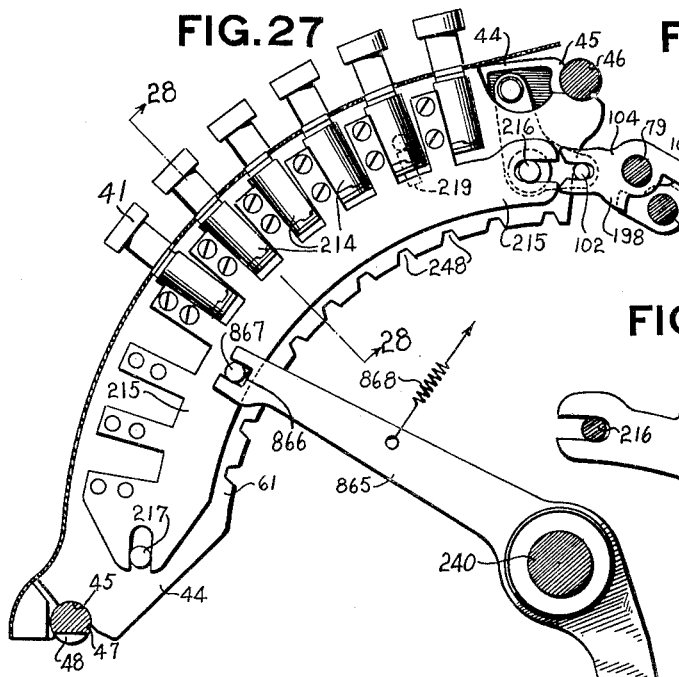
Fig. 27 is a side view of the individual locks for the clerks' keys and the control means therefor.

When the control lever 180 (Fig. 48) is moved to unlock clerk's position, plate 186 will be moved so as to bring the unnotched portion thereof, located substantially midway between notch 187c and notch 189a, between studs 190 and 191 of pitman 181. When the plate 186 is moved to this position it is obvious that shaft 123 will not be permitted to rock in the usual manner to release the machine for operation. Fixed to shaft 185 (Fig. 50) is a cam 860 which engages a pair of rollers 861 provided at the rearward end of an arm 862 pivoted on shaft 660. Lever 862 is provided with a detent 863 intermediate its ends which is adapted to engage in either one of two notches 864 (Fig. 48) provided at the lower end of a bell crank lever 865 pivoted on shaft 240. The upper forwardly extending arm of bell crank lever 865 is provided with an open slot 866 which receives a stud 867 fixed to supporting plate 215 for the individual clerk's locks 214 (Fig. 27). A spring 868 tends to rock bell crank lever 865 in a clockwise direction. Thus, it is seen that when the control lever is moved to unlock clerks' keys position cam 860 will rock arm 862 downwardly thereby bringing detent 863 out of engagement with the notches 864 of bell crank lever 865. Plate 215 which supports the individual clerks' locks 214 may now be moved downwardly against the tension of spring 868 to bring the projecting portions 219 (Fig. 29) of the lock bolts out of engagement with their corresponding laterally projecting studs 218 provided on the keys 41 (Fig. 28). Now, upon movement of the control lever back to either open drawer or closed drawer position detent 863 (Fig. 27) will be brought into the forward notch 864 of bell crank lever 865 thereby positively holding plate 215 in unlocked position. This mechanism is provided to enable the proprietor to release all of the clerks' keys from locking engagement with the individual locks 214 when it is not desired to make use of these locks.

When the control lever is moved to lock register position, the inner cam surface 192 (Fig. 48) of plate 186 will engage stud 190, thereby moving pitman 181 downwardly. By this action arm, 183 will rock shaft 123 in a clockwise direction with the result that arm 124 (Fig. 23) will also be moved in a clockwise direction bringing the top side thereof adjacent stud 126 carried by plate 127. When shaft 123 is rocked in this manner it will be remembered that all of the keys are locked against operation due to the engagement of the lower arms 195, 193 and 196 (Fig. 14) of detents 96, 86 and 107 respectively with their respective release arms 93, 83 and 104. When the control lever has been fully moved to lock register position, notch 189a (Fig. 48) will register with projection 191 of pitman 181. This also is the position of notch 189a in plate 186 when the control lever has been moved to sub-total position since, as will be pointed out hereinafter, shaft 185 does not move during movement of control lever 180 from lock register position to sub-total position. To prevent release of the machine when the control lever is in lock register position, the following mechanism is provided.

As shown in Fig. 48, a forwardly extending projection 870 is provided on pitman 181. Projection 870 is adapted to engage in an open notch 871 provided in the substantially vertical arm 872 of a two-arm lever 873 which is loosely pivoted on shaft 185. A substantially horizontal arm 874 of lever 873 is provided with a nose portion which engages a cam 875 fixed to shaft 660. It will be remembered that during movement of the control lever 180 from reset consecutive counter position, to lock register position shaft 660 remains stationary since stud 672 (Fig. 45) provided on the upper arm of segment 674 for actuating shaft 660 is then still in engagement with the concentric portion of cam 671. Thus, no motion is imparted to shaft 660 during this period. However, by movement of control lever 180 between the positions just mentioned shaft 185 will be rocked by gear segments 652' (Fig. 47) to position plate 186 in the manner just described. Thus, when control lever 180 is moved to lock register position cam 875 (Fig. 48) remains stationary and holds arm 874 of two-arm lever 873 in the position shown in Fig. 48. During this movement of the control lever, pitman 181, as was pointed out before, will be cammed downwardly by the inner cam surface 192 engaging stud 190 in the manner just described. When this occurs the end of projection 870 will just engage shoulder 876 and thus prevent further downward movement of pitman 181 which is necessary to release the machine for operation. It, therefore, is seen that if the motor bar 43 (Fig. 23) is now depressed the motor switch will not be closed since shaft 123 is held against movement by the engagement of projection 870 (Fig. 48) on pitman 181 with the shoulder 876 of lever 873. Thus, when the control lever is moved to lock register position, all of the keys are locked against operation, and by virtue of projection 870 engaging shoulder 876 of lever 873 downward movement of pitman 181 is prevented, which, as was stated before, is necessary to effect release of the machine for operation. It will be remembered that when control lever 180 is moved to unlock clerks' keys position cam 860 (Fig. 50) will rock arm 862 downwardly to release detent 863 from engagement with a notch 864 (Fig. 48) provided at the lower end of bell crank lever 865. Referring to Figs. 11 and 48, it will be seen that also fixed to arm 862 (Fig. 48) and journaled on shaft 660 are a pair of substantially vertical arms 878. These arms act as zero stops for the differential segments 242 for the clerks' and transaction banks of keys, respectively, during total taking operation of the machine. Thus, it is seen that when control lever 180 is moved to unlock clerks' keys position arms 878 will be moved under studs 316 provided on the differential segments 242 for the clerks' and transaction banks of keys. Cam 860 for rocking arm 862 and arms 878 is so constructed that it will hold these arms in operated position when the control lever is also moved to lock register, sub-total and grand total positions.

When the control lever is moved to sub-total position the dwell portion, of cam slot 650' (Fig. 47) will engage stud 651' in segment 652 and thus no movement will be imparted to gear segment 652', with the result that plate 186 (Fig. 48) will remain in the same position that it occupied when the control lever has been moved to lock register position. However, when the control lever is moved from lock register position to sub-total position cam portion 671 (Fig. 45) on the upper edge of control lever 180 will engage stud 672 on an arm 673 of segment 674 with the result that the latter will be rocked in a clockwise direction thereby rotating shaft 660 in a counterclockwise direction. When this occurs pinions 675a and 675' will actuate side frames 265 and 266 of the transmission line to swing the latter outwardly to disengage the gears thereof from the cooperating gears of the machine. At the same time cam 875 (Fig. 48) fixed to shaft 660 will be moved in the direction of the arrow, causing a cutaway portion thereof to register with the end of arm 874 of two-arm lever 873. Spring 877 attached to the lever 873 will then rock the latter in a counterclockwise direction removing the shoulder 876 from engagement with projection 870 of pitman 181. Thus, when one of the totalizers on the reel is moved to printing position and the motor bar 43 (Fig. 23) is operated, the shaft 123 may be rocked in clockwise direction to permit release of the motor switch control mechanism. When this occurs, the printing mechanism will be operated to effect a printing impression from the selected totalizer, upon the detail record strip.

From the foregoing description, it is seen that upon operation of the machine, for a total taking operation, the latch pawls 245 (Fig. 10) associated with the clerks' and transaction differential segments 242 will be disengaged from their drivers in the zero position. The drivers for these differential segments 242 however, will continue their movement to operated position and will then return to normal position as in other operations of the machine. It is not necessary to provide an arm 878 (Fig. 48) for each of the amount differentials 242 since each of these segments, it will be remembered, has associated therewith a zero stop pawl 72 (Fig. 10) which is effective to break the associated differential latch when no key has been depressed as was pointed out hereinbefore. Since all of the keys are locked against operation from the time the control lever is moved to lock register position, the drivers associated with the amount banks of keys will also have an idle movement similar to the drivers associated with the clerks' and transaction differential segments 242 for total taking operation.

As pointed out hereinbefore, the machine is provided with an auditor's lock by which the grand total printing and resetting is controlled. The control lever is moved to each of the above referred to positions by means of a key inserted in a lock 893 (Fig. 45). An arcuate notched plate 887 is fixed to the inner side of the frame 11. The lock 893 is provided with a tubular bolt 892', having a locking portion 894 which is normally adapted to register with a series of notches 887' formed plate 887. There is one notch 887' for each position of the control lever except the unlock clerks' position and the grand total position. Fixed to the plate 887 at the front thereof is a block 888.

The lock 893 is adapted to be operated in two different manners with two different keys in the manner fully described in the parent case.

In order to locate the different positions of adjustment of the control lever 180 (Fig. 45) in respect to the plate 887, control lever 180 is provided with a spring detent 889. Detent 889 is adapted to register with the notches 889 provided in the under concentric portion of plate 887. There is one notch 889' for each of the positions of the control lever and by this means the manager or auditor can readily aline the locking portion 894 with the notches 887'.

When the control lever is moved to grand total position, by means of the auditor's key, shaft 185 will be given an additional rocking movement in a counterclockwise direction by the action of the cam portion provided at the lower end of slot 650' engaging stud 651' of segment 652' (Fig. 47). When shaft 185 is moved in this manner plate 186 (Fig. 48) will also be moved in the same direction to bring notch 189b into registering position with respect to projection 191 provided on pitman 181. During movement of the control lever from sub-total to grand total position, shaft 660, however, will be held stationary since during this movement a second concentric portion 671c provided on cam edge 671 of control lever 180 will have moved into registering position with stud 672 of segment 674 (Fig. 45).

Figure 51:
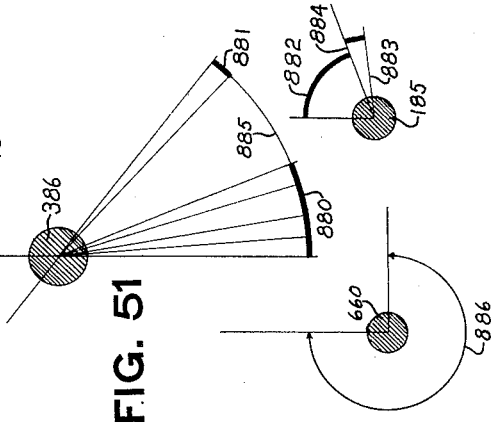
Fig. 51 is a diagrammatical view illustrating the relative movements of the control shafts during the movement of the control lever.

Fig. 51 illustrates diagrammatically the relative movements of shafts 185 and 660 during movement of the control lever 180 to its various positions of adjustment. The heavy portion 880 illustrates the movement of the control lever from reset consecutive counter position to lock register position while the heavy portion 881 illustrates the movement thereof from sub-total position to grand total position. The heavy portion 882 associated with shaft 185 illustrates the angular movement of shaft 185 during movement of the control lever from reset consecutive counter position, to lock register position, while the heavy portion 883 shows the angular movement of shaft 185 during movement of control lever 180 from sub-total to grand total position. The radial line 884 connecting the heavy portions 882 and 883 illustrates the dwell in cam slot 650' (Fig. 45) during which time motion is transmitted to shaft 660 by cam 671. The light line 885, shown in Fig. 51, illustrates the movement of control lever 180 from lock register position to sub-total position and light portion 886, shown in connection with shaft 660, illustrates the angular movement of shaft 660 during movement of the control lever from lock register position to sub-total position, which is a distance equal to substantially 270°. Thus, it is clear that during movement of control lever 180 from reset consecutive counter to grand total position, shaft 185 is intermittently moved through an angle of substantially 90° while shaft 660 is moved through an angle of substantially 270°. During movement of the control lever from lock register to sub-total position, it is seen, is the only time at which motion is imparted to the shaft 660.

*Check and slip printer*

The check and slip printer provided in the illustrated machine is located at the extreme left hand side thereof. This device is capable of effecting printing upon issued checks or inserted slips from a single set of type wheels. Each type wheel is provided with two similar sets of type characters, the similar characters being arranged at diametrically opposite points on the periphery of the type wheels. The upper set of type characters is adapted to cooperate with a platen to effect printing upon issued checks, while the lower set of type characters cooperates with a second platen to effect printing upon inserted sales slips. The mechanism for actuating the platen for printing upon issued checks may be regulated to control the number of impressions to be made thereon. For example, when it is desired to issue "straight" checks, this mechanism is so adjusted that the platen will effect but one printing impression upon the checks, whereas when it is desired to issue "stub" checks, it is so adjusted as to cause two operations of the platen and thereby effect duplicate printing upon the issued checks. The mechanism for printing upon and issuing checks is normally inoperative but is rendered operative when certain transactions are entered in the machine as will be described hereinafter.

The platen for printing upon inserted sales slips is also normally inoperative but when it is rendered operative it is actuated twice during an operation of the machine to effect duplicate printing upon the inserted sales slip.

In the illustrated machine, for cash, received on account and paid out transactions, the check issuing mechanism is automatically conditioned for operation, but for charge and no sale transactions, it remains disabled so that no check will be issued. The slip printing mechanism is also automatically conditioned for operation for charge transactions but remains disabled for operation when cash, paid out, received on account, and no sale transactions are entered in the machine. It is to be understood, however, that by slightly modifying the present structure, the check and slip printing mechanisms may be conditioned to print upon and issue checks and print upon inserted slips for any desired series of transactions. Manual means is also provided for disabling the check mechanism when it is desired to operate the machine without the use thereof.

The item type wheels and the type wheels provided with clerks' and transaction characters, respectively, are moved directly from one position to another without first returning them to a zero or starting position. The mechanism for performing this function will first be described. Referring to Figs. 2 and 7, it will be seen that shafts 268, 269, and 270 have fixed to their extreme left hand ends pinions 295, 308 and 276, respectively, which pinions mesh with their related large gears 296, 309 and 277 loosely mounted on shaft 1016. These gears are adapted to adjust their related type carriers 1011 (Fig. 72) through the following mechanism. Since the structure and operation of each series of connections is the same for each of the type carriers 1011, a description of the structure and operation of one will suffice for all. For the purpose of illustration, a description of the mechanism associated with the clerk's type carrier will be given. As seen in Fig. 53, gear 296 meshes with a segmental gear 1000, which gear is pivoted on a rod 1001 supported in transmission line supporting frames 265 and 1014 (Figs. 47 and 53). Pivoted to segmental gear 1000 (Fig. 53) at 1002 is a beam 1003. The upper end of beam 1003 is provided with an open slot 1004 into which projects a stud 1005 provided on a second segmental gear 1006 also pivoted on rod 1001. It will be seen that beam 1003 is provided with a bearing surface 1007 intermediate its ends which is concentric with rod 1001. This surface coacts with a raised surface on segment 1000 which is also concentric with rod 1001. Segmental gear 1006 meshes with a gear 1009 attached to one end of a long sleeve 1010 (Figs. 46 and 72), which sleeve has fixed to its other end a connection for adjusting its related type carrier 1011 from one position to another. There are a series of similar connections provided for each type carrier 1011. Sleeves 1010 are nested in the usual manner to permit relative movement of the type carriers 1011. The supporting means for the parts just described (except the sleeves 1010 and the type carrier 1011) comprises the supporting frames 265 and 1014 (Figs. 47 and 53) of the transmission line. Frame 1014 is pivoted upon a large bushing 1015 (Figs. 2 and 52) extending into an inclined notch 1015' (Fig. 56) provided in side frame 11 of the machine. The left hand end, as viewed from the front of the machine, of shaft 264 (Fig. 53) of the transmission line is journaled in a sleeve 1016 pressed within an aperture provided near the lower end of frame 1014. This sleeve surrounds the left hand end of shaft 264 and also fits in an aperture provided at the lower end of frame 265 (Fig. 47). A nut 1016b is screwed to the end of sleeve 1016 to hold the parts in proper position. Gears 277, 296, and 309, it will be remembered, are loosely pivoted on sleeve 1016.

Loosely pivoted on sleeve 1016 adjacent frames 265 and 1014, respectively, is a pair of bell crank levers 1020 and 1021, (Figs. 52 and 53), which levers are integrally connected by means of tie rods 1022 and 1023, the rod 1022, as will be pointed out hereinafter, is provided to restore the beams 1003 to normal position. The rearwardly extending arms 1024 and 1025, respectively, of bell crank levers 1020 and 1021 are provided at their free ends with contacting surfaces 1026 and 1027 which are adapted to be engaged by a pair of rollers 1028 and 1029, respectively, extending laterally from a pair of arms 1030 and 1031 of a yoke member 1032 pivoted on a rod 1033 journaled in the supporting frames 11 and 13. Yoke 1032 is adapted to be rocked at the proper time by means of a rearwardly extending arm 1034 (Fig. 47) integral therewith, which is engaged by a pin 1035 extending laterally from a gear 1036 pinned to the main shaft 20.

The operation of the parts just described is as follows:

Upon operation of the machine after a key in each group has been depressed, the differential segments 242 associated therewith will, through the transmission line, actuate gears 277, 296, and 309 (Fig. 2) in the manner described hereinbefore. These gears, in turn, will actuate their related gear segments 1000 (Fig. 53) in a counterclockwise direction. By this action, the beams 1003 will be actuated about the concentric surfaces 1008 provided on segments 1000 thereby rocking segmental gears 1006 in a counterclockwise direction, which gears in turn will actuate gears 1009 to position the related type carriers 1011 (Fig. 72) the proper amount. When the type carriers 1011 have been adjusted in this manner, they will be locked in position by holding detents 1043 (Fig. 53) in a manner which will be hereinafter described. Upon further operation of the machine, gears 277, 296, and 309 will be restored to normal position bringing segmental gears 1000 also to normal position. However, since gears 1009 are locked against movement, gear segments 1006 will also be held against movement with the result that beams 1003 will fulcrum about studs 1005 as pivots, and thus be caused to move away from the concentric surfaces 1008 provided on segmental gears 1000. When the beams 1003 are moved in this manner they in turn will rock bell crank levers 1020 and 1021 in a counterclockwise direction. This action is permitted since, at this time, stud 1035 (Fig. 47) carried by gear 1036 will be out of engagement with arm 1034 of yoke member 1032. Now, upon a subsequent operation of the machine, gears 277, 296, and 309 will again be adjusted by their respective differential segments 242 to again actuate their cooperating segmental gears 1000 in the manner previously described. This action takes place after locking detents 1043 have been moved out of engagement with gears 1009. At the same time, stud 1035 will engage arm 1034 to rock bell crank levers 1020 and 1021 in a clockwise direction causing rod 1022 to engage the beams 1003 to restore them against the surfaces 1008 of gears 1000. Thus it is seen that beams 1003 are actuated both toward the concentric surfaces 1008 of segments 1000 and also about these surfaces as a center with the result that their related segmental gears 1000 and type carriers 1011 will be adjusted an amount corresponding to the resultant of these movements. Thus it is clear that the type carriers 1011 will be adjusted to their new position without first being restored to zero.

Referring to Figs. 47, 52, and 53, it will be seen that the supporting frames 265 and 1014 for the transmission line are each provided, at a point slightly above its pivot, with an apertured projection 1040 for receiving a supporting rod 1041. Pivoted on rod 1041 and overlying each gear 1009 is a locking pawl 1042 provided with a detent 1043 which is adapted to engage the teeth of its associated gear 1009. An eccentric hub 1044 which extends from a spacing disc 1045 extends into the pivot aperture of each pawl, as shown in Fig. 52. This mechanism is provided to enable manual adjustment of the pivot of the pawls so that each may be individually adjusted to insure proper alinement of the gears 1009. All of the spacing discs 1045 are normally held firmly in position by a cross-bar 1046 (Figs. 52 and 53) mounted in the extension 1047 and 1048 of a bail 1049 also pivoted on the rod 1041 adjacent the frames 265 and 1014. The locking bar 1046 is provided with a depression 1046' along substantially its full length so that by merely turning this bar to bring this depression adjacent the discs 1045, adjustment of the hubs can be readily effected, after which the bar may be returned to its original position and locked in any suitable manner. As best shown in Fig. 52 the bail 1049 overlies all of the locking pawls 1042 and a coil spring 1050 (Fig. 53) is interposed between each pawl 1042 and the bail so that when the parts are in the position shown in these figures, the gears 1009 can be rotated against the slight tension of the springs 1050. However, during the early part of an operation of the machine or immediately after the gears 1009 have been adjusted by the differential segments, the bail 1049 will be moved downwardly to rest substantially against the pawls 1042 and thereby prevent any further movement of the gears 1009. To move the bail 1049 to locking position, a lever 1051 pivoted at 1052 is provided. The forwardly extending arm of the lever 1051 lies over a stud on the arm 1049a of bail 1049, while the rearwardly extending end of lever 1051 is adapted to engage the periphery of a large disc 1053 pinned to a gear 1140. When the parts are in their normal position a notch 1054 in the disc 1053 registers with the end of lever 1051 to permit movement of the bail 1049 and also adjustment of the associated parts.

The consecutive numbering device associated with the check and slip mechanism consists of five type wheels 1060 (Fig. 72) mounted upon the shaft 1012. The actuating means for this consecutive numbering device is of the usual deep notch type well known in the art and shown in the United States patent to Thomas Carney, No. 876,295. The consecutive counter corresponds at all times with the consecutive counter 380 (Fig. 33) in the totalizer reel.

Figure 72:
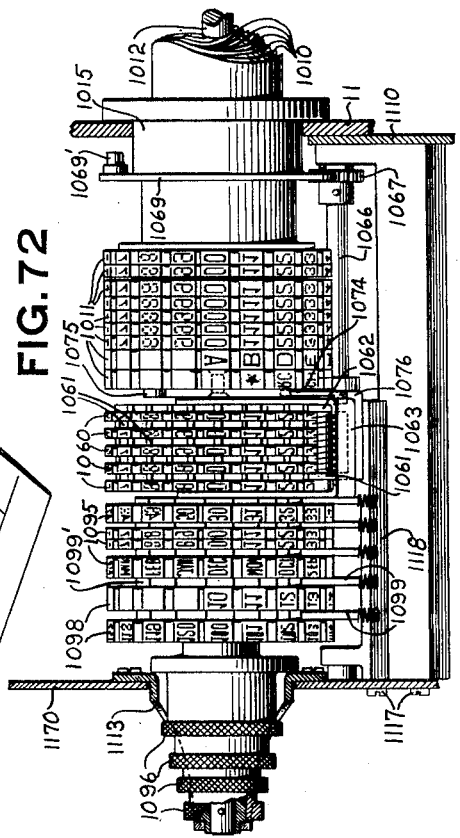
Fig. 72 is a plan view of the type carrying elements associated with the check and slip printing mechanism.

Referring to Fig. 72 it will be seen that adjacent the consecutive numbering type carriers are four date type wheels 1095, each of which is adapted to be set manually by a corresponding knurled knob 1096 extending to the left of the type line. This mechanism is well known in the art and therefore a detailed description thereof is unnecessary. It may be stated, however, that the knurled knobs 1096 are suitably connected to the type wheels 1095 by nested sleeves mounted on shaft 1012 in a well known manner and that adjustment of the knobs will consequently adjust the type carriers. The knobs 1096 are indexed in the usual manner so that the position of the type carriers associated therewith may be ascertained. The two remaining type carriers 1098 located to the left of the date wheels 1095 are provided for printing information often desirable in certain business systems. For example, it may be desired to print a character identifying the machine from which the checks have been issued as well as to print a character designating the particular store in which the machine is installed. For this reason, one of the type wheels 1098 bears numbers designating the machine while the other bears the number assigned to the store in which the machine is located. It will be noted from the drawings that all of the date wheels 1095, and the type wheels 1098, are held in position by spring pressed detent pawls 1099 carried by a bar 1118 (Fig. 72). These pawls 1099 cooperate with notched disks 1099' secured to the type wheels 1095 and 1098. The type wheels 1098 have no outer connections for adjusting them since their position is not changed after the machine has been installed. Therefore, these wheels are set before the cabinet is placed upon the machine. However, if at any time it is desired to change the positions of these wheels, access may be had thereto through a door located at the left of the machine.

Figure 68:
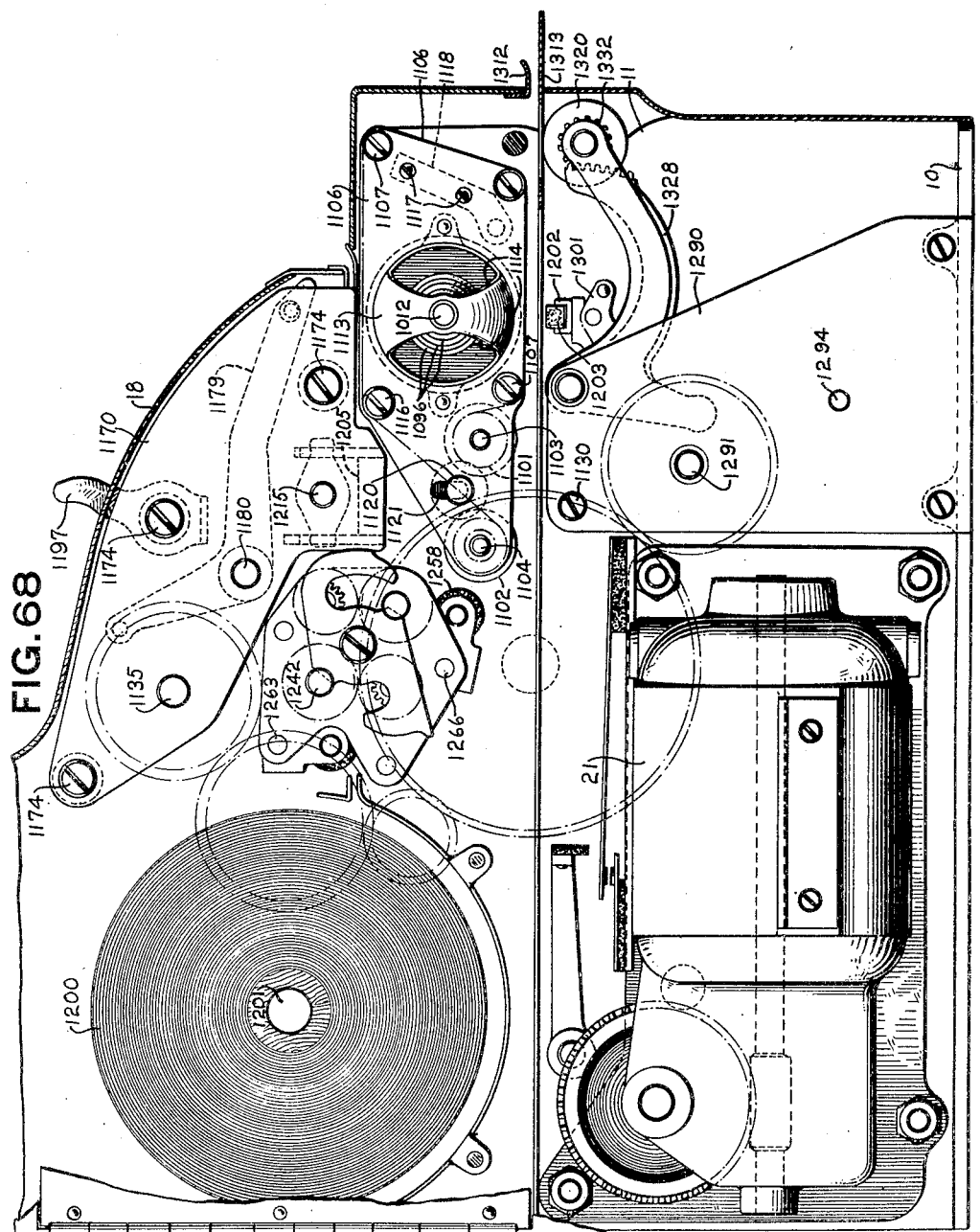
Fig. 68 is a complete left-end view of the machine taken inside of the cabinet, particularly showing the arrangement and location of the check and slip printing mechanisms.

The inking ribbon 1100 (Fig. 60) associated with the check and slip printing mechanism is carried by a pair of spools 1101 and 1102 pivotally supported on studs 1103 and 1104, respectively, provided in a supporting frame 1106. Fixed to and projecting inwardly from frame 1106 are three supporting rods 1107, and a tube 1108. The rods 1107 are adapted to extend into apertures 1109 (Fig. 56) provided in main supporting frame 11, and in a bracket 1110. Bracket 1110 is rigidly secured to side frame 11 by screws 1111. Tube 1108 (Fig. 60) embraces a rod 1071 (Figs. 56 and 60) which is fixed to and extends outwardly from the side frame 11. The frame 1106 (Figs. 60 and 68) carries at its outer side a circular bracket 1113 (Fig. 68) which projects slightly beyond the left side of the cabinet. Bracket 1113 is provided with large openings 1114 to permit access to the knobs 1096 (Fig. 72) for adjusting the date type wheels 1193. Bracket 1113 is provided mainly to form a support for the outer end of shaft 1012 which shaft it will be remembered supports all of the type wheels for the check and slip printing mechanism. The ribbon frame is held in position by means of screws 1116 and 1117 as shown in Fig. 68, the screw 1116 being attached to the outer end of rod 1071 while the screws 1117 are fastened to one end of a spacing block 1118, which block is fastened at its other end to the bracket 1110 (Fig. 56). In order to hold the ribbon spools 1101 and 1102 (Fig. 60) on their supporting studs 1103 and 1104 so that they may be removed from the machine when the ribbon frame 1106 is drawn outwardly, a retaining member 1120 is provided (Fig. 68), which is adapted to slide in a slot 1121 provided in plate 1106. Member 1120, due to gravity, normally lies at the bottom of slot 1121 and carries a disc 1122 which is adapted to engage the inner sides of the flanges 1123 provided on spools 1101 and 1102 so that when the frame is removed from the machine the spools being thus held in place will also be removed from the machine. If it is desired to remove the ribbon spools from their studs, it is only necessary to move the member 1120 upwardly so as to disengage disc 1122 from the flanges of the spools.

As shown in Fig. 60, the inking ribbon 1100 passes from the rear spool 1102 over the top of guide roll 1125, thence forwardly over another guide roll 1126, thence downwardly and rearwardly over the guide rolls 1127 and 1128, thence about spool 1101. Thus it is seen that a single ribbon may be used for both the check and slip printing mechanisms. From the above construction it is clear that when it is desired to replace a ribbon it is only necessary to remove the screws 1116 and 1117 (Fig. 68) and pull the structure outwardly until the tube 1108 (Fig. 60) has cleared the rod 1071. Since the rods 1107 and tube 1108 are secured to plate 1106, the ribbon guides as well as the spools themselves will be removed as a unit.

The mechanism for feeding and reversing the inking ribbon 1100 is similar to that associated with the record strip printing mechanism previously described, and therefore it is unnecessary to describe this mechanism in detail.

The mechanism for printing, feeding, perforating, and severing the issued checks will now be described in detail. These mechanisms are located above the ribbon frame just described and extend slightly to the rear thereof, as is clearly shown in Figs. 54, 60, and 68.

Referring to Fig. 47, it will be seen that the gear 1036 fixed to the main driving shaft 20 meshes with an intermittent gear 1137 fixed to shaft 653. These gears are so constructed that the gear 1036 is moved independently of gear 1137 during its first 90° of movement, thus allowing the type carriers 1011 (Fig. 72) to be adjusted before any movement is imparted to gear 1137 (Fig. 47). Gear 1137, as was pointed out before, is fixed to a short shaft 653, which shaft has also fixed thereto another gear 1139 (Figs. 53 and 54), which gear in turn meshes with a large gear 1140 pivoted on shaft 386. Gear 1140 meshes with an idler gear 1141 pinned to a stub shaft 1142 which is journaled in suitable bearings in side frame 11. Shaft 1142 at its outer end has pinned thereto a similar gear 1142' (Figs. 54 and 56) which meshes with a gear 1143 pivoted on a stud 1144 projecting outwardly from side frame 11. This gear meshes with a gear 1145 (Figs. 53 and 54) loosely mounted on the shaft 1135, which shaft carries the actuating means for operating the printing, feeding, perforating and severing mechanisms for the issued checks. Normally the shaft 1135 will not be rotated since gear 1145 is loosely mounted thereon. However, for cash, received on account, and paid out transactions, certain mechanism will be operated to cause coupling of gear 1145 with the shaft 1135, with the result that the check issuing mechanism will then be operated. The mechanism for causing this coupling action to take place between gear 1145 and the shaft 1135 will now be described in detail.

Figure 54:
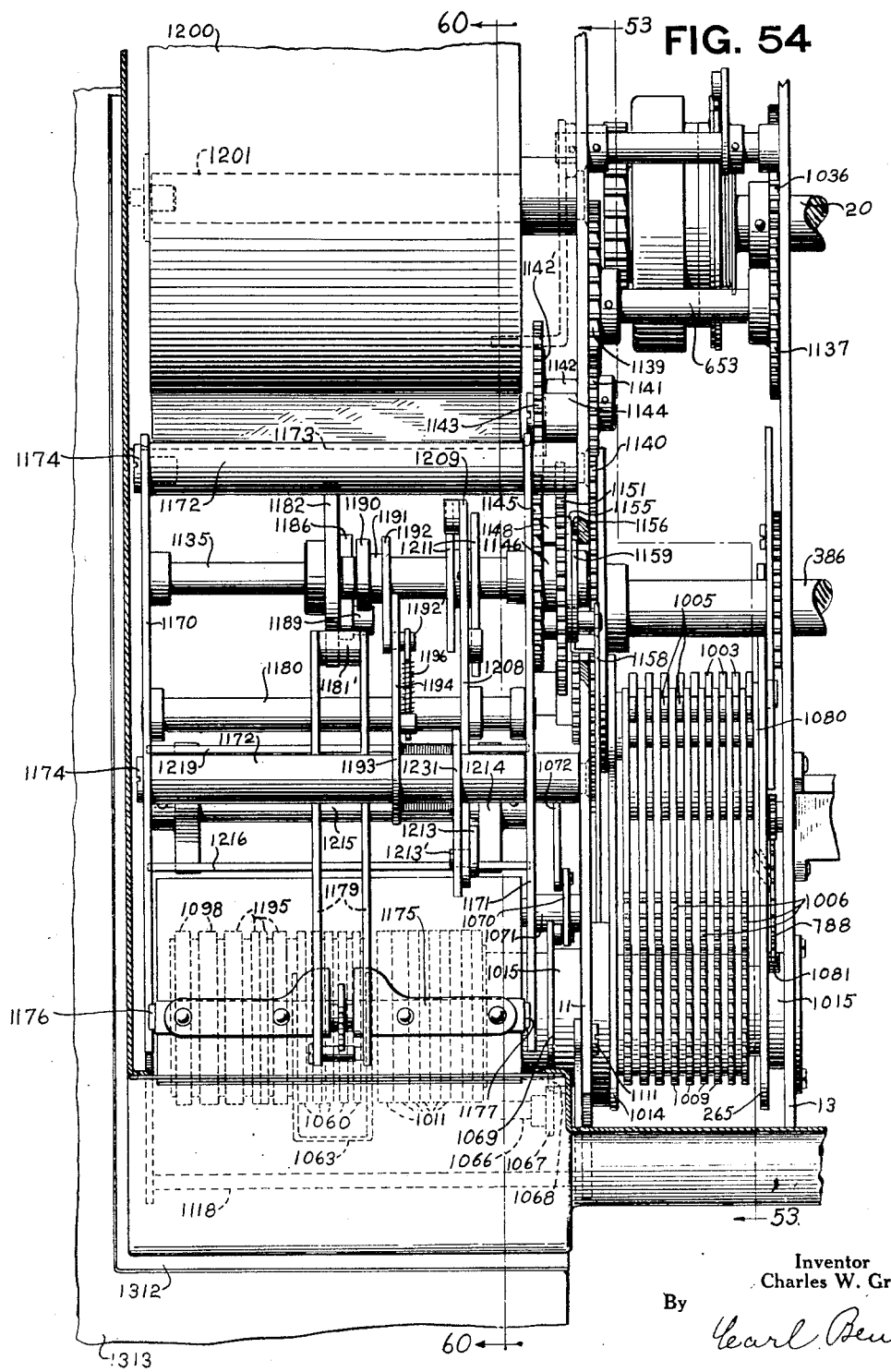
Fig. 54 is a sectional plan view with parts broken away showing the check printing mechanism.

Referring to Figs. 54, 56, and 57, it will be seen that gear 1145 has fixed thereto a hub 1146 formed with a projection 1147. This projection is adapted to be engaged by a hook provided on a pawl 1148 pivoted at 1150 upon a gear 1151, which gear is pinned to the shaft 1135. Pawl 1148 is provided at its forward end with a pin 1152 which projects through an enlarged opening 1153 formed in gear 1151 and is adapted to normally engage in a notch 1154 provided in a stationary disc 1155. Disc 1155 is loosely mounted on the shaft 1135 and lies adjacent to gear 1151. This disc is held against movement by a pin 1156 extending from the supporting frame 11, as shown in Fig. 54. Pin 1152 is held in notch 1154 of the stationary disc 1155 by a projection 1157 formed on a spring urged link 1158. Thus it is seen that pawl 1148 is normally held out of engagement with projection 1147 of hub 1146 and therefore the check issuing mechanism is disabled for operation. Attached to the upper end of link 1158 and loosely mounted on shaft 1135 adjacent the stationary disc 1155 is a segmental cam plate 1159. The cam portion 1160 of plate 1159 normally rests upon stud 1152, as shown in Fig. 56. The lower end of link 1158 is provided with a stud 1158' which is engaged by the hook portion 1161' of a lever 1161 pivoted at 1162 to side frame 11. The rearward end of lever 1161 is provided with a projection 1163 which is adapted to cooperate with a cam 1164, as shown in Fig. 56. Cam 1164 is fixed to a bushing 1165 which in turn is pinned to shaft 269 of the transmission mechanism. It will be remembered that shaft 269 receives its motion from the differential segment 242 associated with the transaction bank of keys. Cam 1164 will thus be adjusted according to the extent of movement of the transaction differential 242. As shown in Fig. 56, when the cash key is depressed and the machine subsequently operated, the raised portion of cam 1164 will engage projection 1163 of lever 1161 thereby rocking the latter in a counterclockwise direction about pivot 1162, causing the hook portion provided at the forward end of lever 1161 to move link 1158 downwardly against the tension of its spring. By this action, cam 1159 will be rocked in a counterclockwise direction thereby rocking pawl 1148 in a counterclockwise direction (as viewed in Fig. 57) causing the hook portion provided at the end thereof to engage projection 1147 of hub 1146. Gear 1145 will thus be coupled to gear 1151. The latter, it will be remembered is pinned to shaft 1135. Now, upon a further operation of the machine, gear 1145 will actuate shaft 1135 to cause a check to be issued. By inspection of the raised portions of cam 1164, it is seen that for received on account and paid out transactions also, lever 1161 will be rocked in a counterclockwise direction to effect coupling of gear 1145 with shaft 1135, and thus a check will be issued for received on account and paid out transactions also. For a charge transaction a cut-away portion of cam 1164 will be moved in alignment with projection 1163 and, consequently, gear 1145 will not be coupled to shaft 1135, with the result that no check will be issued for a charge transaction. The same is true for no sale transactions in that lever 1161 will not be held in operated position to effect coupling of gear 1145 with shaft 1135. Thus it is seen that a check will be issued only for cash, received on account, and paid out transactions.

Referring to Figs. 54, 60, and 68, it will be seen that shaft 1135 is journaled in a pair of supporting frames 1170 and 1171. These frames are held in spaced relationship by connecting tubes 1172. Each tube 1172 is mounted on a laterally extending rod 1173 which is riveted to side frame 11. The outer end of each rod 1173 is provided with an internal thread for receiving an assembling screw 1174, as shown in Figs. 54 and 68. Thus by removing the screws 1174 the frames 1170 and 1171 and the parts supported thereby may be removed from the machine.

Referring to Fig. 60, it will be seen that a platen 1175 is provided to effect printing impressions from the type line upon the issued checks. Platen 1175 is guided in grooves 1176 and 1177 (Fig. 54) formed in the supporting frames 1170 and 1171 respectively. Fitted within the platen frame is an impression block 1178. Platen 1175 is adjustably supported by a pair of operating arms 1179. These arms are pivoted intermediate their ends on a rod 1180 supported by frames 1170 and 1171 and are connected at their upper rear ends by a pin 1181 upon which is mounted an anti-friction roller 1181', as shown in Figs. 54 and 60. A cam 1182 fixed to shaft 1135 is adapted to engage roller 1181' to actuate platen 1175 to effect printing upon the issued checks. A spring 1184 urges arms 1179 in a clockwise direction and thus retains the impression block 1178 out of engagement with the type carriers except when it is actuated by cam 1182 to effect printing upon the checks. As was pointed out hereinbefore, mechanism is provided to regulate the number of printing impressions to be effected by platen 1175 during an operation of the machine so that either "straight" checks or "stub" checks may be issued. This mechanism will now be described in detail.

Referring to Figs. 54 and 59, it will be seen that a pawl 1186 is pivoted at 1187 to a cam 1182. This pawl is provided with a cam portion 1188 which is adapted to engage roller 1181' when cam 1182 is actuated. Pawl 1186 has attached thereto an anti-friction roller 1189 which engages a snail cam 1190 loosely mounted on shaft 1135. Cam 1190 is connected to an arm 1192 by a sleeve 1191, Fig. 54, loosely mounted on shaft 1135. Arm 1192 (Fig. 59) is provided with a laterally extending stud 1192' which projects into an open slot provided in a spring urged plunger 1196 which is slidably mounted on the rearwardly extending arm 1194 of a lever 1193. Lever 1193 is loosely mounted on the sleeve 1172, provided on rod 1173. The substantially vertical arm 1197 of lever 1193 extends through a slot provided near the top of the cabinet, as shown in Fig. 60. The rearwardly extending arm 1194 of lever 1193 is also provided with an open slot for receiving the stud 1192' provided on arm 1192. Arm 1194 of lever 1193 is also provided with a pair of guiding extensions 1195 for the purpose of holding the parts in proper position. As shown in Fig. 59, pawl 1186 is held in position by means of a tail integral therewith which engages a collar on shaft 1135 (Fig. 54). Fig. 59 shows the position of the parts when lever 1193 is in "stub" check position. When the parts are in this position and cam 1182 is rotated in the direction of the arrow in Fig. 60, cam portion 1188, of pawl 1186 will first engage roller 1181' to rock platen 1175 downwardly to effect a printing impression upon the check strip. Shortly thereafter, cam portion 1183 of cam 1182 will engage roller 1181' and again cause a printing impression to be made upon the check. Adjacent to the arm 1197 of lever 1193 is provided an index plate bearing the legends "straight" check and "stub" check. When arm 1197 is swung downwardly to "straight" check position, the rearwardly extending arm 1194 thereof will swing upwardly with the result that arm 1192 will be swung in clockwise direction to carry the raised portion of cam 1190' to the right of its normal position. It is also seen that when lever 1193 is swung in this manner and pin 1192 passes beyond the center line connecting the pivot points of arm 1194 and arm 1192, the spring surrounding the plunger 1196 will exert a force on arm 1192, thereby tending to rock the same in a clockwise direction about its pivot until the lower extension 1195 provided at the rear end of arm 1194 engages a sleeve on shaft 1135 thus limiting the movement of arm 1192 and lever 1193. When the parts are in the position shown in Fig. 59, it is seen that the upper extension 1195 of arm 1194 limits the movement of the parts when lever 1193 is moved to "stub" check position. The operation of the parts just described, when lever 1193 is moved to "straight" check position is as follows. When lever 1193 is moved downwardly from the position shown in Fig. 60, the rearwardly extending arm 1194 will be moved upwardly carrying plunger 1196 with it, with the result that arm 1192 will be rocked about shaft 1135 in a clockwise direction until the lower extension 1195 stops the movement. The spring surrounding plunger 1196 will tend to retain the parts in this position. By this action the raised portion 1190' of cam 1190 will be moved to the right of its normal position. Now, upon movement of cam 1182, as aforesaid, pawl 1186 will be carried therewith and when cam portion 1188 of pawl 1186 reaches roller 1181', the roller 1189 carried by pawl 1186 will register with the reduced portion of cam 1190. Consequently, pawl 1186 will be rocked slightly in a clockwise direction bringing the cam portion 1188 thereof toward the shaft 1135 and therefore no motion will be imparted to platen 1175. Upon continued movement of cam 1182, however, when the raised portion 1183 thereof engages roller 1181', the platen will be lowered to effect a printing impression upon the check. Thus, it is seen that when the lever 1193 is in "straight" check position, only one impression will be made upon the check. When lever 1193, however, is moved upwardly to "stub" check position, the parts will again assume the position shown in Figs. 59 and 60. The raised portion 1190' of cam 1190 will then be effective to hold pawl 1186 in operative position so that the cam portion 1188 thereof when brought into engagement with roller 1181' will actuate platen 1175 to effect a printing impression upon the check. Shortly thereafter the raised portion 1183 of cam 1182 will engage roller 1181' to effect a second impression upon the check.

The check material is drawn from a storage roll 1200 (Fig. 60) supported on a rod 1201, one end of which is riveted to supporting frame 11 (Fig. 54). From the storage roll 1200, the check strip passes through a guide channel 1202 (Fig. 60) and thence between two sets of electro rolls 1255 and 1256 and their cooperating feeding rollers 1203 and 1204, respectively. The strip then passes over a block 1205 associated with the perforating and severing mechanism and thence through a second guide channel and over the type carriers where it receives a printing impression, and thence through an opening provided at the front of the cabinet. As shown in Figs. 54 and 60, a lever 1208 is pivoted upon rod 1180 near the right hand end thereof. The rearwardly extending arm 1209 of lever 1208 carries a pair of rollers 1210 which cooperate with companion cams 1211 which are secured to the shaft 1135. The forward end 1212 of lever 1208 is provided with a substantially L-shaped slot 1233. Projecting into slot 1233 is a stud 1213' provided at the upper end of a link 1213. The lower end of link 1213 is pivoted to a rockable member 1214 pinned to a rod 1215, journaled in supporting frames 1170 and 1171.

Referring to Fig. 63, it will be seen that rod 1215 has fixed thereto a second rockable member 1214' similar to member 1214. The forward ends of members 1214 and 1214' extend through slots provided in a reciprocating blade 1216. Blade 1216 is guided in slots 1217 and 1218 provided in supporting frames 1170 and 1171, respectively. Blade 1216 is provided with the usual cutting edge which cooperates with a straight edge 1221 (Fig. 60) fixed to block 1205. The rearward end of members 1214 and 1214' (Fig. 63) project into slots provided in a perforating member 1220 which is fixed to a supporting bar 1219. Bar 1219 is also guided in slots provided in supporting frames 1170 and 1171.

Figure 71:
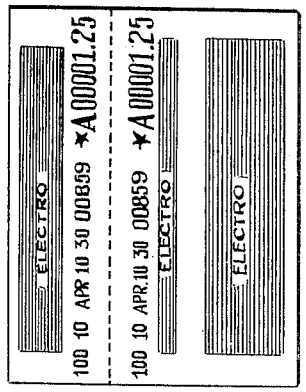
Fig. 71 shows a sample of a check bearing a double impression with a perforation between the two imprints.

Referring to Fig. 60, it will be seen that the perforating member 1220 cooperates with a pad 1222 composed of soft material. This is provided to form a bearing for the portion of the check paper acted upon by the perforating member, and at the same time prevent destruction of the serration of the said edge during the perforating operation. Fig. 60, it will be remembered, shows the position of the parts when lever 1193 is in "stub" check position. When the parts are in this position and the machine is subsequently operated, it will be seen that lever 1208, through its connection with cam 1211 and its follower, is first rocked in a clockwise direction about rod 1180. By this action members 1214 and 1214' will be rocked in a clockwise direction with the result that the serrated edge of member 1220 will be brought into engagement with the check to perforate the same. During the continued movement of the companion cams 1211, the feeding rollers 1203 and 1204 will become effective to feed the check strip its first step of movement. Following this, platen 1175 will then be operated to effect a printing impression upon the check. Upon further operation of the machine, feeding rollers 1203 and 1204 will become effective to advance the strip a second step, after which a second printing impression is made upon the check. Immediately after the last printing impression, lever 1208 will be rocked in a counterclockwise direction by campanion cams 1211, which movement imparts a counterclockwise movement to members 1214 and 1214' with the result that blade 1216 will be lowered sufficiently to sever the check from the strip. After these operations, the check will have been moved into the channel 1225 and the end portion thereof will protrude outwardly sufficiently to enable the operator to remove the same. The forward end of the check strip now lies adjacent the blade 1216. A sample of the matter printed upon the check is shown in Fig. 71. The electro rolls 1255 and 1256 print advertising matter upon the check strip as it is fed from the roll 1200.

When it is desired to issue "straight" checks, lever 1193 is moved downwardly as described hereinbefore to so condition the mechanism that only one printing impression will be made upon the check strip. When it is desired to issue such checks, the perforating mechanism is also disabled. The mechanism for disabling the perforating means will now be described in detail.

Referring to Fig. 60, it will be seen that lever 1193 is provided with a downwardly extending arm 1231 having an arcuate slot 1230 provided at the lower end thereof. Stud 1213' secured on the upper end of link 1213 and extending through lever 1208, also extends into slot 1230. Thus, it is seen that when lever 1193 is rocked downwardly link 1213 will be swung rearwardly about its pivot thereby bringing stud 1213' into the enlarged portion of slot 1233 provided at the forward end of lever 1208. Now, upon an operation of the machine, it will be seen that when companion cams 1211 actuate lever 1208 in a clockwise direction, no motion will be imparted to members 1214 and 1214', and to the perforating member 1220. However, later in the cycle of movement of companion cams 1211, lever 1208 will be rocked in a counterclockwise direction to actuate blade 1216 to effect severance of the check, in the manner previously described. Thus, it is seen that a simple mechanism is provided which effectively disables the perforating means when "straight" checks are to be issued.

In order to protect the check strip against the operating parts as well as to prevent the strip from buckling during operation of the perforating and severing mechanisms, a guard 1235 is provided. This guard is located substantially between the blade 1216 and perforating member 1220 and is retained in its position by a pair of upwardly extending apertured ears 1236, through which rod 1215 extends, as shown in Fig. 60. This guard also acts as a guide for the check strip so that it will readily pass through the channel 1225 formed in the guard plate 1226.

As was stated hereinbefore, two sets of feeding rollers are provided to advance the check strip step-by-step during the printing and perforating operations. To produce this action, a train of gears operating intermittently is provided. As shown in Figs. 54, 56, 60, 63, 64, 66 and 67, the gear 1151 (Figs. 54 and 56) fixed to the shaft 1135, meshes with a gear 1243 (Figs. 56 and 67) mounted on a collar 1244 journalled on rod 1242. This gear has fixed thereto a gear 1240 also mounted on collar 1244. Gear 1240 meshes with a gear 1246 having fixed thereto a collar 1247 loosely mounted on a rod 1248. Both of these rods 1242 and 1248 are riveted at one end to the supporting frame 11. Collars 1244 and 1247 are each provided with a slot 1249 (slot 1249 in collar 1244 being shown in Figs. 63 and 67), for receiving a projection 1249' extending from electro-rolls 1255 and 1256 (Fig. 64). The electro-rolls 1255 and 1256 are loose on rods 1242 and 1248, respectively. Therefore, it is seen that when the gear 1151 (Fig. 56) is rotated it will intermittently rotate the gears 1243 and 1246 and through the connections just described will rotate electro-rolls 1255 and 1256 (Fig. 60) which, it will be remembered, cooperate with the feeding rolls 1203 and 1204, respectively, to feed the check strip. The electro-rolls 1255 and 1256 may print any desired form of advertising matter upon the checks as they are fed from the supply roll 1200. A pair of inking rolls 1257 and 1258 cooperate with electro-rolls 1255 and 1256, respectively, and thus, supply the same with the necessary ink to effect printing upon the check strip. The inking rolls 1257 and 1258 are each supported by a pair of integrally connected arms 1267 (Fig. 64) pivotally mounted on rods 1263 and 1266, respectively. Rod 1263 (Fig. 66) is supported at one end in the upper portion of plate 1260 and at the other end in a plate 1261, (Fig. 64) while rod 1266 (Fig. 66) is supported at one end in a plate 1260 and at its other end in the plate 1262 (Fig. 64). As shown in the above mentioned figures, the rods 1242 and 1248 supporting the electro-rolls 1255 and 1256 respectively, are fixed at one end to side frame 11, while the other end thereof is supported in plate 1260. Plates 1261 and 1262 are rigidly secured to plate 1260 in spaced relationship thereto by tie rods 1263, 1264, 1265 and 1266.

The pressure feeding rollers 1203, and 1204 which, it will be remembered, cooperate with electro-rolls 1255 and 1256, respectively, are tubular in form. An eccentric core 1269 (Fig. 60) is fitted within each pressure roll 1203 and 1204. The rod 1275 for pressure roll 1203 projects into the core 1269 associated with the pressure roll 1203 while the rod 1276 projects into the core 1269 associated with the pressure roll 1204. The core 1269 associated with the pressure roll 1203 has fixed to the outer end thereof a pinion 1271 (Fig. 66) while a similar pinion 1272 is fixed to the core 1269 associated with the pressure roll 1204. An adjusting gear 1273 meshes with pinions 1271 and 1272, as shown in Figs. 66 and 67. Gear 1273 is fixed to a locking plate 1274 which plate is pivoted upon a shouldered screw 1275' fixed to plate 1260. From the construction of the parts just described, it will be seen that in order to adjust the pressure rolls 1203 and 1204, it is only necessary to rock plate 1274 to slightly rotate gear 1273 which in turn will impart motion to gears 1271 and 1272, respectively, to adjust the pressure rolls either toward or away from their respective electro-rolls depending upon whether a greater or lesser amount of pressure is desired between these sets of rolls. For the purpose of retaining the parts in adjusted position, locking plate 1274 is provided with notches 1277 and 1278 which are adapted to engage in annular grooves 1279 provided at the outer ends of rods 1242 and 1248, respectively. From the construction of the parts just described, it is seen that when it is desired to remove this unit from the machine, plate 1274 is first rocked to disengage its notches 1277 and 1278 from the grooves 1279, aforesaid. By this action the pressure rolls 1203 and 1204 will be moved away from their related electro-rolls 1255 and 1256, respectively. Then by simply drawing plate 1260 outwardly the pressure rolls 1203 and 1204 will be drawn from their supporting rods 1275 and 1276 (Figs. 60, 66 and 67). It is clear that since the rods 1242 and 1248 supporting electro-rolls 1255 and 1256 are fixed to frame 11, these rolls will remain in place during the removal of the other parts just mentioned. However, when the parts just described have been removed access may be had to the electro-rolls for adjusting the same or changing the electro-type provided thereon. The inking rolls 1257 and 1258 being attached to the plate 1260 in the manner previously described will also be removed when plate 1260 is drawn outwardly. The plates 1261 and 1262, it will be noted from Fig. 64, are so constructed that they will not interfere with the electro-rolls during the removal of the parts.

The mechanism for printing upon and feeding the inserted sales slips will now be described. Referring to Fig. 60, it will be seen that these mechanisms are located substantially below the type line and are suitably supported in side frame 11, and the auxiliary supporting frame 1290, Figs. 65 and 68. A shaft 1291 (Fig. 60) is provided, which shaft, like shaft 1135 associated with the check printing mechanism, drives the operating parts for the slip printing mechanism through a clutch. This clutch, like that associated with the check printing mechanism, is also controlled by the transaction bank of keys. As shown in Figs. 55 and 56, the bushing 1165 fixed to the shaft 269 of the transmission line, is provided with a second cam 1292 which is similar in construction to cam 1164. The raised portions of cams 1164 and 1292 are not in alinement, however. The purpose of arranging the cams in this manner will be clearly pointed out hereinafter. Cam 1292 cooperates with a lever 1293 pinned to shaft 1294, which shaft is journaled in side frame 11 and auxiliary supporting frame 1290, as shown in Fig. 55. Pinned to shaft 1294 is a rearwardly extending arm 1295 (Fig. 56), to which is pivoted the lower end of a link 1296 whose function is similar to that of the link 1158 for controlling the clutch mechanism associated with the check printing mechanism. The various elements comprised in the clutch mechanism proper associated with the slip printing mechanism are the same in all respects as that previously described in connection with the check printing mechanism and therefore a detailed description of the same is unnecessary. However, the structure and operation of the mechanism will be reviewed, and in so doing the corresponding parts of the two clutches will be similarly numbered. It will be remembered that the raised portions of the cam 1164 associated with the check printing mechanism are so adjusted that for cash, received on account, and paid out transactions they will engage the projection 1163 provided on lever 1161 and through the link 1158 gear 1145 (Fig. 57) will be positively connected to shaft 1135 (Fig. 56) so that upon operation of the machine for these transactions, a check will be issued. Cam 1292 associated with the slip printing mechanism is so positioned on the bushing 1165 that for charge transactions the raised portion thereof will engage a projection provided on arm 1293 with the result that printing will occur upon inserted slips for those transactions. When the projection on lever 1293 engages the raised portion of cam 1292, shaft 1294 will be rocked in a clockwise direction. By this action arm 1295 will also be rocked in a clockwise direction carrying link 1296 downwardly. Link 1296 is connected at its upper end to a cam plate 1159' (Fig. 58) having a cam portion 1160' normally engaging a stud 1152' provided at the lower end of a pawl 1148', pivoted at 1150' to a disc 1145' fixed to shaft 1291. Stud 1152' projects through a radial slot 1153' provided in disc 1145'. Normally stud 1152' engages in a notch 1154' provided in a stationary disc 1155'. The disk 1155' is held stationary by being connected by a pin 1156' to a bar 1297 supported on the shafts 1291 and 1294. A hub 1146' is fixed to a disc 1245 (Fig. 55) which in turn is fixed to cam 1132. Hub 1146' is provided with a projection 1147' which is adapted to be engaged by the hook provided at the end of pawl 1148'. From the construction of the parts described it is clear that when a charge key is depressed, and the machine is then operated, shaft 269 (Fig. 56) will be rocked in a counterclockwise direction, thereby bringing the raised portion of cam 1292 into engagement with lever 1293 and rocking shaft 1294 in a clockwise direction. This causes arm 1295, which also is fixed to shaft 1294, to rock downwardly, thereby causing cam plate 1159' (Figs. 55 and 58) to cam lever 1148' in a counterclockwise direction to engage the hook portion thereof with the projection 1147' provided on hub 1146'. Now, when disc 1145' is rotated by movement of plate 1245 through the clutch mechanism just described, the slip printing and feeding mechanism will be actuated. From the construction of cam 1292 (Fig. 56), it is seen that for cash, received on account, paid out and no sale transactions, shaft 1294 will not be rocked in the manner just described and consequently, the slip printing mechanism will not be enabled for operation. The driving disc 1245 (Fig. 55) as was pointed out before, is fixed to the companion cams 1132, which cams, it will be remembered, are fixed to the sleeve 1133. It will be remembered that companion cams 1132 are given a complete rotation at each operation of the machine for the purpose of feeding the inking ribbon, consequently, disc 1245 will also be rotated through a complete revolution at each operation of the machine. Sleeve 1133 receives one end of shaft 1291, as shown in Fig. 55. The other end of shaft 1291 is journaled in the auxiliary supporting plate 1290. Mounted on a cross rod 1300, (Figs. 60 and 65) is a pair of arms 1301 which carry at their forward end a platen 1302. An impression block 1303 underlying all of the type wheels of the type line is fitted in the channel of platen 1302. Platen 1302 is guided for vertical reciprocatory movement in grooves 1304 and 1305, as shown in Fig. 65; groove 1304 being provided in the auxiliary plate 1290, while groove 1305 is provided in the bracket 1306 attached to the supporting frame 11. Arms 1301 are connected intermediate their ends by a pin 1307 carrying an anti-friction roller 1308. A cam 1309 provided with two raised cam portions 1310 and 1311 is fixed to shaft 1291. This cam engages anti-friction roller 1308 and is provided to actuate the platen 1302 to effect printing impressions upon the inserted sales slips. In the illustrated machine, since the cam 1309 is provided with the two cam portions 1310 and 1311, two printed impressions will be effected upon the inserted sales slips when the machine is operated for charge transactions. However, it is obvious that the cam 1309 may be so designed that any desired number of printing impressions may be effected upon the sales slip. For example, it is often desired to effect triplicate printing upon sales slips, and to sever a portion thereof carrying one of the printing impressions. This portion is then deposited in a retaining compartment contained within the machine. Such a construction obviously may be provided in the illustrated machine by slightly modifying the present construction of the parts. Referring to Fig. 60, it will be seen that the sales slips are inserted between the guide plate 1312 and the table 1313. These slips may be positioned by any suitable means, such as engraved lines provided on the table. By such a device the slips may be properly positioned in the machine to receive printed impressions thereon. Adjustable devices may also be provided so that slips of different sizes may be used. The table 1313 is provided with a suitable opening 1314 which permits the impression block 1303 to pass therethrough to effect a printing impression upon the inserted slips from the lower set of type provided on the type wheels previously described. To hold the slip in proper position during a printing operation, and also to feed the same between printing impressions, the following mechanism is provided.

Referring to Figs. 60, 61, 62, and 65, it will be seen that a pair of curved arms 1315 and 1316 (Figs. 60 and 65) are pinned to a cross rod 1317 journaled in side frame 11 and auxiliary frame 1290. Pressure feeding rollers 1319 and 1320 are supported on a rod 1318 journaled in the forward ends of arms 1315 and 1316. Integral with arm 1315 is a depending arm 1325 which carries an anti-friction roll 1326 (see also Fig. 61) at the lower end thereof, which is engaged by a cam 1327 fixed to shaft 1291. Thus, it is seen that when the machine is operated, cam 1327 will rock arms 1315 and 1316 in a clockwise direction to bring pressure rollers 1319 and 1320 upwardly into engagement with a cooperating roll 1321. In this manner the slips are held against movement. Loosely mounted on shaft 1317 and adjacent to arm 1315, as shown in Fig. 65, is a segmental gear 1328 which meshes with a pinion 1322 fixed to shaft 1318. The depending arm 1329 (Figs. 60 and 62), of segment 1328 is provided with an anti-friction roll which engages a cam 1330, also fixed to shaft 1291, as shown in Figs. 62 and 65. Cam 1330 is so constructed that no movement will be imparted to segmental gear 1328 until cam 1327 has rocked arms 1315 and 1316 upwardly to bring rollers 1319 and 1320 into engagement with roll 1321. When this occurs, cam 1330 will rock segmental gear 1328 in a clockwise direction thereby rotating feeding roller 1320 in a counterclockwise direction to feed the inserted slip between printing impressions. By inspection of the cams 1310, 1327 and 1330, it is seen that cam 1327 will first rock impression rollers 1319 and 1320 into engagement with their cooperating roll 1321. During this action segmental gear 1328 will be carried upwardly a slight distance by its associated cam 1330. When shaft 1291 has been rotated through substantially 180°, the first cam portion 1310 of cam 1309 will actuate the platen 1302 to effect the first printing impression upon the inserted slip. Upon continued movement of shaft 1291, the enlarged portion of cam 1330 will rock segmental gear 1328 in a clockwise direction, as viewed in Figs. 60 and 62, which movement is imparted to rollers 1319 and 1320 causing the latter to rotate slightly in a counterclockwise direction in the manner aforesaid, to feed the inserted slips the proper distance. When the slip has been brought to rest after being fed in this manner, the second cam portion 1311 on cam 1309 will actuate platen 1302 to effect a second printing impression upon the inserted slips. By this time, the reduced portion of cam 1327 will register with roller 1326 and the feeding rollers 1319 and 1320 will be lowered out of engagement with the inserted slip by gravity. It will also be seen that the reduced portion of cam 1330 will also be brought into registering position with respect to the anti-friction roller carried by depending arm 1329 of segmental gear 1328, and thus the latter will also be restored to normal position either by gravity or by a spring not shown. The slip may then be removed from the machine by the operator.

Mechanism is also provided to disable the check issuing mechanism for all transactions when it is desired to operate the same without issuing a check. Referring to Fig. 56, it will be seen that a bell crank lever 1340 is pivoted on a stud extending laterally from side frame 11, and projects through a slot formed in the front of the cabinet. The upwardly and rearwardly extending arm of lever 1340 is provided with an open slot for receiving the stud 1158' provided at the lower end of link 1158. A spring-urged detent 1344 is provided with two notches for receiving a laterally extending stud 1343 provided near the forward end of lever 1340. Thus it is seen that when it is desired to disable the check issuing mechanism, it is only necessary to rock lever 1340 in a clockwise direction about its pivot. By this action link 1158 will be moved rearwardly a slight distance to bring the stud 1158' carried thereby into the enlarged portion of the hook 1161' provided at the upper end of lever 1161. When the parts are in this position it is seen that when the raised portion of cam 1164 engages projection 1163 of lever 1161, the latter will be rocked in a counterclockwise direction about its pivot 1162, but due to the fact that stud 1158' of lever 1158 is now positioned within the enlarged portion of hook 1161', no motion will be imparted to link 1158 and thus the revolution shaft 1135 will not be coupled to the driving mechanism therefor. Consequently no check will be issued. When lever 1340 is moved in this manner, it is seen that stud 1343 will engage into the upper notch provided in detent 1344, and lever 1340 will be held in its adjusted position. From this construction it is clear that since the check feeding, perforating, severing and printing mechanisms are operated upon rotation of shaft 1135, they will remain inoperative until lever 1340 is moved downwardly to the position shown in Fig. 56. These mechanisms will then be conditioned to issue a check for cash, received on account and paid out transactions in the manner previously described.

Card perforating mechanism

The illustrated machine is provided with mechanism for perforating a record card with data corresponding to the keys depressed during each operation of the machine. It is understood, however, that the present invention is not limited to mechanisms for perforating the record card but it is intended to also include all mechanisms for marking or weakening the material itself so that the data entered in the machine may be automatically taken from these cards when passed through any form of tabulating machine. The illustrated machine also discloses means for automatically disabling the card perforating mechanism for total taking operations. It also is capable of disabling this mechanism for certain transactions that are entered in the machine. In the illustrated machine, means is provided for disabling the card perforating mechanism for no sale transactions, but it is obvious that by slightly modifying the present construction the perforating mechanism may be disabled for any one or any number of transactions.

The perforating mechanism proper is supported in three main frames 1400, 1401, and 1402 (Fig. 76) which are fastened by any suitable means to the base plate 10 (Fig. 73) of the machine proper. The illustrated machine shows each of the side frames as formed with a pair of apertured brackets 1403 (Fig. 76) so that screws 1404 may be passed therethrough to rigidly fasten the frames to the base plate 10. Referring to Fig. 73 it will be seen that each indicator differential 313 has pivoted thereto at 1405 a link 1406. The rearward end of link 1406 is pivoted to the upper arm 1408 of a lever 1407 at 1409. There is one such series of connections for each indicator differential 313. Therefore, a description of the structure and operation of one will suffice for all. For the purpose of illustration, the indicator differential 313 for the units order will be described.

Levers 1407 (Fig. 73) are pivoted upon a shaft 1410 which is supported in projections extending rearwardly from supporting frames 12 and 14. The lower arm 1411 of each lever 1407 is bent forwardly as shown in Fig. 73 and carries a roller 1412 at the forward end thereof. This roller projects into a substantially vertical slot 1413 provided near the rearward end of a rack 1414. This rack is provided with a pair of longitudinal slots 1415 for receiving a pair of guide rods 1416 extending across the machine slightly below base plate 10 and which are supported in frames 1400, 1401, and 1402 (Fig. 76). Also journaled in these supporting frames are a series of transmission shafts 1417. Each shaft 1417 has fixed thereto a pinion 1418 which meshes with a corresponding rack 1414. Near the other end of each shaft 1417 a second pinion 1419 is fixed thereto which meshes with a related rack member 1420, which is provided with a pair of longitudinally extending slots, not shown, but similar to slots 1415 (Fig. 73) for receiving guide rods 1416. Each rack 1420 is provided with a depending projection 1421 (Fig. 73) which is adapted to register with any one of a series of punches 1422. There is one row or series of punches 1422 for each bank of keys and the number of punches therein corresponds with the number of keys in its respective bank. Each punch 1422 is provided with a head 1423 which rests upon a retaining plate 1424. The lower end of each punch 1422 extends through an aperture provided in the stripper plates 1425 and registers with a corresponding aperture 1427 (Fig. 77) provided in the die plate 1428. These punches are slidably mounted in plates 1424 and 1425 (Fig. 73) and are adapted to be lifted by the record card if unobstructed by the projection 1421 carried by rack 1420. Thus, it is seen that when a blank card is positioned over the die plate 1428 (Fig. 77) and the latter is elevated a card will be punched, provided a punch 1422 is stopped by its related projection 1421. There is one row of punches and related apertures in the die plate for each bank of keys. Accordingly, if a key in each bank is depressed and the machine operated, a punch for each of the keys depressed will become effective to perforate the card. It is obvious from the construction of the present machine that additional banks of keys may be provided and that each may have a series of connections similar to those just described to effect perforations in the record cards corresponding to these banks of keys also. For example, a series of banks of ledger keys may be provided so that a ledger number may also be punched in the card. In order to effect punching or perforating of the cards the following mechanism is provided.

Journaled in supporting frames 1400, 1401 and 1402 (Fig. 76) is a main operating shaft 1427A. Motion is imparted to this shaft by a train of gears connecting the same with the main operating shaft 20. Referring to Fig. 73 it will be seen that a gear 1428 meshes with gear 34 which gear it will be remembered meshes with gear 33 fixed to shaft 20. Meshing with gear 1428 is a large gear 1429 which in turn meshes with a gear 1430 pinned to shaft 1427A. Fixed to shaft 1427A is a cam 1431 (Figs. 74 and 76) and its companion cam 1432 which engage rollers 1433 and 1434, respectively, provided on a forwardly extending arm 1435 which is pinned to a rod 1436 journaled in supporting frames 1400 and 1401 (Fig. 77). Also pinned to rod 1436 are a pair of forwardly extending arms 1437 (Figs. 73 and 77) which are bifurcated at their forward ends to receive a related stud 1438 provided on a box frame 1439 which carries the die plate 1428 and the stripper plates 1425. This box frame is provided with a projection 1439a at each side thereof which enters into a guide slot 1439b provided in brackets fixed to the frames 1400 and 1401, respectively, as shown in Fig. 77.

The blank cards are placed in a compartment 1440 (Fig. 73) provided below the base plate 10 at the forward end of the machine. A door 1441 (Fig. 1) is provided in the front end of the cabinet which permits access to this compartment for replenishing the supply of cards. The blank cards are fed from this compartment through a series of feeding rollers and onto the die plate 1428 which is then elevated to effect perforation thereof, after which the punched cards are fed into a storage compartment 1442 (Fig. 73) located to the rear of the machine. A door 1443 is provided at the rear of the cabinet, as shown in Fig. 73. Access may be had thereto only by the proprietor or other authorized person having a key to a lock thereon. Referring to Figs. 76 and 81, it will be seen that also pinned to shaft 1427A is a box cam 1445 having a cam groove 1446 into which projects a roller 1447 provided at the rear end of a pitman 1448. Pitman 1448 is provided with a slot 1449 for receiving shaft 1427A. The forward end of pitman 1448 is pivoted on a stud 1450 (Figs. 73 and 76) projecting from an arm 1451 (Fig. 76) pivotally mounted on a shaft 1452 (Figs. 73 and 76) journaled in supporting frames 1400 and 1401. Loosely mounted on shaft 1452 adjacent arm 1451 is an arm 1453 which is provided with an open slot 1454 (Fig. 73) at the upper end thereof for receiving a stud 1455 provided on a feed block or card picker 1456. Pivoted on arm 1453 intermediate its ends is a spring urged latch pawl 1457 which is provided with a notch 1458 which engages a stud 1460 projecting from pitman 1448. A spring 1459 normally urges latch pawl 1457 downwardly. Thus, it is seen that when shaft 1427A is rotated, cam 1445 (Fig. 81) will move pitman 1448 (Fig. 73) rearwardly thereby also rocking arm 1453 rearwardly and causing feeding block or picker 1456 to feed a card from the compartment 1440 to a series of feeding rollers, which will now be described.

Journaled in side frames 1400 and 1401 are a pair of shafts 1461 and 1462 (Figs. 73 and 79) having fixed thereon a pair of feed rollers 1461' and 1462' (Fig. 79). Fixed to the outer end of shaft 1461 is a pinion 1463 which meshes with a similar pinion 1464 fixed to shaft 1462. Journaled in supporting frames 1400 and 1401 are a pair of shafts 1465 and 1466 (Figs. 78 and 79) carrying feed rollers 1467 and 1468, respectively. Fixed to the outer end of shaft 1465 is a pinion 1469 and fixed to shaft 1466 is a pinion 1470. Also journaled in supporting frames 1400 and 1401 are a pair of shafts 1471 and 1472, which carry, respectively, feed rolls 1473 and 1474 for feeding the punched card into the storage compartment 1442 (Fig. 73). Shaft 1472 (Fig. 79) has fixed thereto a pinion 1475. A series of idler gears 1476 are provided to mesh with gears 1464, 1470, 1469, and 1475. Meshing with gear 1464 is an idler gear 1477 which meshes with a gear 1478 pinned to shaft 1427A. Thus, it is seen that when shaft 1427A is rotated, gear 1478 through the train of gears just described will actuate all of the feeding rollers. From the construction of the parts just described it will be seen that the feed rollers will be operated constantly during rotation of shaft 1427A. Therefore, a stop means is necessary to stop the card when it has been properly positioned on die plate 1428 (Fig. 77) so that the card will be properly perforated. To this end a pair of stops 1479 (Figs. 73, 77 and 79) are provided. These stops project through slots 1480 (Fig. 77) provided near the rearward side of die plate 1428, and are pivoted to a bail 1481 loosely mounted on shaft 1436 (see also Fig. 79). Fixed to shaft 1427A (Fig. 79), is a cam 1482 which engages a roller 1483 provided on the forward end of an arm 1484 forming a part of bail 1481 which is pivoted on shaft 1436. It will be seen that the lower end of the stops 1479 is formed with a bifurcated projection 1485 which receives a stud 1486 projecting laterally from arm 1484 of bail 1481. Thus, it is seen that when shaft 1427A is rotated, cam 1482 will rock arm 1484 of bail 1481 upwardly, thereby elevating stop blades 1479.

It will be noted that box frame 1439 (Fig. 78) is provided with notches 1487 for receiving shafts 1465 and 1466, thereby permitting the frame to be elevated without interfering with feed rollers 1467 and 1468. It will also be noted that the feed rollers 1488 and 1489, which cooperate with rollers 1467 and 1468, respectively, are mounted on a pair of spring urged arms 1490 and 1491, respectively, pivoted on studs 1492 and 1493 fixed to a bracket secured to die plate 1428. Die plate 1428 and stripper plates 1425 are provided with slots 1494 for receiving rollers 1467, 1468, 1488 and 1489.

From the construction of the parts just described, it is seen that upon an operation of the machine, racks 1420 (Figs. 76 and 77) will be positioned in the manner hereinbefore described by movement of the indicator differentials 313 (Fig. 73) to bring the projections 1421 thereon over their respective punches 1422. Cam 1445 (Fig. 81) will then be effective to rock arm 1453 (Fig. 73) rearwardly thereby causing feeding block 1456 to feed a blank card from the supply compartment 1440 between the feed rollers 1461' and 1462' (Fig. 79). These rollers then feed the card to rolls 1468 and 1489 (Fig. 78) which in turn feed it to rollers 1467 and 1488 and over die plate 1428. At substantially the same time, cam 1482 (Fig. 79) will rock arm 1484 upwardly, bringing stops 1479 into the path of movement of the record card. The card is thus held against movement. The tension in the springs which urge rollers 1488 and 1489 (Fig. 78) into engagement with their associated rollers 1467 and 1468 is not great enough to distort the record card when held in this position. Rollers 1467 and 1468 simply continue to rotate and thus retain the card in proper position against the stops 1479 (Fig. 79). Shortly thereafter, cam 1431 (Fig. 74) and its companion cam 1432 will rock shaft 1436 in a clockwise direction thereby causing arms 1437 (Fig. 73) to elevate the box frame 1439 with the result that the lower end of all the punches which register with projections 1421 will become effective to perforate the card. All of the other punches will simply be moved upwardly by the card. Later in the cycle of operation, box frame 1439 will be moved downwardly and stops 1479 (Fig. 79) will also be moved downwardly out of the path of movement of the card, which is then fed rearwardly by the feed rollers 1473 and 1474 into the storage compartment 1442 (Fig. 73). A guide plate 1495 (Fig. 79) is provided to direct the punched card into the storage compartment 1442.

Mechanism is provided to disable the feeding block 1456 (Fig. 73) during total taking operations of the machine so that a card will not be brought into cooperation with the punching mechanism. Fixed to the control shaft 185 is a cam 1496 which engages a roll 1497 provided at the upper end of the pitman 1498. Pitman 1498 is provided with a slot 1499 which receives shaft 185, as shown in Fig. 73. The lower end of pitman 1498 is pivoted at 1500 to an upper forwardly extending arm 1501 fixed to a stub shaft 1502 journaled in frame 1401 (Fig. 76). A depending arm 1503 (Fig. 73) also fixed to shaft 1502 is provided with a stud 1504 which engages into an open slot 1505 provided in the end of the upper arm of a lever 1506 pivoted on shaft 1436. The lower arm 1508 of lever 1506 is pivoted to the rear end of a link 1509 at 1510. The forward end of link 1509 is pivoted to an arm 1511 of a bail 1512 which is pivotally supported on shaft 1452. A second arm of bail 1512 is provided with a stud 1513 which engages the lower end of a tail 1514 integral with latch pawl 1457.

Thus, it is seen that when shaft 185 is rotated by movement of the control lever to lock register position, as described heretofore under the heading "Control Mechanism", cam 1496 will rock shaft 1502 in a clockwise direction with the result that link 1509 will be moved rearwardly by lever 1506, thereby rocking bail 1512 in a clockwise direction. When this occurs, stud 1513 will engage tail 1514 and rock pawl 1457 upwardly to disengage the notch 1458 therein from stud 1460 provided on pitman 1448. Thus, it is seen that that operating connection between arm 1453 and cam 1445 (Fig. 81) is broken since it will be remembered that latch pawl 1457 is pivoted to arm 1453 and that pitman 1448 is pivoted at its forward end to arm 1451 (Fig. 76) which is loosely mounted upon shaft 1452 (Fig. 73). It therefore is clear that upon rotation of cam 1445 (Fig. 81), arm 1453 (Fig. 73) will be held in normal position with the result that a blank card will not be fed to the punching mechanism by feeding block 1456.

Mechanism is also provided to disable the operation of feeding block 1456 for no sale transactions. This mechanism comprises a projection 1515 formed on the rack 1414 associated with the transaction indicator differential 313. When this rack is adjusted for a no sale transaction, projection 1515 will engage a nose 1516 provided on an arm 1517 integral with arm 1503 with the result that the latter will be rocked in a clockwise direction to again move link 1509 rearwardly by its connection with lever 1506. When this occurs, it is clear that bail 1512 will again be rocked in a clockwise direction to disengage pawl 1457 from the stud 1460 provided on pitman 1448, and thus the feeding block 1456 is rendered ineffective to feed a record card from compartment 1440 to the feed rollers previously described.

GENERAL SUMMARY OF OPERATIONS

The nature of the present invention is such that in order to make the foregoing description as clear as possible it was necessary to state the structure and operation of each feature considerably in detail. A complete restatement of the operation of the present invention is therefore believed to be unnecessary, however, a résumé of the general operation of the machine will not be given to coordinate the operation and functions of the various parts which have been described in detail.

Let us assume that all of the parts of the machine are in normal position, and that the control lever 180 (Figs. 1 and 49) is in open drawer position, and that the A clerk has just made a sale amounting to $1.25. In order to operate the machine, the A clerk will first insert his key into his lock 214 (Figs. 27 to 29) and then rotate the bolt to bring the projection 219 of the bolt out of engagement with the stud 218 attached to that key. He then will depress the 5-key in the penny bank, the 2-key in the dime bank, the 1-key in the dollar bank, the A-key and the cash key, and then the motor bar 43. The machine is now released for operation and the motor will operate the same to enter this item in the A totalizer, the cash totalizer, and the grand totalizer, and record the same upon the detail record strip and also upon an issued check. A record card will also be punched to correspond with this data. When the 5-key in the penny bank is depressed, the segmental cam plate 58 (Figs. 10, 17 and 30) associated with that bank of keys will be cammed upwardly thus rocking the zero stop pawl 72 in a clockwise direction about its pivot 73. At the same time, the associated detent plate 57 will also be cammed upwardly until the pin 53 moves past the detent 57' associated therewith when spring 68 will move the detent plate downwardly and hold the key in depressed position. If the operator discovers that he has made a mistake and that he should have depressed another key in that bank, upon depression of the proper key, detent plate 57 will again be moved upwardly, with the result that the previously depressed key will be released and its associated spring 52 will restore it to normal, and the second key will be held in depressed position by its associated detent 57'.

When zero stop pawl 72 (Figs. 8, 14 and 17) is rocked in the manner aforesaid, its arm 74 will be moved away from its associated differential segment 242. At the same time, the arm 76 of pawl 72 will rock the arm 78 and the rod 79 counterclockwise direction carrying all of the arms 78 associated with the amount banks of keys downwardly. Thereupon the lever 80 will rock the release arm 83 counterclockwise thus disengaging the projection 84 from the arm 85 of the detent 86 pinned to shaft 123. Therefore, it is seen that when the 2-key in the dime bank and the 1-key in the dollar bank are depressed, no further movement will be imparted to rod 79. Now, upon depression of the A-key in the clerk's bank, the lever 99 is rocked clockwise (Fig. 16) to rock the release arm 104 counterclockwise to move the projection 105 thereof away from the detent 107 (Fig. 14) which also is fixed to shaft 123. The detent plate 57 associated with this bank of keys will hold the A-key in depressed position.

Now, upon depression of the cash key (Figs. 19 and 20) the cam plate 58 associated therewith will be rocked upwardly thereby rocking its associated bell crank lever 88 clockwise to rock release arm 93 counterclockwise to move the projection 94 away from the detent 96 which also is fixed to shaft 123. It is now seen that release arms 83, 93 and 104 are moved out of engagement with their associated detents 86, 96 and 107. Referring to Figs. 23 to 26, it will be remembered that pinned to the shaft 123 is an arm 124 with a slot 125 receiving a stud 126 on a link 127 with a foot normally engaging a roller 133 on the plate 43' fixed to a motor bar 43. Now, upon depression of motor bar 43, roller 133 will be moved out of engagement with foot 134 and spring 135 will urge link 127 downwardly and rock the shaft 123 counterclockwise.

When link 127 is moved downwardly by its spring 135 the latch 138 will be disengaged from arm 136 and spring 147 will urge the link 141 upwardly thereby rocking the shaft 145 clockwise to move the finger 30 away from the motor switch control mechanism and the motor switch will be closed and the machine will be operated. It will be also remembered that link 127 carries the stud 157, and immediately upon release of arm 136 from latch 138, spring 147 will urge link 141 upwardly thereby rocking shaft 137 and arm 136 counterclockwise causing arm 136 to engage stud 157 and thus move link 127 upwardly slightly beyond normal position. When this occurs, the spring 150 will restore the motor bar 43 to normal position bringing the roller 133 into alinement with the end of foot 134. When shaft 137 is rocked in a counterclockwise direction by spring 147 the arms 154 fixed to shaft 137, through the connections shown in Figs. 30 and 31, will rock their associated bell crank levers 64 counterclockwise causing the detents 62 to further embrace the key pins 53. At the same time the flat surfaces 156 will be brought under the related pins 53 of all of the undepressed keys.

Near the end of an operation of the machine, the stud 163 (Figs. 10 and 23) on the gear 162 will through the lever 165 lower the link 141 which will rock shaft 137 clockwise substantially 20° beyond its normal position. When this occurs, the arm 136 will cam latch 138 downwardly against the tension of its spring 169 until clearing the end thereof, when spring 169 will restore latch 138 to normal position. When shaft 137 is rocked in this manner, all of the detents 57, through the connections shown in Figs. 30 and 31, will be moved upwardly beyond normal positions to permit the key springs 51 to restore the latter to normal positions. When shaft 123 is rocked counterclockwise by link 127, the projection 177 thereon will move into engagement with pawl 175 to prevent movement of shaft 20, until link 127 has been moved upwardly by spring 75

147. It also follows that when the machine is operated, pawl 175 will be moved beneath projection 177 to prevent link 127 from being rocked downwardly during movement of shaft 20. When the arm 30 is moved away from the motor switch control mechanism, the motor switch will be closed and the electric motor 21 will drive the main shaft 20 through one complete revolution.

As shown in Figs. 3, 4, 8 and 10 cams 230 and 231 through the segments 238 and 239, the shaft 240, the driving segments 241 and pawls 245, drive the differential segments 242. Cams 230 and 231 are so designed that the segments 241 will first, be rocked downwardly and then, restored to normal position at each operation of the machine. If no key in the bank is depressed, the zero stop pawl 72 will disengage the pawl 245 from segment 241 and the differential segment 242 will stop in zero position. When a key is depressed, zero stop pawl 72 is rocked clockwise and the segment 241 then rocks the differential segment 242 downwardly until the end of pawl 245 strikes a depressed key, which disengages said pawl from the segment 241 and the differential segment stops in such position. Thus, it is seen that when the 5-key in the penny bank is depressed the differential segment 242 is set in the 5 position. In a like manner, the differential segments 242, associated with the dime and dollar banks of keys respectively, will be actuated until stopped by the keys depressed in those banks.

The differential segments 242 through the segments 262, gears 263, shaft 264, side frames 265, 266 and 1014, shafts 270, and pinions 271 (Fig. 2) transmit motion from the amount differential segments 242 to the various mechanisms of the machine.

As shown in Figs. 3, 4, 11 and 12, the driving segment 241' for actuating the differential segments 242 associated with the clerks' and transaction banks are actuated in a manner similar to the amount differentials as previously described.

An operation of the totalizers will not be given here it being sufficient to state that the differentials under control of the amount keys enter the items in the totalizers as selected by the operated clerks' and transaction keys.

Through the beams 315, the indicator differential segments 313 are set according to the values of the keys depressed, after which the locking pawls 320 (they having first been disengaged from the segments 313) are again moved into engagement therewith to hold them in their adjusted positions. Consequently, when the segments 242 are restored, the beams 315 fulcrum around the pins or rollers 318, thus leaving the indicator segments 313 remaining in their adjusted positions. The gear segments 340 are now operated by the train of mechanism including the cams 332, arm 334, shaft 335, and levers 336, whereby the segments 340, through the gears 349 and 331, adjust the related indicators to the positions corresponding to the keys depressed.

At the same time, motion is transmitted from the front set of indicators 310 to the rear set of indicators 310 by the series of transmission shafts 360 and pinions 361 and 362, shown particularly in Fig. 4.

The printer associated with the detail record strip is mounted in unitary supporting frames 475 and 476 and is located in the machine directly over the totalizer reel. Referring more particularly to Figs. 35 to 38, it will be seen that the record strip 490 is trained from the supply roll 491 around a platen 493 finally to the receiving or storage roll 500. A paper shifting and feeding mechanism is provided which is so constructed that the record strip will be shifted from normal position to bring the portion thereof to be printed upon over the type carriers. The platen 493 is then operated to effect a printing impression upon the record strip, which is then shifted to normal position and advanced one step so that a fresh portion thereof will be brought over the type carriers when the paper is again shifted. The record strip may be viewed through a window provided in the lid of the cabinet. This window is provided with an opening in the left hand corner thereof, so that autographic notations may be made upon the record strip adjacent the printed items.

When the slidable members 535 and 536 are moved forwardly by arm 579, due to the friction between pressure roll and platen, the latter will be held stationary until rack 543 has been moved sufficiently to bring studs 546 to the end of slots 549 in rack 544, which distance is substantially equal to the width of one tooth space. Racks 542 and 544 will then move in unison to rotate pinion 543 and platen 493. Platen 493 by its engagement with roll 492 will shift the paper from the writing position to a position directly beneath the platen 493 where a printing impression will be effected thereon from the type carriers, after which the platen will be rotated in the reverse direction by racks 542 and 544 to shift the paper in the reverse direction. Referring to Fig. 39, it is seen that during the forward movement of racks 542 and 544 the latter will soon move out of mesh with pinion 543 and spring 547 will then extend racks 542 and 544, thus leaving a space between these racks so that upon the return movement thereof the first tooth on rack 544 will engage the second tooth of pinion 543 from that engaged by the last tooth of rack 542. Thus, it is seen that platen 543 will be rotated a greater distance in the reverse direction than it was driven by the forward movement of these racks and consequently a slight amount of paper will be drawn off from supply roll 491. During the forward movement of the slidable members 535 and 536, arm 529 will be rocked in a counter-clockwise direction, as viewed in Fig. 42, thereby bringing pawl 553 into engagement with the next adjacent tooth of ratchet 527. Now, upon the return of slidable member 536, arm 529 will be rocked in a clockwise direction, thereby causing pawl 553 to rotate ratchet wheel 527, which, through the friction connection between it and ratchet 526, the latter will rotate storage roll 500 to wind the amount of paper paid off from the supply roll 491, thereon. It will be noted that when the storage roll 500 increases in size, a greater amount of paper will tend to be wound thereon, and thus the paper may be severed if a compensating device were not provided. For this reason, the friction drive between ratchet 526 and ratchet 527 is provided so that when binding takes place in the paper after the proper amount has been paid off from the supply roll 491, slippage will occur between ratchet 526 and ratchet 527 after that amount of paper has been wound upon the storage roll.

Figure 70:
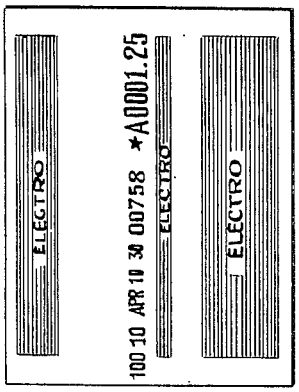
Fig. 70 shows a sample of a check bearing a single impression.

The mechanism for actuating the shifting and printing devices will now be briefly reviewed. Referring to Fig. 37, it will be seen that cams 565 and 565' are loosely mounted on shaft 20. As shown in Figs. 3 and 4, a pinion 159 is fixed to shaft 20 and lies adjacent the intermediate supporting frame 14. This pinion meshes with a gear 736 fixed to a shaft 735 journaled in intermediate supporting frames 13 and 14. A gear 538 is also fixed to shaft 535 which meshes with a gear 566 fixed to cam 565. This gear is also loosely mounted on shaft 20. Thus, it is seen that motion is imparted from the main shaft 20 to cams 565 and 565'. These cams cooperate with a pair of rollers 567 and 568, respectively, provided on a segmental gear 571. Segmental gear 571 meshes with a gear segment 572 which is provided with a cam slot 574 at the upper end thereof. A stud 575 provided on the lower arm 576 of bell crank lever 577 projects into slot 574. The upper arm 579 of bell crank lever 577 is provided with an open slot which receives a stud 581 provided at the forward end of a slidable member 535. Also pivoted to segmental cam plate 572 is a link 583. The forward end of link 583 is pivoted at 584 to an arm 585 fixed to a shaft 586. A stud 587 is provided on arm 585 intermediate its ends which projects into a slot 588 provided in the lower arm 589 of a two-arm lever 590. The upper arm of lever 590 is bifurcated to receive one end of the shaft 503 supporting the platen 493. Also fixed to shaft 586 is an arm 592 which is provided with a stud 593 at the upper end thereof in axial alinement with stud 587 on arm 585. Stud 593 is also received in an open slot provided at the lower end of a two-arm lever 595 pivoted to a stud 595' projecting inwardly from side frame 14. The upper arm 596 of lever 595 is also bifurcated to receive the other end of shaft 503 supporting platen 493, as shown in Figs. 70 and 71. From the construction of the parts just described, it is seen that when segment 572 is rocked in a counterclockwise direction by cams 565 and 565', bell crank lever 577 will also be rocked in a counterclockwise direction to shift the record strip to printing position. At this time, stud 575 will have entered the dwell portion 574' of slot 574 and no further movement will be imparted to the record strip. At substantially the same time, shaft 586 will be rocked in a counterclockwise direction by connecting link 583 with the result that levers 590 and 595 will be rocked in a clockwise direction to bring platen 493 to a position slightly above the type carries. Upon further movement of segmental cam 572, the platen will be brought downwardly into engagement with the type carriers to effect a printing impression upon the record strip. Upon further movement of shaft 20 in the same direction, segmental cam disc 572 will be rocked in a clockwise direction with the result that platen 493 will be moved out of engagement with the type carriers before shifting of the paper takes place, since stud 575 will still be in the dwell portion of slot 574. When, however, stud 575 is engaged by the cam portion of slot 574, the record strip will be shifted in the reverse direction and advanced one step. At the same time, platen 493 will be restored to normal position. When slides 535 and 536 are returned to normal position, arm 529 carrying feed pawl 553 will be rocked in a clockwise direction to rotate ratchet wheel 527, which, by the friction connection between it and ratchet wheel 526, storage roll 500 will be rotated slightly to wind the portion of the record strip paid off from the supply roll 491, thereon. As storage roll 500 increases in size, a greater amount of paper would be wound thereon if no compensating device were provided, thereby causing an uneven spacing of the printed items of the record strip. Also due to the binding of the paper, due to the friction between platen 493 and compression roll 492, after a sufficient amount of paper has been paid off supply roll 491, the record strip may be severed if no compensating device were provided. For this reason, the friction drive between ratchet wheel 527 and ratchet wheel 526 is provided so that when the proper amount of paper has been wound on storage roll 500, slippage will occur between these members, with the result that storage roll 500 will be held against further movement.

During the downward movement of each of the differential segments 242, the type carriers 1011 (Fig. 72), associated with the check and slip printing mechanism, will also be adjusted to correspond with the keys depressed. Referring to Figs. 2 and 53, it will be seen that the transmission shaft 268 has fixed thereto near the left hand end thereof, a pinion 295 which meshes with a gear 296 loosely pivoted on a sleeve 1016 mounted on shaft 264 near the left hand end thereof. Gear 296 meshes with a segmental gear 1000 pivoted on a rod 1001. Also pivoted on rod 1001 is a segment 1006 which meshes with a related gear 1009 fixed to one end of a sleeve 1010. Sleeve 1010 by suitable connections operates the type wheel 1011 carrying the clerks' printing characters. A beam 1003 is pivoted at 1002 to segment 1000. The upper end of beam 1003 is provided with an open slot which engages a stud 1005 projecting from segmental gear 1006. Thus, it is seen that movement of the segmental gear 1000 will be imparted to segmental gear 1006. By interposing the beam 1003 between segmental gear 1000 and segmental gear 1006, the type carrier 1011 associated therewith may be adjusted directly from one position to another without first being returned to zero position. The operation of such a beam is well known; therefore, the operation thereof need not be reviewed at this time. Each shaft 270 has a similar pinion 276 fixed to the right hand end thereof which meshes with a gear 277, which in turn meshes with a segment 1000, similar to that engaged by the gear 296 associated with the clerks' differential mechanism. Shaft 269 associated with the transaction bank of keys has also fixed thereto a pinion 308 which meshes with a gear 309 also loosely mounted on the sleeve 1016. This gear also meshes with a segmental gear 1000 pivoted on shaft 101. Thus, it is seen that upon downward movement of all of the differential segments 242, motion will be imparted through the transmission shafts 268, 269, and 270, through the series of connections just described, to adjust the type carriers 1011 an amount commensurate with the movement of their related differential segments 242. As shown in Fig. 53, the sleeves 1010 are nested so as to permit relative movement of the various type carriers 1011. These sleeves are supported on a shaft 1012.

Referring to Fig. 56, it will be seen that shaft 269 has fixed thereto a collar 1165. Fixed to collar 1165 is a cam member 1164 which is adapted to engage a projection 1163 provided on a lever 1161 pivoted on a stud 1162. The hook portion provided at the upper end of lever 1161 engages a stud 1158' provided at the lower end of a spring urged link 1158. Referring to Fig. 47, it will be seen that the intermittent gear 1036, fixed to the main driving shaft 20, meshes with a second intermittent gear 1137, fixed to shaft 653. These gears are so constructed that the intermittent gear 1036 is moved independently of gear 1137 during its first 90° of movement, thus allowing the type carriers 1011 to be adjusted before any movement is imparted to gear 1137. Gear 1137, as was pointed out before, is fixed to a short shaft 653, which shaft has also fixed thereto another gear 1139 (Figs. 53 and 54), which gear in turn meshes with a large gear 1140 pivoted on shaft 386. Gear 1140 meshes with an idler gear 1141 pinned to a stub shaft 1142, which is journaled in suitable bearings provided in side frame 11. Shaft 1142, at its outer end has pinned thereto, a similar gear 1142' (Figs. 54 and 56) which meshes with a gear 1143 pivoted on a stud 1144 projecting outwardly from side frame 11. This gear meshes with a gear 1145 loosely mounted on the revolution shaft 1135, which shaft carries the actuating means for operating the printing, feeding, perforating, and severing means for the issued checks. Normally, the shaft 1135 will not be rotated, since gear 1145 is loosely mounted thereon. However, for cash, received on account, and paid out transactions, certain mechanism will be operated to cause coupling of gear 1145 with revolution shaft 1135, with the result that the check issuing mechanism will then be operated. The mechanism for causing this coupling action to take place between gear 1145 and the revolution shaft 1135 will now be briefly reviewed.

Referring to Figs. 54, 56, and 57, it will be seen that gear 1145 has fixed thereto a hub 1146 formed with a projection 1147. This projection is adapted to be engaged by a hook provided on a pawl 1148 pivoted at 1150 upon a gear 1151, which gear is pinned to shaft 1135. Pawl 1148 is provided at its forward end with a pin 1152 which projects through an enlarged opening 1153 formed in gear 1151 and is adapted to normally engage in a notch 1154 provided in a stationary disc 1155. Disc 1155 is loosely mounted on shaft 1135 and lies adjacent to gear 1151. This disc is held against movement by a pin 1156 extending from the supporting frame 11, as shown in Fig. 54. Pin 1152 is held in notch 1154 of the stationary disc 1155 by a projection 1157 formed on the spring urged link 1158. Attached to the upper end of link 1158 and loosely mounted on shaft 1135, adjacent to the stationary disc 1155, is a segmental cam plate 1159. The cam portion 1160 of plate 1159 normally rests upon pin 1152, as shown in Fig. 56. The lower end of link 1158 as was stated before is provided with a stud 1158' which is engaged by the hook portion 1161' of lever 1161. Thus, it is seen that when the transaction differential 244 is adjusted downwardly until stopped by the cash key, the raised portion of cam 1164 will engage projection 1163, which through the connections just described will move link 1158 downwardly. By this action, cam 1159 will be rocked in a counter-clockwise direction, thereby rocking pawl 1148 in a counterclockwise direction, as viewed in Fig. 57, causing the hook portion provided at the end thereof to engage projection 1147 of hub 1146. Gear 1145 will thus be coupled to gear 1151. The latter, it will be remembered, is pinned to shaft 1135. Now, upon an operation of the machine, a check will be issued. As shown in Figs. 54, 60, and 68, shaft 1135 is journaled in a pair of supporting frames 1170 and 1171. A platen 1175 is provided to effect printing impressions from the type line upon the issued checks. This platen is adjustably supported by a pair of operating arms 1179. These arms are mounted on a shaft 1180 and are connected at their upper ends by a pin 1181 upon which is mounted an anti-friction roller 1181'. As has been stated hereinbefore, the check mechanism is adjustable so that either "straight" checks or "stub" checks may be issued from the machine. Let us suppose that the mechanism is adjusted so as to issue "stub" checks.

Referring to Fig. 59, it will be seen that a cam 1182 is fixed to shaft 1135 and is adapted to engage roller 1181' to actuate platen 1175 to effect printing upon the issued checks. Referring to Figs. 54 and 59, it will be seen that a pawl 1186 is pivoted at 1187 to cam 1182. This pawl is provided with a cam portion 1188 which is adapted to engage roller 1181' when cam 1182 is actuated. Pawl 1186 has attached thereto an anti-friction roller 1189 which engages a snail cam 1190 loosely mounted on shaft 1135. Cam 1190 is connected to an arm 1192 by a sleeve 1191 loosely mounted on shaft 1135. Arm 1192 is provided with a laterally extending stud 1192' which projects into an open slot provided in a spring urged plunger 1196 which is slidably mounted on the rearwardly extending arm 1194 of a lever 1193. Lever 1193 is loosely mounted on sleeve 1172 provided on rod 1173, as shown in Fig. 59. The substantially vertical arm 1197 of lever 1193 extends through a slot provided near the top of the cabinet, as shown in Fig. 54. The rearwardly extending arm 1194 of lever 1193 is also provided with an open slot for receiving the stud 1192' provided on arm 1192. Pawl 1186 is held in position by means of a tail integral therewith which engages a collar on the rod 1135. Fig. 59 shows the position of the parts when lever 1193 is in "stub" check position. When the parts are in this position and cam 1182 is rotated in the direction of the arrow, cam portion 1188 of pawl 1186 will first engage roller 1181' to rock platen 1175 downwardly to effect a printing impression upon the check strip. Shortly thereafter, cam portion 1183 of cam 1182 will engage roller 1181' and again cause a printing impression to be effected upon a check. The check material is drawn from a storage roll 1200 supported on a rod 1201. One end of rod 1201 is riveted to supporting frame 11. From the storage roll 1200 the check strip passes through a guide channel 1202, thence between two sets of electro rolls 1255 and 1256 and their cooperating feeding rollers 1203 and 1204, respectively. The strip then passes over a block 1205 associated with the printing and severing mechanism and thence through a second guide channel and over the type carriers where it receives a printing impression, and thence through an opening provided in the front of the cabinet. As shown in Figs. 54 and 60, a lever 1208 is pivoted upon shaft 1180 near the right hand end thereof. The rearwardly extending arm 1209 of lever 1208 carries a pair of rollers 1210 which cooperate with a cam 1211 and its follower, which are secured to the shaft 1135. The forward end 1212 of lever 1208 is provided with a substantially L-shaped slot 1233. Projecting into slot 1233 is a stud 1213' provided at the upper end of a link 1213. The lower end of link 1213 is pivoted to a rockable member 1214 pinned to a rod 1215 journaled in supporting frames 1170 and 1171. Referring to Fig. 63, it is seen that rod 1215 has fixed thereto a second rockable member 1214' similar to member 1212. The forward ends of members 1214 and 1214' extend into slots provided in a reciprocatory blade 1216. Blade 1216 is guided in supporting frames 1170 and 1171 and is provided with the usual cutting edge which cooperates with a straight edge 1221 fixed to block 1205. The rearward end of members 1214 and 1214' are connected in a similar manner to a perforating member 1220. Fig. 60, it will be remembered, shows the position of the parts when lever 1193 is in the "stub" check position. When the parts are in this position and the machine is subsequently operated, it will be seen that the lever 1208, through its connection with cams 1211, is first rocked in a clockwise direction about shaft 1180. By this action, members 1214 and 1214' will be rocked in a clockwise direction with the result that the serrated edge of member 1220 will be brought into engagement with the check to perforate the same. The check strip will then be fed to bring a portion thereof over the type carriers when the platen 1175 will be brought downwardly to effect a printing impression thereon. The check strip will then be fed again and platen 1175 will then again be operated in the manner described hereinbefore to effect a second printing impression upon the check. Immediately after the last impression, lever 1208 will be rocked in a clockwise direction by cam 1211 and its follower, which movement imparts a counterclockwise movement to members 1214 and 1214', with the result that blade 1216 will be lowered sufficiently to sever the check from the strip. After these operations have been performed on the check, it will have been moved into the channel 1225, and the end portion thereof will protrude outwardly sufficiently to enable the operator to remove the same.

Referring to Fig. 72, it will be seen that adjacent the type carriers 1011 are fixed counter wheels 1060. Adjacent the counter wheels are a series of date wheels 1095. Adjacent the date wheels 1095 are two fixed type carriers 1098. These type carriers 1098 are adapted to print characters designating, respectively, the number of the machine and the number of the store in which the machine is installed. The date wheels 1095 are adjusted by the usual knurled knobs 1096. The consecutive numbering device associated with the check and slip mechanism consists of five type wheels 1060 mounted upon shaft 1012. These wheels are of the usual construction and have a ratchet wheel 1061 attached thereto which is adapted to be engaged by a multi-prong pawl 1062. Pawl 1062 is given an oscillatory movement by a bail 1063 at each operation of the machine when cash, received on account and paid out transactions are entered therein.

Figure 69:
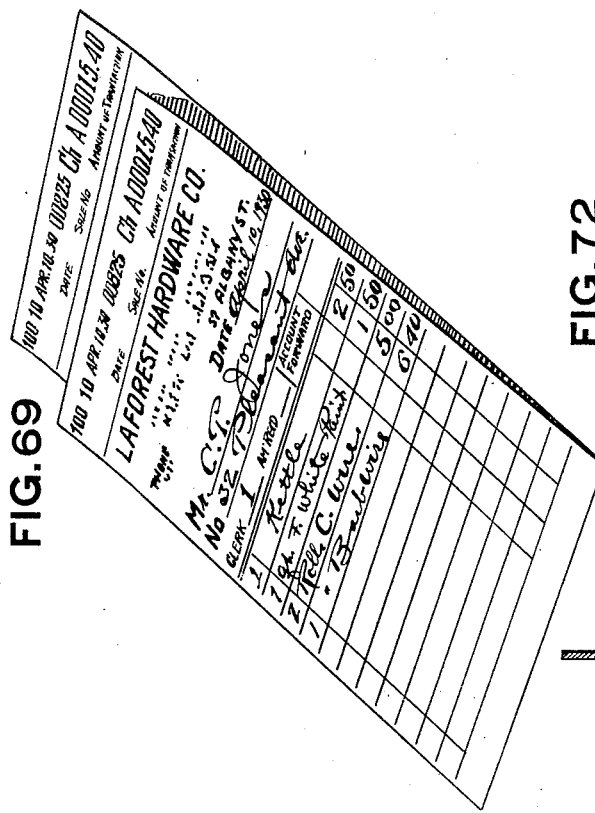
Fig. 69 shows a sample of a form of slip after printing has been effected thereon by the slip printing mechanism.

The type carriers 1011, 1060, 1095 and 1098 are provided with two similar sets of type, the upper set being provided for printing upon the issued checks as just described, while the lower set is provided for printing upon inserted sales slips. Samples of the matter printed upon the issued checks and inserted sales slips are shown in Figs. 69, 70 and 71.

The illustrated machine is also provided with mechanism for perforating a record card with data corresponding to the keys depressed during each operation of the machine. This mechanism is adjusted through the indicator differentials 313 associated with each bank of keys. Therefore, it is seen that when the 5-key in the penny bank has been depressed and the machine operated the differential segment 242 associated with that bank of keys will be moved downwardly until stopped by the said key. At the same time beam 315 will adjust its associated differential segment 313 a corresponding amount. Referring to Figs. 73 and 76, it will be seen that a link 1406 connects differential segment 313 with a related lever 1407. The lower end of lever 1407 is connected to a related rack 1414 which is slidably mounted upon a pair of rods 1416. Motion is transmitted from rack 1414 to a related rack 1420 by a transmission shaft 1417. Rack 1420 is provided with a projection 1421 at the lower end thereof which is adapted to register with any one of a series of punches 1422 in the row of punches relating to the penny bank of keys. Thus, it is seen that upon an operation of the machine, when the 5-key in the penny bank is depressed rack 1420 will be positioned through the connections just described to bring projection 1421 over the punch 1422 corresponding to the 5-key. In the same manner the indicator differential 313 associated with the dimes, dollars, clerks' and transaction banks of keys will, through a similar series of connections position their related slides 1420 commensurate with the keys depressed in those banks. The blank cards are placed in a compartment 1440 located at the front of the machine below the base plate 10. The cards are fed from this compartment over a die plate 1428 which then is elevated to effect perforation of the cards after which the perforated cards are fed into a storage compartment 1442. Each punch 1422 is provided with a head 1423 which rests upon a retaining plate 1424 which is fixed to side frames 1400 and 1401. These punches project into alined apertures formed in a pair of stripper plates 1425 mounted in a box frame 1439. Each punch registers with a related aperture 1427 provided in the die plate 1428 which also is fixed to box frame 1439. In order to operate the various mechanisms for feeding and punching of the record cards, a shaft 1427A is provided. Motion is imparted to this shaft from the main rotation shaft 20 by a train of gears 33, 34, 1428', 1429 and 1430, the latter being fixed to the main shaft 1427A. Fixed to shaft 1427A are cams 1431 and 1432. Cams 1431 and 1432 engage rollers 1433 and 1434, respectively, provided on a forwardly extending arm 1435 pinned to a rod 1436 journaled in supporting frames 1400 and 1401. Also pinned to rod 1436 are a pair of forwardly extending arms 1407 which are bifurcated at their forward ends to receive a related stud 1438 provided on a box frame 1439, which frame carries the die plate 1428 and the stripper plates 1425. Thus, it is seen that when the machine is operated, box frame 1439 will be elevated by the connections just described to effect perforation of a card.

Referring to Figs. 73, 76 and 81, it will be seen that also pinned to shaft 1427A is a box cam 1445 having a cam groove 1446 into which projects a roller 1447 provided at the rear end of a pitman 1448. Pitman 1448 is provided with a slot 1449 for receiving shaft 1427A. The forward end of pitman 1448 is pivoted on a stud 1450 projecting from an arm 1451 pivotally mounted on a shaft 1452. Loosely mounted on shaft 1452 adjacent arm 1451 is an arm 1453, which is provided with an open slot 1454 at the upper end thereof for receiving a stud 1455 provided on a feeding block 1456. Pivoted on arm 1453 intermediate its ends is a spring-urged latch pawl 1457 provided with a notch 1458 which engages a stud 1460 projecting from pitman 1458. From the construction of the parts just described, it is seen that when shaft 1427A is rotated, cam 1445 will move pitman 1448 rearwardly, thereby rocking arm 1453 rearwardly and causing feeding block 1456 to feed a card from compartment 1440 to a series of feeding rollers. These feeding rollers are interconnected by a series of gears, as shown in Fig. 79, and operate constantly during an operation of the machine.

In order to hold the record card in proper position on die plate 1428, a pair of stops 1479 (Figs. 73, 78 and 79) are provided. These stops project through slots 1480 provided near the rearward end of die plate 1428 and are pivoted to a bail 1421 loosely mounted on shaft 1436. Fixed to shaft 1427A (Fig. 79) is a cam 1480 which engages a roller 1483 provided on the forward end of an arm 1484 pivoted on shaft 1436. It will be seen that the lower end of the stops 1479 are formed each with a bifurcated projection 1485 which receives a stud 1486 provided on arm 1484. Thus, it is seen that when shaft 1427a is rotated, cam 1482 will rock arm 1484 upwardly, thereby elevating the stop blades 1479. From the construction of the parts just described, it is seen that upon an operation of the machine, racks 1420 will be positioned in the manner hereinbefore described by movement of the indicator differentials 313, to bring the projections 1421 thereon over their respective punches 1422. Cam 1445 will then be operated to rock arm 1453 rearwardly, thereby causing feeding block 1456 to feed a blank card from the supply compartment 1440 between the feed rollers 1461' and 1462'. These rollers then feed the card between the adjacent rollers which, in turn, bring the same over die plate 1428.

At substantially the same time, cam 1482 will rock arm 1484 upwardly, bringing stops 1479 into the path of movement of the record card. The card is thus held against movement. Shortly thereafter, cams 1431 and 1432 will rock shaft 1436 in a clockwise direction, thereby causing arms 1437 to elevate the box frames 1439, carrying the die plate 1428 and stripper plates 1425 with it, with the result that the lower end of all of the punches which register with projections 1431 will become effective to perforate the card. All of the other punches will simply be moved upwardly by the card. Later in the cycle of operation, box frame 1439 will be moved downwardly and stops 1479 will also be moved downwardly out of the path of movement of the card which is then fed rearwardly by the feed rollers 1473 and 1474 into the storage compartment 1443. It, therefore, is seen that by the mechanism just described, a perforated record card is obtained bearing unalterable data corresponding with the keys which have been depressed. Fig. 75 illustrates a card which has been punched indicating an item of $1.25 and also indicating that the A clerk operated the machine for a cash transaction.

While the form of mechanism herein shown and described is admirably adapted to fulfill the objects primarily stated, it is to be understood that it is not intended to confine the invention to the one form of embodiment herein shown since it may be embodied in various forms all coming within the scope of the claims which follow.

What is claimed is:

1. In a machine of the class described, a plurality of keys, perforating mechanism for effecting on a record card an unalterable record corresponding to the keys depressed at each operation of the machine, feeding means for feeding said record cards to the card perforating mechanism, means including a member differentially positionable under control of certain of said keys, and means engageable by said member only in certain positions thereof and operable by the member to disable the feeding means and prevent the feeding means from feeding a card to said perforating means.

2. In a machine of the class described, the combination of a series of groups of keys, a card perforating mechanism adapted to perforate a card with a record corresponding to each of the keys depressed, and means differentially positioned under control of one of said groups of keys and operable in one of its positions to disable said card perforating mechanism.

3. In a machine of the class described, a series of amount keys, a series of clerks' keys, a series of transaction keys including a no sale key, a perforating mechanism for perforating a record card with a record corresponding to each key depressed, and means, including a member positioned under control of said transaction keys and operable when said no sale key is depressed, to render said perforating mechanism ineffective.

4. In a machine of the class described, the combination of a plurality of groups of keys operable in a predetermined sequence, a card perforating mechanism controlled by said keys, means for feeding a card from a storage compartment to said perforating mechanism, and means controlled by the keys of one of said groups, and operable when one of said keys is depressed, to disable said feeding means.

5. In a machine of the class described, the combination of a plurality of keys; punching mechanism controlled by said keys to make records on record cards; record card feeding means including a card picker for feeding record cards to said punching mechanism; driving means for said card feeding means including a member which is reciprocated once during each cycle of machine operation; coupling means connected to said card picker and engaging said member so that the card picker will be operated by the card feed drive; a mode of operation lever settable to a plurality of positions; and means actuated by said lever, and operable when said lever is moved to certain of its set positions, for moving the coupling means out of engagement with said member to disconnect the card feeding means from its drive.

6. In a machine of the class described, a plurality of banks of keys, a main operating mechanism controlled by said keys, a plurality of differentially movable members controlled by said keys and actuated by said main operating mechanism, a slide actuated by each of said differential members, a transmission line transmitting movement from said slides to a series of stop members, a plurality of rows of punches, one row for each bank of keys, a die plate cooperating with said punches, means for feeding a record card to said die plate, means to disable the card feeding means, and means on one of said slides, cooperable with said disabling means to disable the card feeding means when the slide is in a certain position.

7. In a machine of the class described, the combination of a plurality of groups of keys, a card perforating mechanism controlled by said keys, driving means for operating the perforating mechanism during each machine operation, means for feeding a card from a storage compartment to said perforating mechanism, means for operating said feeding means, means for coupling said operating means to said feeding means, a control member movable into a plurality of positions of adjustment, and means operated by said control member for moving said coupling means into an ineffective position.

8. In a machine of the class decribed, the combination of a plurality of groups of keys, a card perforating mechanism controlled by said keys, driving means for operating said perforating means at each operation of the machine, means for feeding a card from a storage compartment to said perforating mechanism, means for operating said feeding means, means for coupling said operating means to said feeding means, a control member movable into a plurality of positions of adjustment, a camming device controlled by said control member, and means actuated by the camming device for moving said coupling means into an ineffective position.

9. In a machine of the class described, the combination of a card perforating mechanism, means for feeding a card from a storage compartment to said perforating mechanism, means for operating said feeding means, a driving projection carried by the operating means, coupling means cooperable with said projection and connected to said feeding means, a machine control member, and means operated by said control member for moving said coupling means out of engagement with said projection.

10. In a machine of the class described, the combination of means for perforating data on record cards; card feeding means including a card picker; a driving means for positively reciprocating the card picker; means for coupling the card picker to its drive including a latch pivoted on said card picker and normally engaging an element on said driving means; and means to move the latch out of engagement with the element to disconnect the card picker from its driving means to thereby disable the card feeding means.

11. In a machine of the class described, a plurality of punches; a punch selector; a record card feeding means operable to feed record cards to the punches; means operable to shift the punch selector to select the punches for operation; and means operable by the punch selector shifting means, when it has shifted the selector to select a certain punch, to disable the card feeding means.

12. In a machine of the class described, a bank of keys; perforating mechanism including a plurality of punches and a punch selector; differential mechanism controlled by said keys and operable to move a punch selector to a position to select a punch corresponding to a depressed key; a record card feeding mechanism including a card picker and drive means therefor; and means associated with the card picker and the differential mechanism for rendering the drive means ineffective on the card picker when the differential mechanism has been moved to a certain position under control of one of the keys of said bank.

13. In a machine of the class described, the combination of means for perforating data on record cards; means for feeding record cards from a storage compartment to said perforating means including a reciprocating picker member; driving means for said picker member, said driving means being reciprocated on each cycle of machine operation; a latch on said picker member engaging an element on said driving means to couple the picker member to the drive for operation thereby; a differentially positionable member; and means operated by the differentially positionable member to control the operation of the latch and accordingly control the operation of the picker member by its drive.

14. In a machine of the class described, the combination of a plurality of groups of keys; perforating mechanism including a plurality of punches and punch selectors shiftable to select the punches for operation; differential mechanism controlled by said keys and operable to shift the punch selectors to select punches to perforate a record card wth a record corresponding to the keys depressed; record card feeding means including a card picker for feeding cards from a storage compartment to the punching means; driving means for said feeding means comprising a member which is reciprocated once during each cycle of machine operation; means to couple said feeding means to its driving means, comprising a latch pivoted to the card picker and normally engaging an element on the member; and means actuated by one of said differential mechanisms for moving the latch from engagement with the element to disconnect the feeding means from its drive when said one differential is moved to a certain position under control of one of the keys in one of said groups of keys.

15. In a machine of the class described, a mode of operation lever settable to a plurality of positions to control machine operations; a plurality of keys; perforating mechanism controlled by said keys to make records on record cards; means to feed record cards from a storage compartment to the perforating means including a card picker; means for driving said card feeding means; coupling means for coupling the record card feeding means to its drive comprising a latch pivoted to said card picker and engageable with said driving means to connect the picker to the driving means; and means cooperating with the latch and operable by the mode of operation lever, when it is set in certain of its positions, to move the latch out of engagement with the driving means to disconnect the card feeding means from its driving means.

CHARLES W. GREEN.

CERTIFICATE OF CORRECTION.

Patent No. 2,176,130. October 17, 1939.

CHARLES W. GREEN.

It is hereby certified that error appears in the printed specification of the above numbered patent requiring correction as follows: Page 1, second column, line 19, for "showig" read showing; line 40, for the word "comprising" read comprised; page 3, second column, line 12, for "frame" read frames; page 6, second column, line 16, for "reawardly" read rearwardly; page 11, second column, line 50, for the reference numeral "38" read 338; page 16, first column, line 73, for "62" read 621; line 74, for "thrice" read thence; page 18, second column, line 14, for "652" read 652'; page 19, first column, line 17, for "889" read 889'; page 30, first column, line 39, for the word "segment" read segments; page 31, first column, line 47, for "carries" read carriers; page 35, second column, line 22-23, claim 14, for "mechanism" read mechanisms; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.